United States Patent [19]

Lahti

[11] Patent Number: 4,875,161

[45] Date of Patent: Oct. 17, 1989

[54] SCIENTIFIC PROCESSOR VECTOR FILE ORGANIZATION

[75] Inventor: Archie E. Lahti, Fridley, Minn.

[73] Assignee: Unisys Corporation, Blue Bell, Pa.

[21] Appl. No.: 273,173

[22] Filed: Nov. 14, 1988

Related U.S. Application Data

[63] Continuation of Ser. No. 761,137, Jul. 31, 1985, abandoned.

[51] Int. Cl.[4] .................. G06F 15/347; G06F 12/06
[52] U.S. Cl. ............................ 364/200; 364/232.21;
364/268.5; 364/243.1; 364/254.2; 364/271.6;
364/736
[58] Field of Search ... 364/200 MS File, 900 MS File,
364/730, 736

[56] References Cited

U.S. PATENT DOCUMENTS 3,889,237  6/1975  Alferness et al. .................... 364/200
4,435,765  3/1984  Uchida et al. ........................ 364/200
4,620,275 10/1986  Wallach et al. ...................... 364/200

Primary Examiner—Eddie P. Chan
Assistant Examiner—Christina M. Eakman
Attorney, Agent, or Firm—Charles A. Johnson; Robert S. Bramson

[57] ABSTRACT

A vector file organization for a multiple pipelined vector processor with data transfer capability to support multiple program execution pipelines. Multiple pipelines can simultaneously access various blocks of the vector file through segmenting the file storage and by addressing the various elements of the segments. Vector files of programmable registers each have storage for sixty-four elements of 36-bit words or thirty-two elements of 64-bit words. Six independent execution pipelines in combination can programmably access the vector files for either read operands or write operands or both. Each vector file has N independent blocks, each using a RAM with read output to the pipelines, an address register and a write data register. Each block holds interspersed word pairs of words of each vector file. Primary and secondary vector files are equal in capability and allow reading pairs of elements, as required by arithmetic instructions. Shadow storage similarly arranged and addressed provides storage for intermediate result vectors. A time slot management mechanism uses N registers connected in serial loop, to allocate and reserve access to the vector files by the execution pipe for each instruction execution to maintain its function. It forms a read or write address for both the primary and secondary files and references all N blocks in a pass.

11 Claims, 37 Drawing Sheets

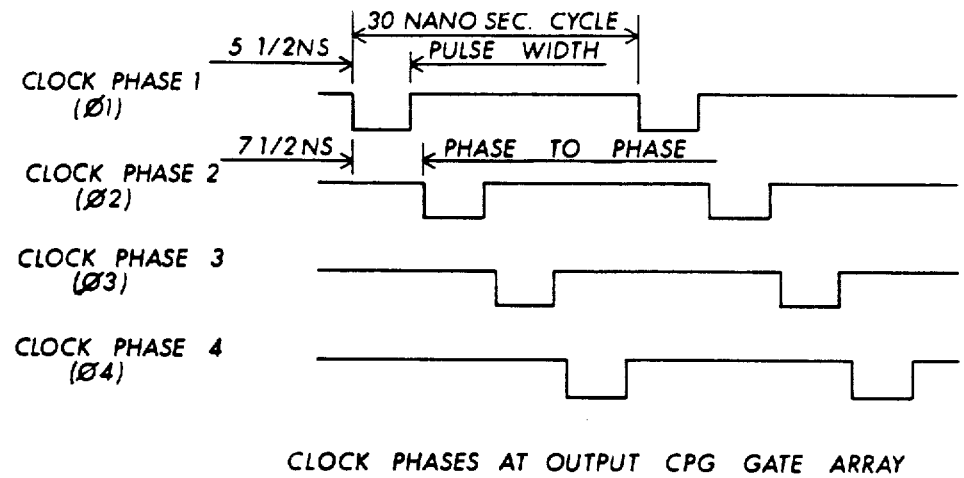
CLOCK PHASES AT OUTPUT CPG GATE ARRAY
FIG. 7
FIG. 6
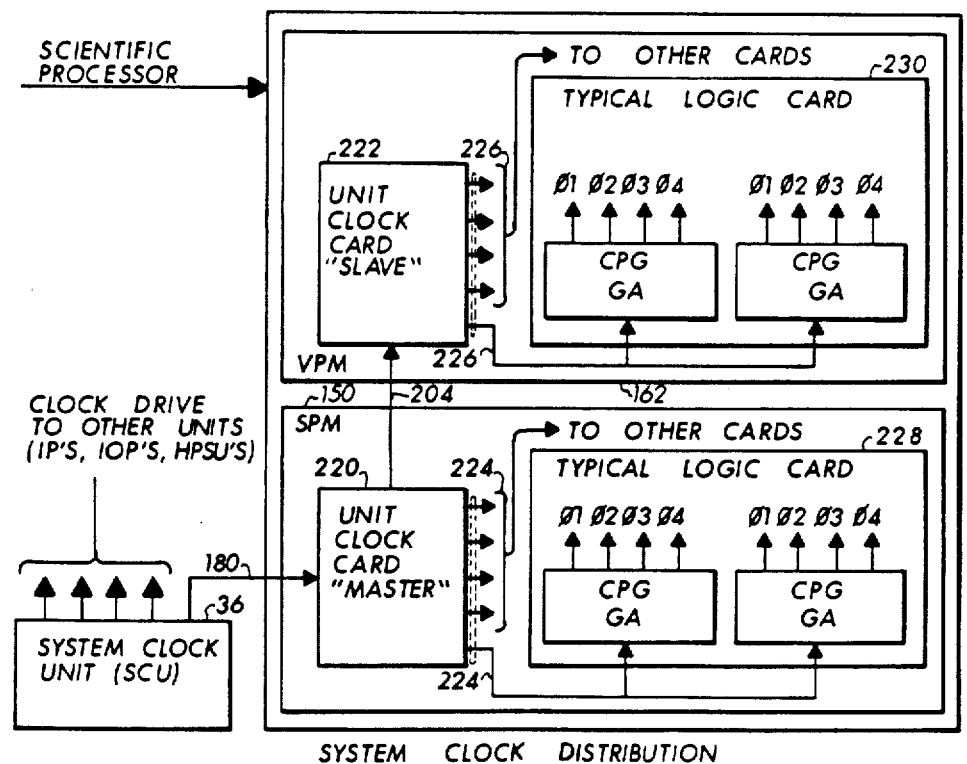
SYSTEM CLOCK DISTRIBUTION

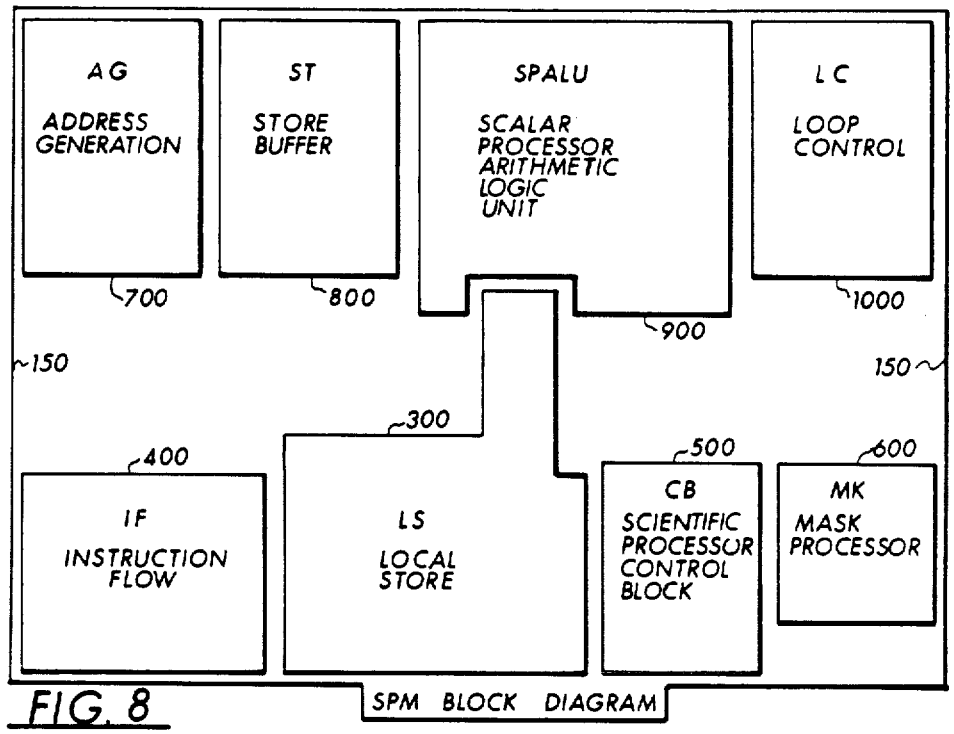
FIG. 8  SPM BLOCK DIAGRAM
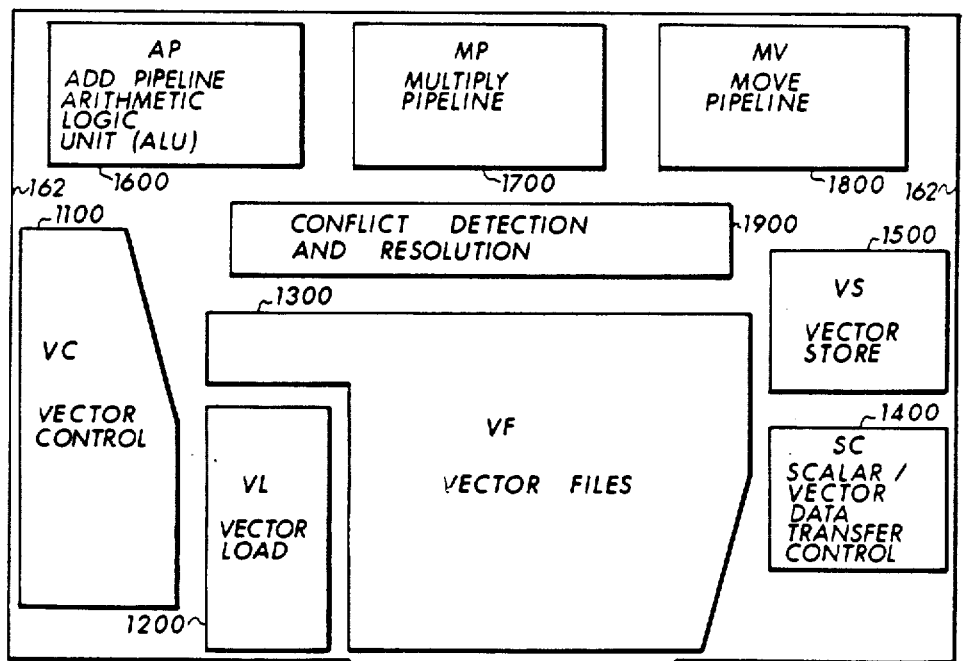
FIG. 9  VPM BLOCK DIAGRAM

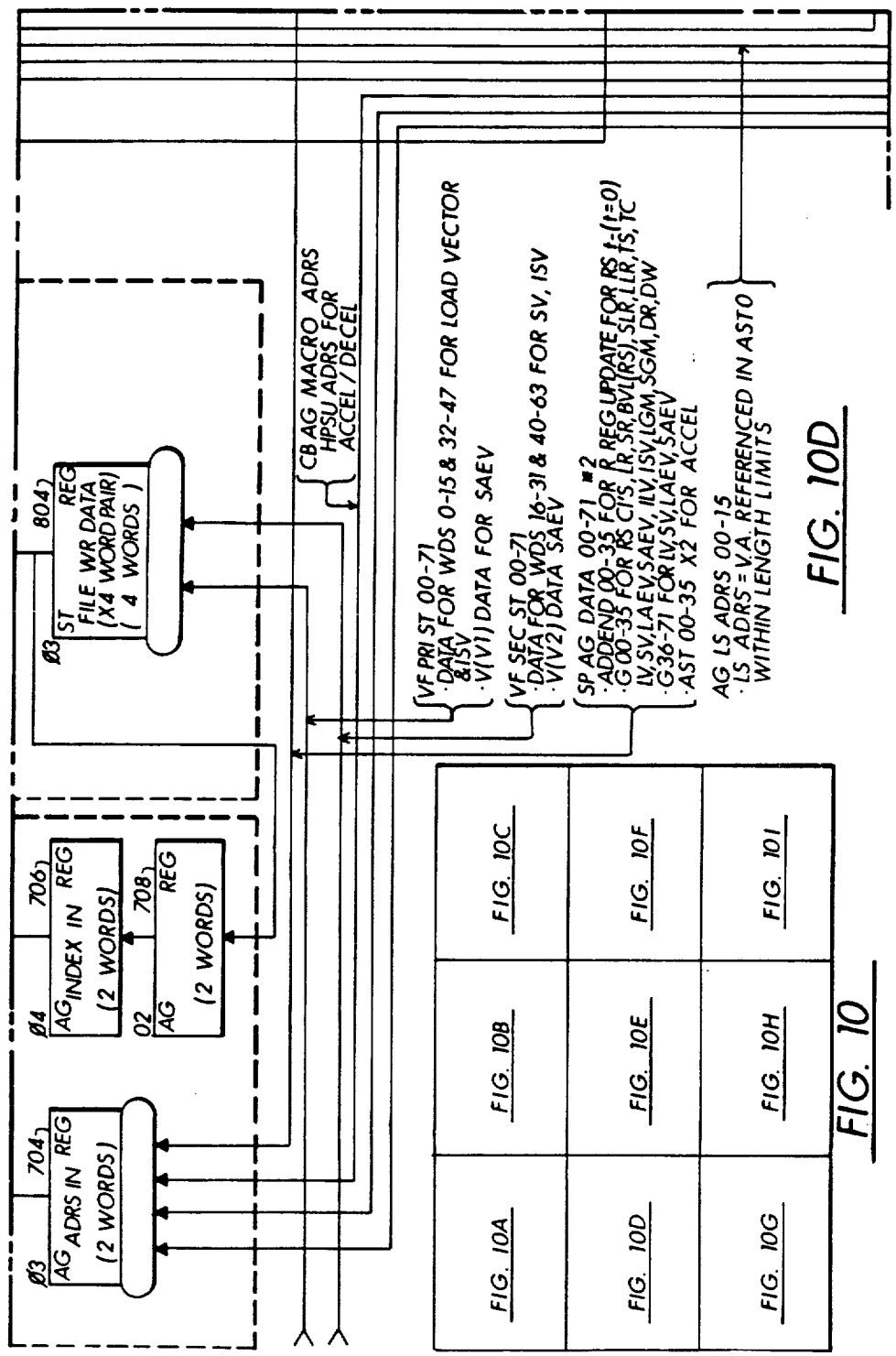

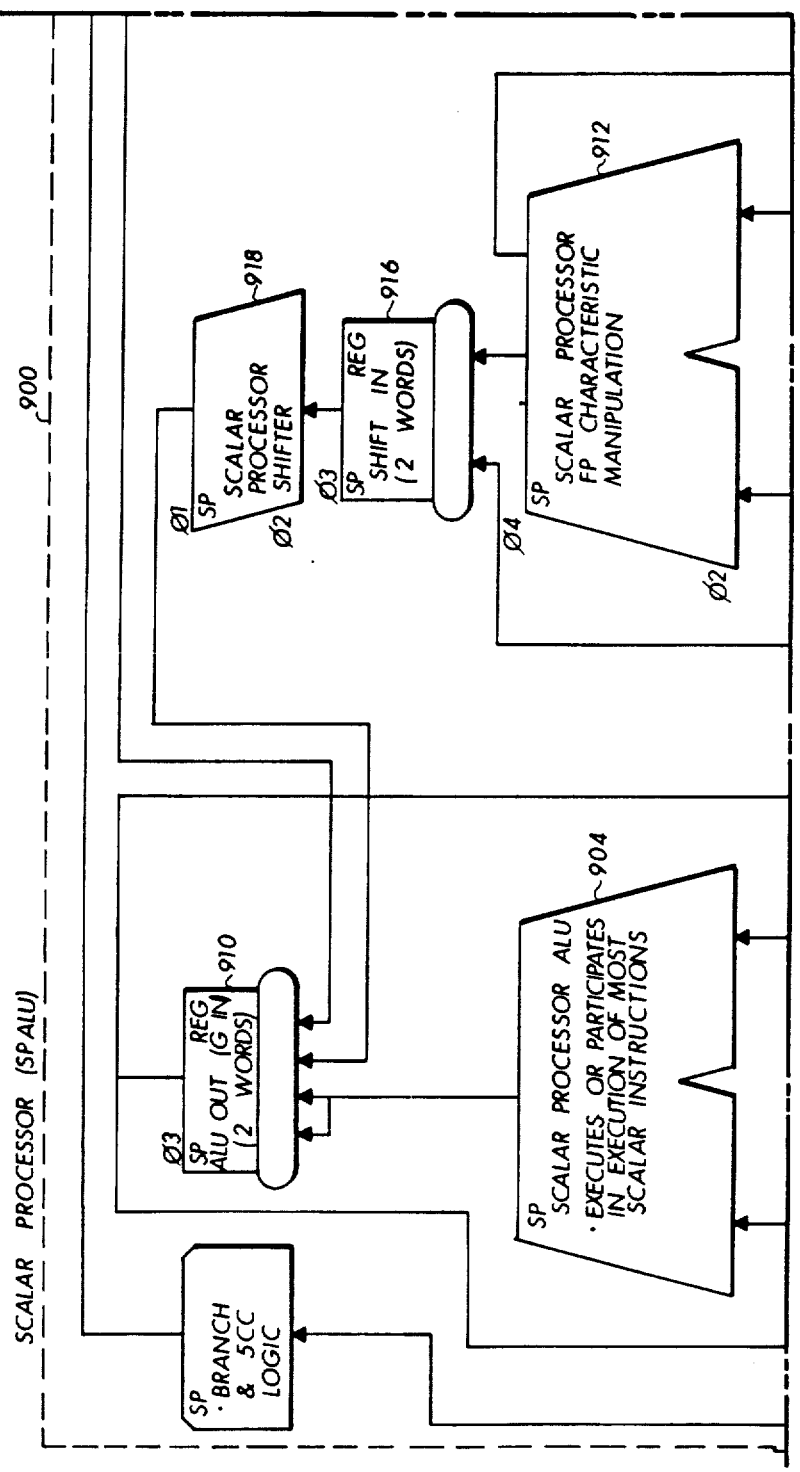

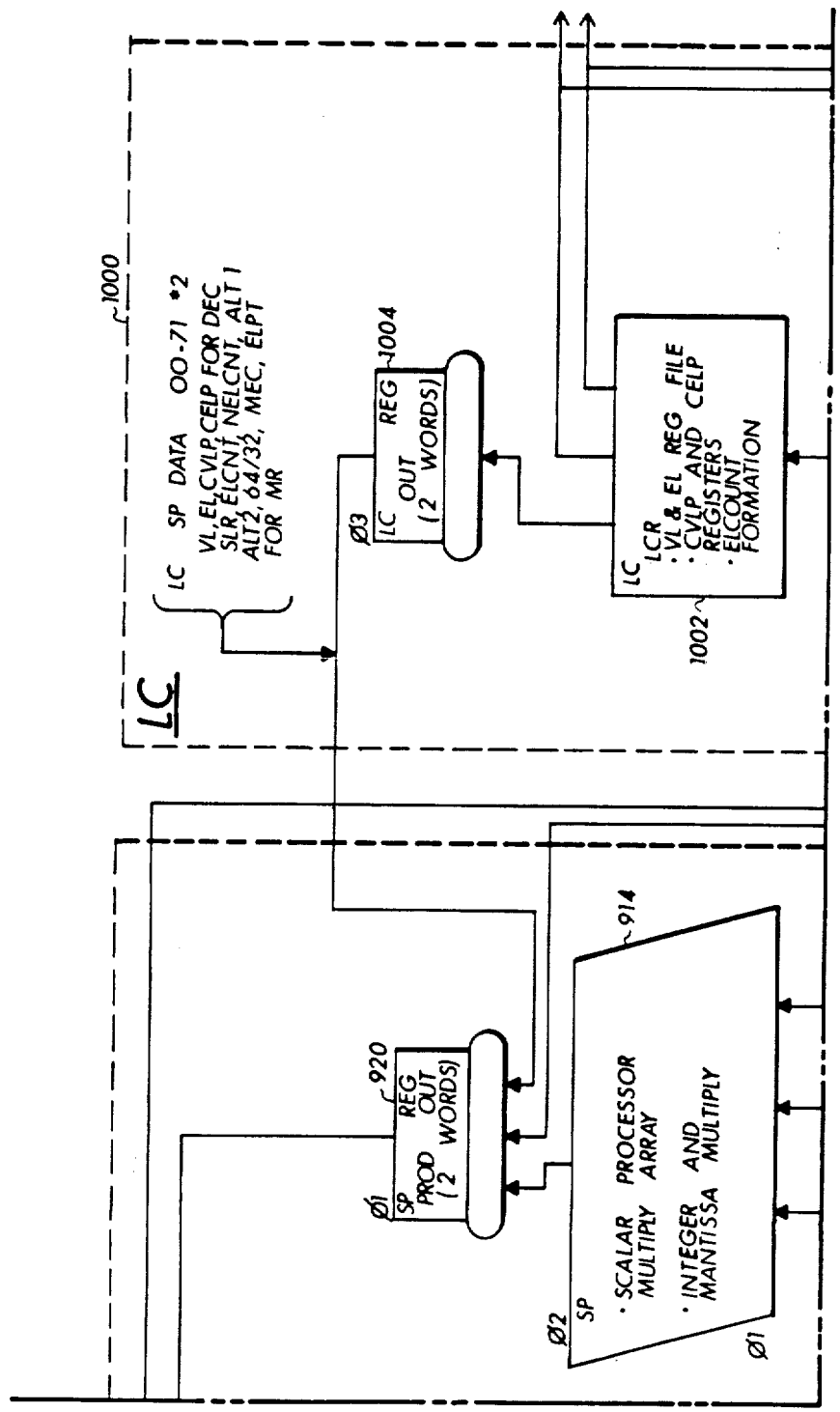

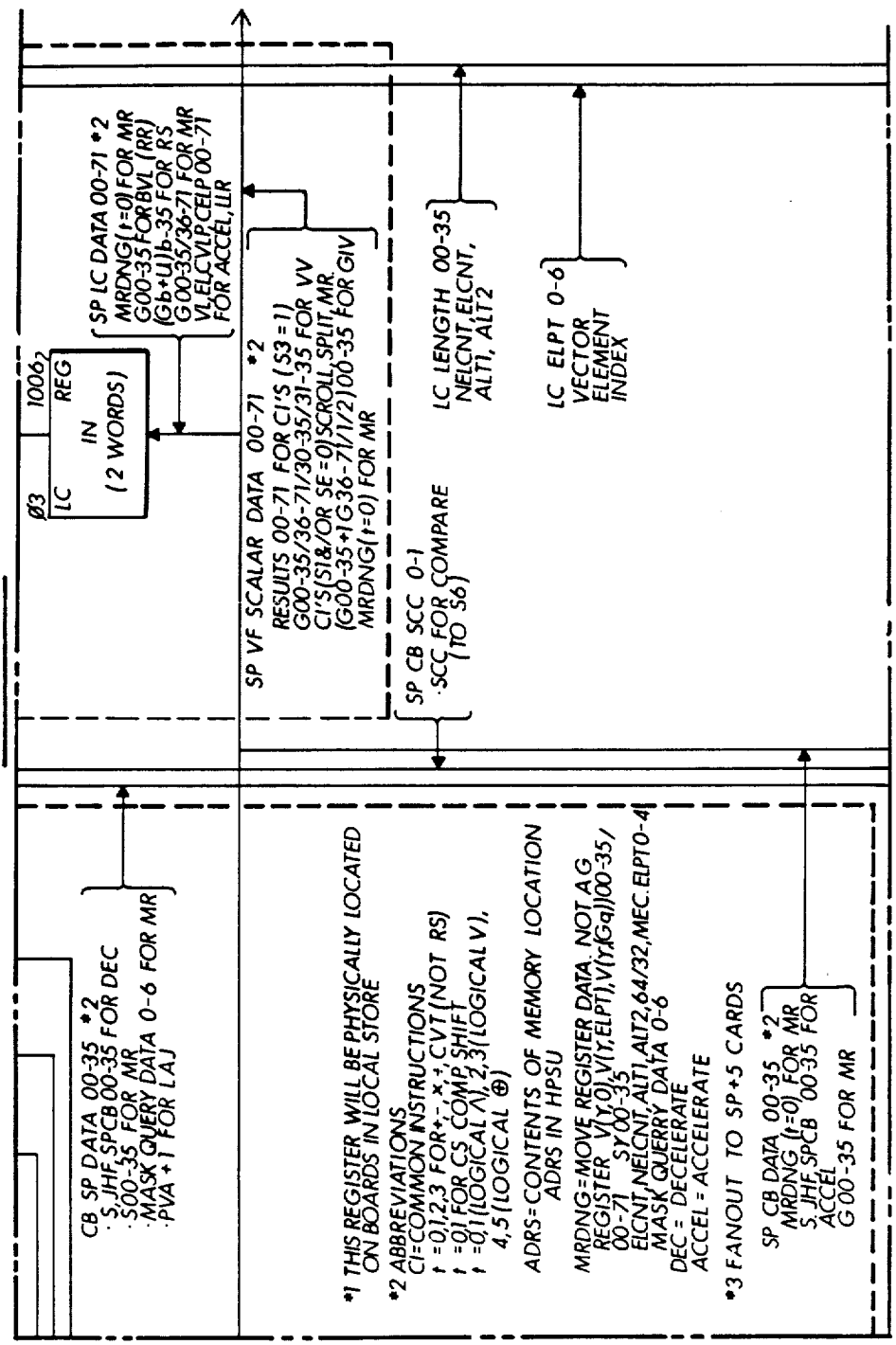

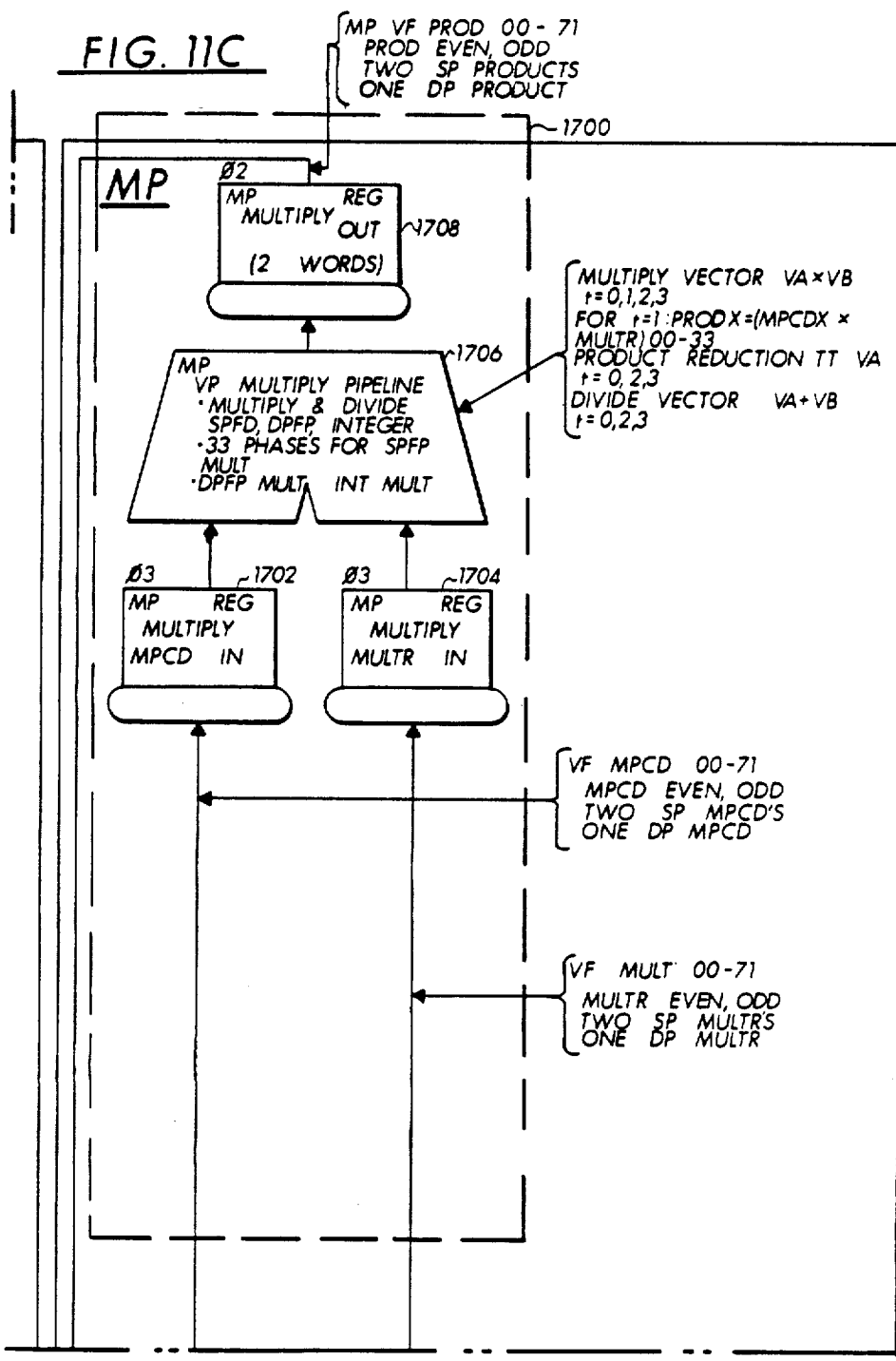

VECTOR FILE DATA ORGANIZATION

| VF RAM | 1 FILE | 8 BLOCKS | | | | | | | |
|---|---|---|---|---|---|---|---|---|---|
| 16 FILES | → | 0,1 | 2,3 | 4,5 | 6,7 | 8,9 | 10,11 | 12,13 | 14,15 |
| SHADOW AREA (0,1) | | 16,17 | 18,19 | 20,21 | 22,23 | 24,25 | 26,27 | 28,29 | 30,31 |
| DITTO (10) | | 32,33 | 34,35 | 36,37 | 38,39 | 40,41 | 42,43 | 44,45 | 46,47 |
| DITTO (11) | → | 48,49 | 50,51 | 52,53 | 54,55 | 56,57 | 58,59 | 60,61 | 62,63 |

VF READ OUTPUT REG'S

| 1391 PIPE \ CARDS | VF PRIMARY 1392 | VF SECONDARY 1393 |
|---|---|---|
| AP | AUGEND | ADDEND |
| MP | MULTIPLICAND | MULTIPLIER |
| MV | — | MOVE |
| VS | STORE (PRI) | STORE (SEC) |
| SC | SCALAR | — |

FIG. 14

VF TIME SLOT PATTERNS

| SLOT PATTERN | 0 | 1 | 2 | 3 | 4 | 5 | 6 | 7 |
|---|---|---|---|---|---|---|---|---|
| 1 | RD | | | | | | | |
| 3 | RD | WR | | | | | | |
| 4 | | WR | | | WR | | | |
| 5 | | | RD | | | WR | | |
| 6 | RD | | | WR | | | | |
| 7 | | WR | WR | | | | | |
| 8 | | RD | WR | | | | | |
| 9 | | RD | | WR | | | | |

TIME SLOT REG FORMAT-1

| WRITE | ENCODED PIPE SELECT | | | RESERVE | AUTO RELEASE | INIT RD/WR MUX CTR | DLY INIT RD/WR MUX CTR | TEMP RESERVE |
|---|---|---|---|---|---|---|---|---|
| 0 | 1 | 2 | 3 | 4 | 5 | 6 | 7 | 8 |

BIT 0 - WRITE - TS IS FOR VF WR. USED FOR VF ADRS SEL. ETC.
BITS 1-3 - WHICH PIPE THE TS IS ASSIGNED TO USED FOR VF ADRS SEL. ETC.
BIT 4 - TS IS IN USE. USED FOR TS PATTERN SEARCH.

TIME SLOT REG FORMAT - 2

| WRITE | ENCODED PIPE SELECT | | | RESERVE | AUTO RELEASE | INIT RD/WR MUX CTR | DLY INIT RD/WR MUX CTR | TEMP RESERVE |
|---|---|---|---|---|---|---|---|---|
| 0 | 1 | 2 | 3 | 4 | 5 | 6 | 7 | 8 |

- BIT 5 — USED BY AP & MP TO EITHER RELEASE OR RE-RESERVE A WR TS.
- BIT 6 — INITIATES VF RD OR WR MUX ADRS COUNTER.
- BIT 7 — SAME AS BIT 6 - BUT DELAYED.
- BIT 8 — ONLY IN SOME TS REG'S & FOR 1 CYCLE. USED BY PATTERN SEARCH FOR RESERVE - CANCEL/RESERVE.

DIAGRAM OF VF ORGANIZATION & ADDRESSING

SCIENTIFIC PROCESSOR VECTOR FILE ORGANIZATION

This is a continuation of co-pending application Ser. No. 761,137 filed on July 31, 1985, now abandoned.

RELATED PATENT APPLICATIONS

The following co-pending patent applications are assigned to the assignee of this invention, and their teachings are incorporated herein by reference:

TITLE: HIGH PERFORMANCE STORAGE UNIT

Inventor: James H. Scheuneman
Ser. No.: 596,130
Filed: Apr. 2, 1984
Patent No.: U.S. Pat. No. 4,633,434
Issued: Dec. 30, 1986

TITLE: MULTIPLE UNIT ADAPTER

Inventor: James H. Scheuneman
Ser. No.: 596,205
Filed: Apr. 2, 1984
Ser. No.: 047,579
Filed: May 5, 1987
Patent No.: U.S. Pat. No. 4,722,052
Issued: Jan. 26, 1988

TITLE: A SCIENTIFIC PROCESSOR

Inventors: Louis B. Bushard Larry L. Byers James R. Hamstra Charles H. Homan Archie E. Lahti John T. Rusterholz
Ser. No.: 761,201
Filed: July 31, 1985

BACKGROUND OF THE INVENTION

A. Field of the Invention

This invention relates to programmable digital data processors, with particular emphasis on those processors which process vector instructions. More specifically, it relates to those data processors which utilize a pipelined approach to the processing of these vector instructions.

In the development and advance in data processing systems there has been an ever-increasing emphasis on increasing the data processing rate. This desire for higher speed has led us to different approaches to accomplish this. One approach was to use separate processing elements to overlap the execution of instructions. This, of course, has automatically brought with it the need of asynchronous operation, since the separate processors accomplished their individual tasks in different time periods. This asynchronous operation of the multiple processing elements caused memory access conflicts, since many times there were concurrent requests for the same memory location. This invention then specifically relates to a system for organizing the memory of scientific data processing system using the pipeline approach.

B. Prior Art

Increases in computing rates have been achieved through advances in physical technologies relating to the hardware and hardware functioning. The advent of integrated circuitry gave rise to circuit components operable at very fast computing rates, and capable of performing complex functions while remaining economically feasible. Access and cycle time of memories has also been markedly decreased.

In addition to the changes and developments in the hardware, there have been continuing advances in the organizational architecture of data processing system that provide for ever-increasing utilization of the various data processing components. While many examples of optimization of utilization of the components comprising the data processing systems can be described, attention will be directed to the concept of increasing data processing rates by providing for an overlap of macro instruction execution.

It has been known for some time that instructions in data processing systems that basically provide for the steps of instruction procurement and instruction decoding, instruction operation, and storage of results, could be overlapped such that once an existing instruction was procured from the memory and the current instruction passed into execution, the memory would be available for accessing for the next instruction. This allowed overlapping of the instructions primarily based upon the availability of access to the memory unit. This type of instruction overlapping was most common in the data processors that involved so-called hardwired instruction repertoire and control.

Later developments lead to data processing systems that utilized a repertoire of macro instructions each of which performed some predetermined function in the data processing system. The macro instructions, characteristically at the user level, are programmed and stored in a memory unit for retrieval and execution as the particular program progresses. In systems of this type, a control store is utilized for storing sets of micro instructions, each one of the stored sets relating to an associated one of the macro instructions. The execution of a selected macro instruction is accomplished by the execution of each one of the micro instructions in the corresponding set thereof. In the execution of each micro instruction, control signals are produced and fed to the Arithmetic Processor to control the processing of data in accordance with the controls specified by each of said micro instructions. In current technology the control store would be either a Random Access Memory (RAM) or a Read Only Memory (ROM). However, the RAM has the relative advantage of providing versatility for the control store in that the sets of micro instructions may be altered by simply writing new control micro instructions into the control memory.

BRIEF DESCRIPTION OF THE INVENTION

A. Objects of the Invention

Accordingly, it is an object of the present invention to provide an improved vector file organization for a scientific vector processor.

It is also a object of the present invention to provide a vector file organization with an adequate data transfer capability to support multiple execution pipelines simultaneously operating in a scientific vector processor.

It is a further object of the invention to provide a scientific processor Vector File organization wherein multiple vectors are concurrently accessed and executed by multiple pipelines.

It is a further object of this invention to provide a storage system for use in a pipelined vector processor wherein the storage system is equally divided into a plurality of storage files, separate portions of which may be simultaneously accessed by various individual execution pipelines.

It is also an object of the invention to provide a scientific processor Vector File organization which provides simultaneous access to any one of a plurality of vector files by all of a plurality of execution pipelines.

It is also an object of this invention to provide an improved Vector File organization for use in a pipelined vector processor wherein the system includes a unique manner of segmenting the file storage and of assigning the storage elements addresses.

It is a further object of this invention to provide an improved Vector File organization for use in a pipelined vector processor wherein the system is capable of granting and maintaining access to the vector files by the use of programmable registers.

It is also an object of this invention to provide an improved Vector File organization for use in a pipelined vector processor which processor, by concurrent storage access and execution of multiple instructions in multiple pipelines, allows instruction execution overlap.

B. Summary of the Invention

An improved Vector File organization for use in a pipelined vector processor is disclosed. Each of a multiplicity of pipelines concurrently accesses and executes different logical processes under the direction of different instructions in the pipelined processor. As would be expected in such a system, there are often cases where more than one of the multiple pipelines simultaneously requests a memory access. Such simultaneous memory access requests may be handled in a far more expeditions manner by granting access to various portions of the separated storage system by the multiple pipelines.

For example, the present invention comprises a structure in which the file storage of a scientific processor is divided into segments. The segments, in turn, are divided into elements and the elements assigned to various addresses. In addition, an improved method of granting and maintaining access to this segmented vector file is provided. Basically, the Vector Files are programmable registers. There are sixteen files of vector registers. Each file has space for sixty-four 36-bit words. Each file may be formatted as sixty-four single word elements (operands) or as 32 double word elements. The disclosed Scientific Vector Processor (SVP) has six independent instruction execution pipelines. All of these six pipelines access the Vector Files for either source operands, which are also known as read operands or destination operands, which are also known as write operands, or both. Because of the unique storage organization of this invention, any combination of execution pipes can be active at any given time. The vector files of the present invention are organized into eight independent blocks. Each block has a random access memory (RAM), an address register and a write data register. Each of the eight blocks can perform a read or a write operation on each clock cycle. Each block holds certain pairs of words of each of the sixteen files. For example, the first block holds words 0, 1, 16, 17, 32, 33 48 and 49. The next block holds the succeeding word pairs (each eighth pair). The second pair includes 2, 3, 18, 19, 34, 35, 50 and 51 and this pattern continues for the remaining six blocks of the single file. Of course, this pattern is also carried through in the remaining fifteen files. Although in most illustrations made throughout this specification only one copy of the Vector Files is shown, actually there are two copies provided. These copies, while termed the primary and the secondary Vector Files, are really equal in capability. The purpose of the copies is to allow the simultaneous reading of the two operands that are required by most instructions. For example, during a vector multiply instruction (executed by multiply pipeline) the multiplicand is read from the primary copy and the multiplier is read from the secondary copy. The read registers are associated with a pipeline rather than a vector file block. Writing of the corresponding multiply product element into both copies of the file occurs nine clock cycles later.

A time slot management mechanism consisting of 8 registers performs the following functions:

1. It allocates and reserves access to the Vector Files by the execution pipe for each individual instruction executed.

2. It maintains the reservation and its purpose (read or Write) until the instruction is completed.

3. It forms or selects Vector File read or write address for both primary and secondary copies. The address consists of the appropriate 4-bit file number plus certain other fields. Once formed an address is used to reference all 8 blocks, in what is termed a pass.

4. It selectively initiates one of 5 counters used to select read data from the 8 RAMs, and 5. It selectively initiates one of 6 counters used to route write data to 1 of the 8 write data registers.

The 8 time slot register (0-7) are connected together in a serial loop. All the reservation data is advanced from register to register each clock cycle. As each reservation is in register 0 it is used to form or select a Vector File address. Typically a reservation is maintained for 4 passes or 32 clock cycles and is released by being cleared upon completion of the instruction.

BRIEF DESCRIPTION OF THE DRAWING

The following objects and the above summary will be more readily understood when read in conjunction with the accompanying drawings in which:

FIG. 6 is a block diagram of the clock distribution system of the Scientific Data Processing System;

FIG. 7 is a timing diagram showing the various clock phases at the output of the CPG gate array;

FIG. 8 is a block diagram of the Scalar Processor Module of the Scientific Data Processing System;

FIG. 9 is a block diagram of the Vector Processor Module of the Scientific Data Processing System;

FIG. 12 is a similar diagram pictorially showing the RAM of the Vector File with a word breakdown of a single file into eight blocks;

FIG. 14 is a table showing the locations of the Vector File read output registers.

FIG. 21, which includes FIGS. 21A and 21B, positioned as shown, illustrates the format of a time slot register;

Figure 1:
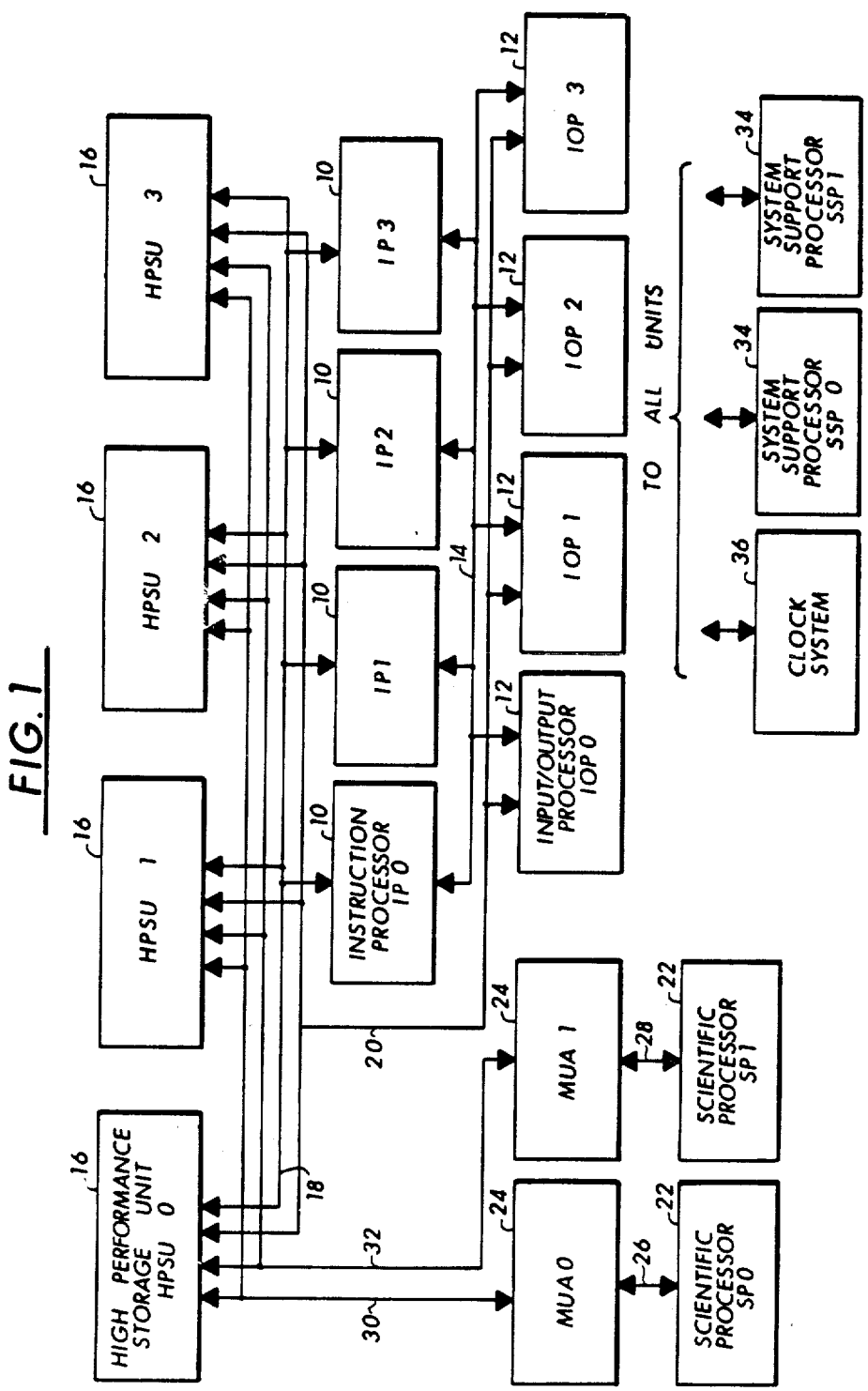
FIG. 1 is a system block diagram of the over-all digital data processing system in which the invention can be utilized.

The following detailed description will be more easily comprehended when it is read in conjunction with the attached glossary and the accompanying drawings.

| GLOSSARY | |
|---|---|
| TERM | DEFINITION |
| ACCEL | ACCELERATE |
| ADD | ADDEND |
| ADRS | ADDRESS |
| AG | ADDRESS TRANSLATION AND GENERATION SECTION |
| AI | ATTENTION INTERRUPT |
| ALT1 | FIRST ALTERNATE ELEMENT COUNT |
| ALT2 | SECOND ALTERNATE ELEMENT COUNT |
| ALU | ARITHMETIC LOGIC UNIT |
| AP | ADD PIPELINE SECTION (ALU) |
| ARM | AVAILABILITY, RELIABILITY, MAINTAINABILITY |
| AST | ACTIVITY SEGMENT TABLE |
| AUG | AUGEND |
| BFR | BUFFER |
| BNA | BANK NOT AVAILABLE |
| BPA | BOARD-PAIR ASSEMBLY |
| BRKPT | BREAKPOINT |
| BUF | BUFFER |
| BVL | BEGIN VECTOR LOOP |
| CB | CONTROL BLOCK SECTION |
| CAM | CONTENT ADDRESSABLE MEMORY |
| CELP | CURRENT ELEMENT LOOP POINTER |
| CBS | CB MEMORY SHADOW RESIGER |
| CLK | CLOCK |
| CLR | CLEAR |
| COMPR | COMPARE |
| CNT | COUNT |
| CONSIM | CONCURRENT FAULT SIMULATOR |
| CP | CHARACTERISTIC PIPELINE |
| CPG | CLOCK PULSE GENERATOR |
| CTRL | CONTROL |
| CVLP | CURRENT VECTOR LOOP POINTER |
| DBL | DOUBLE |
| DEC | DECELERATE |
| DES | DESIGNATOR |

| -continued | |
|---|---|
| GLOSSARY | |
| TERM | DEFINITION |
| DEST | DESTINATION |
| DIAG | DIAGNOSE INSTRUCTION |
| DP | DOUBLE PRECISION |
| DP-FLP | DOUBLE PRECISION FLOATING POINT |
| DP-FXP | DOUBLE PRECISION FIXED POINT |
| EDC | ERROR DATA CAPTURE |
| EI | EXTERNAL INTERRUPT |
| EIF | EXECUTE IMMEDIATE FUNCTION |
| EL | ELEMENT LOOP |
| ELCNT | ELEMENT COUNT |
| ELPT | ELEMENT POINTER |
| EM | EXTERNAL MONITOR INTERFACE SECTION |
| EN | ENABLE |
| FDD | FIELD |
| FLP | FLOATING POINT |
| FXP | FIXED POINT |
| G | G REGISTER |
| GA | GATE ARRAY |
| GIV | GENERATE INDEX VECTOR |
| GOP | G OPERAND |
| HPP | HIGH PERFORMANCE PACKAGING TECHNOLOGY |
| HPSU | HIGH PERFORMANCE STORAGE UNIT |
| IA | INSTRUCTION ADDRESS |
| IDX | INDEX |
| IF | INSTRUCTION FLOW SECTION (CONSISTS OF IFA, IFB, & IFC) |
| IFA | INSTRUCTION FLOW ADDRESSING |
| IFB | INSTRUCTION FLOW BUFFER |
| IFC | INSTRUCTION FLOW CONTROL |
| IIH | INTERFACE INTERRUPT HANDLING |
| INTFC | INTERFACE |
| INTRP | INTERRUPT |
| INVLD | INVALIDATE |
| INTIN | INTERRUPTING INSTRUCTION |
| IP | INSTRUCTION PROCESSOR |
| IOP | INPUT/OUTPUT PROCESSOR |
| IPL | INITAL PROGRAM LOAD |
| IPCU | INSTRUCTION PROCESSOR COOLING UNIT |
| IUCT | IN UNIT CARD TEST |
| LSB | LEAST SIGNIFICANT BIT ($2^{35}$ IN 36 BIT WORD) |
| JHF | JUMP HISTORY FILE |
| LC | LOOP CONTROL SECTION (VECTOR LOOP & EL LOOP REG.) |
| LCS | LOOP CONTROL STACK |
| LD | LOAD |
| LS | LOCAL STORAGE (4K RAM IN LOCAL STORE) |
| LSI | LARGE SCALE INTEGRATED CIRCUITS |
| LSS | LOCAL STORAGE STACK SECTION) |
| LSSA | LOCAL STORAGE SEGMENT ADDRESS |
| MCI | MAINTENANCE AND CONTROL INTERFACE |
| MEC | MAXIMUM ELEMENT COUNT |
| MFLOPS | MILLION FLOATING POINT OPERATIONS PER SECOND |
| MK | MASK PROCESSOR SECTION |
| MP | MULTIPLY PIPELINE |
| MPS | MULTIPLY PIPELINE SECTION |
| MPCD | MULTIPLICAND |
| MPI | MULTIPLE PASS INSTRUCTION |
| MRDNG | MOVE REGISTER DATA-NOT A G REGISTER |
| MSB | MOST SIGNIFICANT BIT ($2^0$ IN 36 BIT WORD) |
| MUA | MULTIPLE UNIT ADAPTER |
| MULTR | MULTIPLIER |
| MUX | MULTIPLEXER |
| MV | MOVE PIPELINE SECTION |
| MZ | STRIP SIZE |
| NELCNT | NEXT ELEMENT COUNT |
| NLJ | NON-LOCAL JUMP |
| NOVLP | NONOVERLAPPED INSTRUCTION |
| INST | |
| OLM | ONLINE MAINTENANCE |
| PAR | PROGRAM ADDRESS REGISTER (ADDRESS OF NEXT INSTRUCTION) |
| PT | POINTER |

-continued

GLOSSARY

| TERM | DEFINITION |
|---|---|
| PCC | POWER AND COOLING CONTROL |
| RAM | RANDOM ACCESS MEMORY |
| RDY | READY |
| REG | REGISTER |
| RR | REGISTER-TO-REGISTER INSTRUCTION FORMAT |
| RSLT | RESULT |
| RS | REGISTER-TO-STORAGE INSTRUCTION FORMAT |
| SAEV | STORE ALTERNATE ELEMENTS VECTOR |
| ST | STORE BUFFER SECTION |
| SC | SCALAR/VECTOR DATA TRANSFER CONTROL SECTION |
| SCC | SCALAR CONDITION CODE |
| SCG | SINGLE CONDITION GENERATE |
| SCU | SYSTEM CLOCK UNIT |
| SCS | SCALAR LOCAL STORE |
| SEDC | SCANSET ERROR DATA CAPTURE |
| SEL | SELECT |
| SI | STORAGE INTERFACE |
| SIMD | SINGLE INSTRUCTION MULTIPLE DATA |
| SLR | STORE LOOP CONTROL REGISTER |
| SP | SCIENTIFIC PROCESSOR |
| SP ALU | SCALAR PROCESSOR ARITHMETIC LOGIC SECTION |
| SP-FLP | SINGLE PRECISION FLOATING POINT |
| SP-FP | SINGLE PRECISION FIXED POINT |
| SPCB | SCIENTIFIC PROCESSOR CONTROL BLOCK |
| SPM | SCALAR PROCESSOR MODULE |
| SPP | SYSTEM PROBE PANEL |
| SRC | SOURCE |
| SS | SCANSET SECTION |
| SSI | SMALL SCALE INTEGRATED CIRCUITS |
| SSP | SYSTEM SUPPORT PROCESSOR |
| ST | STORE BUFFER SECTION |
| SUNA | STORAGE UNIT NOT AVAILABLE |
| SV | STORE VECTOR |
| SVX | STORE VECTOR INDEXED |
| TC | TIMING CHAIN |
| TM | TRACKING MEMORY |
| TS | TIME SLOTS |
| UCM | UNIT CONTROL MODULE |
| UIA | UNIVERSAL INTERFACE ADAPTER |
| UP | UNIVERSAL PROCESSOR INTERFACE SECTION |
| UPI | UNIVERSAL PROCESSOR INTERFACE |
| USC | UNIT SUPPORT CONTROLLER |
| VC | VECTOR CONTROL SECTION |
| VCW | VECTOR CONTROL WORD |
| VF | VECTOR FILE |
| VL | VECTOR LOOP |
| VL | VECTOR LOAD |
| VOP | VECTOR OPERAND |
| VP | VECTOR PROCESSOR |
| VPM | VECTOR PROCESSOR MODULE |
| VPW | VECTOR PARAMETER WORD |
| VS | VECTOR STORE |
| VSO | VIRTUAL SEGMENT OFFSET |
| VS | VECTOR STORAGE SECTION |
| VV | VECTOR STORAGE INSTRUCTION FORMAT |
| WO | WORK CAPACITY |
| WR | WRITE |

DETAILED DESCRIPTION OF THE PREFERRED EMBODIMENT

A. Conventions

Throughout the following description and in the accompanying drawings there are certain conventions employed which are familiar to those that are skilled in the art to which this invention pertains. Within the application, reference numerals will be affixed to elements and items discussed. To the extent possible, elements that are referenced in different figures within the application will bear the same reference numeral. It will be understood that elements may be described or mentioned in others of the identified co-pending applications, but will not necessarily bear the same numeral reference between applications.

The signal lines, control lines, and cables are accorded unique descriptive names which will remain invariant to the extent possible at all points of usage and reference within the application. Signal lines generally enter at the bottom of a Figure and exit at the top, resulting in a general flow from bottom to top. Signals and signal lines which enter or exit the logic circuit of a Figure all together from outside the circuit are accorded descriptive symbolism in order that they may be clearly recognized.

Block diagrams will be utilized to describe the interrelationship of identified functional units. Interconnecting lines between functional units can represent a single wire conductor, a group of parallel conductors, or a general path of data for control flow. In block diagrams the arrowhead will indicate the direction of signal flow for the particular data or control signals identified. Where appropriate, emphasis for particular lines may be added to indicate specific paths, for example through the use of heavy lines; through addition of numerals indicative of the number of conductors or parallel signal paths involved, or by indication of unique function. Within block diagrams specific logical symbols for well known components such as adders, selecters, registers, multiplexers, and the like may be utilized without further explanation of the specific elements, since such elements are so well known in the art as they require no additional explanation.

For purposes of discussion of specific logic block diagrams or functional logic circuits, it is convenient to have a reference of signal levels. For many it is desirable to relate logical "1" and logical "0" to signal levels. In general, a logical "1" will be the equivalent of a High signal, and a logical "0" will be the equivalent of a Low signal, but it should be clearly understood that as given input signals pass through networks of logic circuits that the relationship of logical "1" and logical "0" as they relate to numerical values will not directly relate. Accordingly, the clearest understanding of logic block diagrams and functional logic circuits will be most clearly understood from a consideration of the High and Low signal interrelationships. It is of course understood that these representations of signal levels are illustrative and relate to a rendition of the preferred embodiment, but that alternative signal level representations can be used without departing from the scope of the invention.

In more detailed logic block diagrams, block symbols will be utilized to represent various functions. For the lower order logical functions such as AND, designated A; OR; Inversion designated I, and the like, the designations within the block symbols of the respective functions is readily understandable to those skilled in the art. More complex macro logical functions, for example multiple input Exclusive-OR, designated XOR, may not be readily apparent from the block symbol, and in such cases the macro function will be further defined through functional logic diagrams or truth tables or a combination thereof.

As a further aid in understanding the logic block diagram representations, a system of arrowhead representation at the input and output of the block symbols will assist in defining the function of the associated logic element. In this regard, the combination of signals represented at the input of a logic element in combination with the designation of the logical function will define the signal level or levels at the output of the logic element. At the input, a closed half-arrowhead represents a response to a High signal and an open half-arrowhead indicates that the response is to a Low signal. Accordingly, if an AND circuit (A) is represented having two or more closed half-arrowheads at the input, it will be satisfied only when all input lines receive High signals. In a similar manner, if an A symbol is illustrated having two or more open-arrowhead inputs, the function designated is that of Low AND, and will be satisfied only when all inputs are Low. It is apparent that this Low AND function is logically equivalent of a High OR function. In a similar fashion, the half-arrowhead convention is applied to define output relationships.

In physical construction of circuits to implement the designated logic functions, it is not uncommon to provide signal inversion in conjunction with the combinatorial logic function. In such cases, the fact of inversion will be designated by the state of the half-arrowhead on the output line or lines. In this way, it will be understood that a Low AND circuit having two or more open half-arrowhead output terminal only when all input signals are Low. If the Low AND circuit has a closed half-arrowhead at its output, it is understood that inversion takes place within the logic block element, and the High output signal will be derived only when all input signals are low. It is also common for circuits implemented through integration techniques to provide an output signal and the complement of the output signal on separate lines. This representation in the logic block diagram symbol will result in an open half-arrowhead and a closed half-arrowhead at the output of the block. Generally speaking the right-most half-arrowhead in the symbolic representation will be considered as the true output and will define the function of the element, and the left-most half-arrowhead will be considered as the complement thereof. For example, an A symbol having two or more closed half-arrowhead will be considered as the complement thereof. For example, an A symbol having two or more closed half-arrowhead inputs and a right-most closed half-arrowhead would normally indicate an AND function of High signals resulting in a High output signal at the closed half-arrowhead only when all input signals are High. If this same symbol utilizes an open half-arrowhead at the left, a Low output signal will be derived at that point when all input signals are High. It is not deemed necessary to illustrate specific circuits to accomplish the basic logic functions since various type of electronic circuits can be utilized and are well known to those skilled in the art.

In the event detailed logical circuit diagrams of macro symbols are illustrated, the symbol having a straight bottom and rounded top, sometimes referred to as the "bullet" symbol, represents the logical AND function; and the symbol having a curve at the input and the curve pointed output, often referred to as the "shield" symbol, represents circuits that perform the logical OR function. For the AND function and straight line input or the dot, represents a High AND, and results in a High output signal when all input signals are High. The open circles adjacent the input terminals indicate that the circuit responds to Low signals. The straight line output is equivalent to the closed half-arrowhead representation described above, and the circle output designation is equivalent to the open half-arrowhead representation. This type of symbol is well known in the art and need not be described further.

B. The System

FIG. 1 is a system block diagram of the over-all digital data processing system in which the invention can be utilized. The over-all system is essentially modular, and provides for parallel processing.

For the configuration illustrated, from one to four Instruction Processors IP0 through IP3, each labelled 10, can be utilized. Each IP can, for example, be a Type 3054-00 unit available from Sperry Corporation, or such other Instruction Processor available commercially as would be compatible. The IP provides basic mode and extended mode instruction execution, virtual machine capability, and contains two buffer memories (not shown), one an operand buffer, and the other an instruction buffer. Each IP is functional to call instructions from memory, execute the instructions, and, in general, does data manipulation. The IP also executes instructions to set up input and output data buffers and channel access control.

In conjunction with the IPs, from one to four Input-/Output Processors IOP0 through IOP3, labelled 12, can be utilized. The interconnections between the IPs and the IOPs, collectively labelled 14, are in fact direct connections between each unit, and the interconnection is not bused. Each IOP can be a Type 3067-00 unit available from Sperry Corporation, or an equivalent type of processor. The IOPs handle all communications between the IPs, and the memory systems, and the peripheral subsystems (not shown). In this type of configuration, the IPs function as the system Central Processing Units, and the IOPs act as CPUs to handle all of the communications. The IPs and IOPs are commonly referred to as the 1100/90 system.

From one to four High Performance Storage Units HPSU0 through HPSU3, each labelled 16, can be utilized in the system. Each HPSU is a free-standing unit with eight memory Banks, each Bank containing 524K words. Each HPSU provides four Instruction Processor (IP) ports for providing communication paths to the IPs, both for reading and writing, shown collectively as interconnection paths 18. Again it should be understood that interconnection between each HPSU and each IP is directly cabled, and is not bused. Each HPSU also includes four Input/Output Processor (IOP) ports for interconnection with the IOPs. These interconnections are shown collectively as interconnections 20 and are direct cables between each HPSU and each IOP. The IP and the IOP ports are each two-word read and write interfaces, where each word contains 36 data bits and four parity bits. Each HPSU also includes at least one Scientific Processor (SP) port, and in the embodiment shown has two such SP ports. Each SP port has a four-word data interface. The IOP and the IP interfaces operate on a 60 nanosecond clock cycle and the SP interface operates on a 30 nanosecond clock cycle. The HPSU is a novel memory system and is described in one or more of the above identified co-pending incorporated patent applications.

Error Correction Code (ECC) is used internally to each HPSU to provide single-bit error correction and double-bit error detection.

In the embodiment illustrated one or two Scientific Processors SP1 and SP2, labelled 22, can be utilized. If a single SP is used with a single HPSU, it may be coupled directly to the SP port of such HPSU. When two or more HPSUs are used with an SP, it is necessary to provide a Multiple Unit Adapter (MUA) for each SP. In this configuration MUA0 and MUA1, each labelled 24, are coupled to SP0 and SP1, respectively, across interface lines 26 and 28. MUA0 is coupled to each HPSU through interconnection paths 30, and MUA1 is coupled to each HPSU through intercommunication path 32.

Each SP functions under direction of one or more of the IPs to perform scientific type calculations in a support mode. In this regard, the IPs can be considered to be host processors and the SPs can be considered to be support processor, all operating through common storage.

The over-all system maintenance and supervision is accomplished through one or two System Support Processors SSP0 and SSP1, each labelled 34, which are connected to all units of the system. The SSP is available commercially and is utilized in the Sperry Corporation 1100/90 Systems. In general, it is understood that each SSP performs the function of a hardware maintenance panel for the system. The display and getting of information, the activation of most maintenance facilities, selecting modes of operation and the like, is done at the control section of the SSP.

A Clock System 36 is utilized to maintain synchronous operation of the entire system. Clock and synchronizing signals are sent to each IP as well as each HPSU, each IOP, and each SP. The clock interface includes signals and commands from the IP for controlling clock rates, clock mode, cycle count, and other capabilities of the clock. The clock system is novel, and is described in one of the above identified co-pending patent applications.

Intercommunication between units is essentially on a Request and Acknowledge basis, and the interfaces will be described in more detail as appropriate.

C. High Performance Storage Unit (HPSU)

Figure 2:
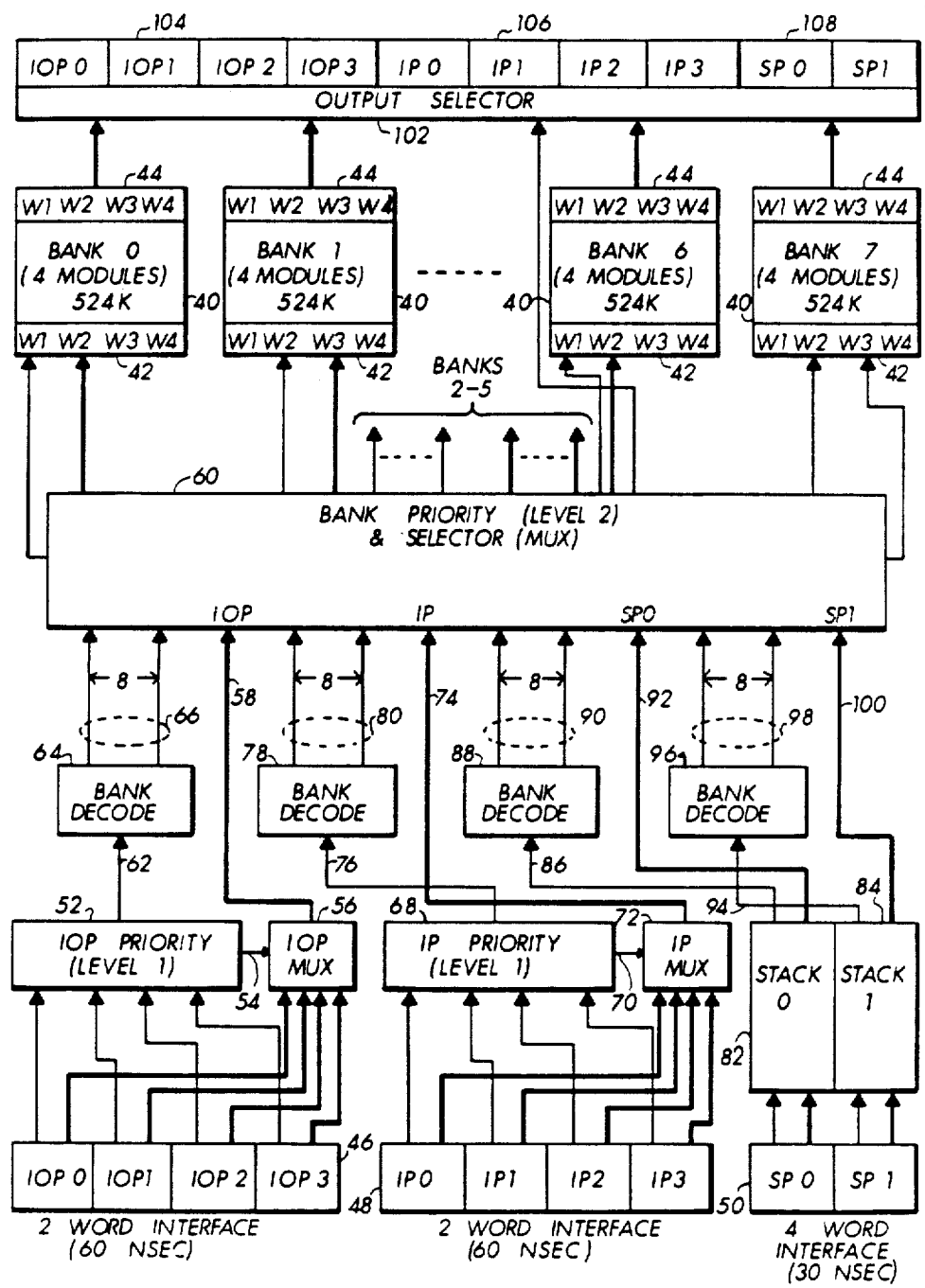
FIG. 2 is a simplified functional blocked diagram of the High Performance Storage Unit.

FIG. 2 is a simplified functional block diagram of the High Performance Storage Unit.

The HPSU is a storage device that is commonly accessible by the IPs, the IOPs, and the SPs via the MUAs. The various devices that can be coupled to the HPSU can have differing interface systems and operational rates.

In the preferred embodiment, the HPSU utilizes eight Banks of storage devices, generally identified as Bank 0 through Bank 7 of which Banks 0, 1, 6, and 7, are illustrated, and each labelled 40 since they are essentially similar. Though not specifically illustrated, each Bank is comprised of four Memory Modules and each Bank has a total capacity of 524K words. A word in memory is 44-bits, of which 36-bits are data bits and the remaining eight bits are utilized for Error Correction Code (ECC) check bits and parity bits. Each Bank 40 is arranged for receiving four words W1, W2, W3, and W4, labelled 42 for writing, and four such words labelled 44 when read out.

The memory Banks 40 include the addressing circuitry, the storage cells, the timing circuits, and the driver circuits, and can be constructed from commercially available components, it being understood that the accessing rate must accommodate the interface rates with the attached units.

The heavy lines indicate directions of data flow, and the single lines indicate control flow.

At the input, the HPSU has an IOP interface 46 which can accommodate up to four IOP units, at the four IOP ports labelled IOP0 through IOP3. It also has an IP interface 48 which can accommodate up to four IPs at the four IP ports designated IOP0 through IOP3.

The IOP ports 46 and the IP ports 48 each operate on a two-word interface at a clock rate of 60 nanoseconds.

The HPSU also has an input SP interface 50 which can accommodate two SPs at the two ports labelled SP0 and SP1. The SP ports each function with a four-word simultaneous interface and operate at a clock rate of 30 nanoseconds.

The request and control signals from the IOP ports 46 are passed to the IOP Priority 52, which functions to select the particular IOP to be given priority of access to the memory system. The selection is passed on line 54 to the IOP MUX 56 which functions to select the appropriate data and address information to pass on line 58 to the Bank Priority and Selector (MUX) 60. The control signals provided on control path 62 drive the Bank Decode 64 for selecting one-of-eight control lines 66 for providing control signals for making Bank selection.

In a similar manner, the IP ports 48 provide control signals to the IP Priority 68, which provides control signals on control line 70 to the IP MUX 72 for selecting the data and address signals that will be provided on path 74. Similarly, the control signals on line 76 to the Bank Decode 78 results in signals being provided to select one of eight lines 80 for controlling Bank selection.

The two SP ports 50 are each arranged to store requests in Stack 0 labelled 82, and in Stack 1 labelled 84. SP requests and data are temporarily held in Stack 0 and Stack 1 awaiting availability of the memory system. In essence, Stack 0 and Stack 1 are each a first-in-first-out (FIFO) circulating buffer. The request information feeds out of Stack 0 on line 86 to the Bank Decode 88 which provides a one-of eight selection and data passes on line 92 to the Bank Priority Selector 60. Similarly, request information passes on line 94 to the Bank Decode 96 for making selections on lines 98, while the data passes on line 100.

The Bank Priority and Selector functions to select between the IOP, IP, and the two SP requests presented to it for accessing memory. It also functions to control the Output Selector 102 when reading is to take place. The HPSU has an IOP output 104 capable of handling four IOP ports IOP0 through IOP3. It also has an IP output 106 capable of handling four IP ports labelled IP0 through IP3. Finally, it has an SP output 108 capable of handling two SP output ports labelled SP0 and SP1. Data rates and timing at the output ports 104, 106, and 108 are similar to those for the input ports previously described.

D. Multiple Adapter (MUA)

Figure 3:
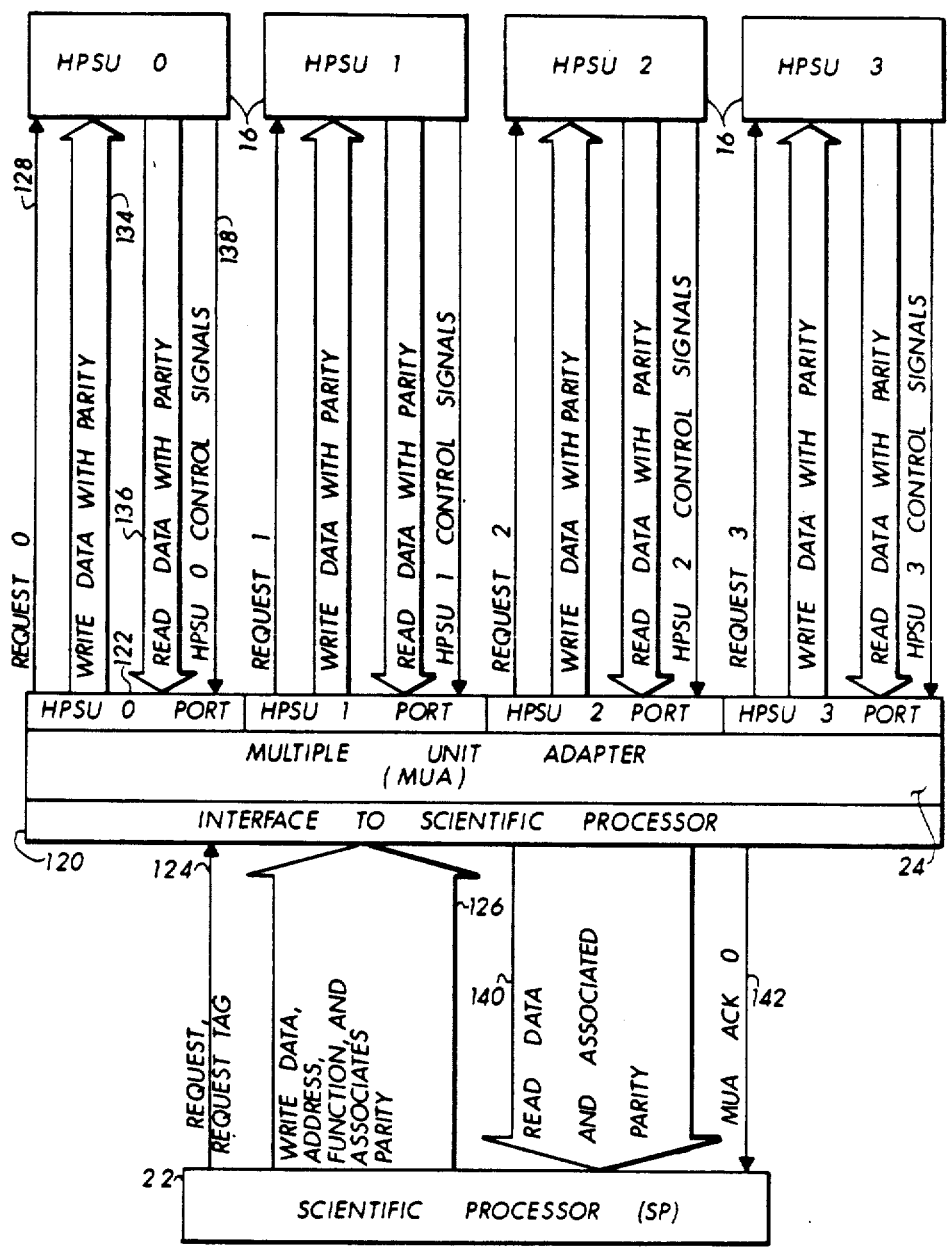
FIG. 3 is a simplified block diagram of the Multiple Unit Adapter (MUA) for providing selective interconnection of a Scientific Processor to one of up to four High Performance Storage Units.

FIG. 3 is a simplified block diagram of the Multiple Unit Adapter (MUA) for providing selective interconnection of a Scientific Processor to one of up to four High Performance Storage Units.

The MUA 24 has an Interface to Scientific Processor 120 and up to four HPSU ports 122, each adapted for interconnection to an associated HPSU 16.

A Scientific Processor (SP) issues Request signals on control path 124 to the MUA. For a write operation, the write data, address, function, and associated parity are provided via cable 126. The MUA can accumulate up to eight requests from the SP without acknowledgement, and the requests and the associated data are stored in a first-in-first-out (FIFO) stack (not shown).

For purposes of example, if it is assumed that the SP has designated HPSU0, and the request is determined by the MUA to be the next request to be processed, a Request 0 will be provided on control path 128 to HPSUO. Recalling that this will be only one of several requests that can be provided to HPSUO, it will be honored when its priority is selected. If the function is write, the write data with parity will be provided on cable 134. If the function is to read, the read data with parity will be passed from HPSUO on cable 136 to the MUA. Upon completion of the requested function, the HPSUO control signals will pass via control path 138 to the MUA. When the MUA establishes that the current request is a read, the read data and associated parity will pass on cable 140 to the SP. As each request is passed on to the selected HPSU, an MUA Acknowledge 0 (ACK 0) signal will be passed on control path 142 to the SP, thereby indicating that the stack has room for one more request.

When the MUA has passed eight requests to an HPSU without acknowledgement the MUA ceases requesting until an Acknowledge 1 (ACK 1) control signal is received on control cable 138.

The control and data path lines for HPSU1, HPSU2, and HPSU3, would function in a similar manner. When the SP requests access to a different HPSU, all outstanding requests to the first HPSU must be serviced prior to the MUA processing requests to a different HPSU.

All data and control signals from the SP are passed on to the HPSU, with the exception of a few special control signals, and all data and control signals from the HPSU are passed on to the SP. The SP data word is four 36-bit words wide. Along with the data field, an address field of 22-bits and a function field of 6-bits are sent with the request. Odd parity is provided for every 9-bits of data, making the SP data word transmission a total of 160-bits, the address field a total of 25-bits, and the function code field a total of 7-bits.

E. Scientific Processor (SP)

Figure 4:
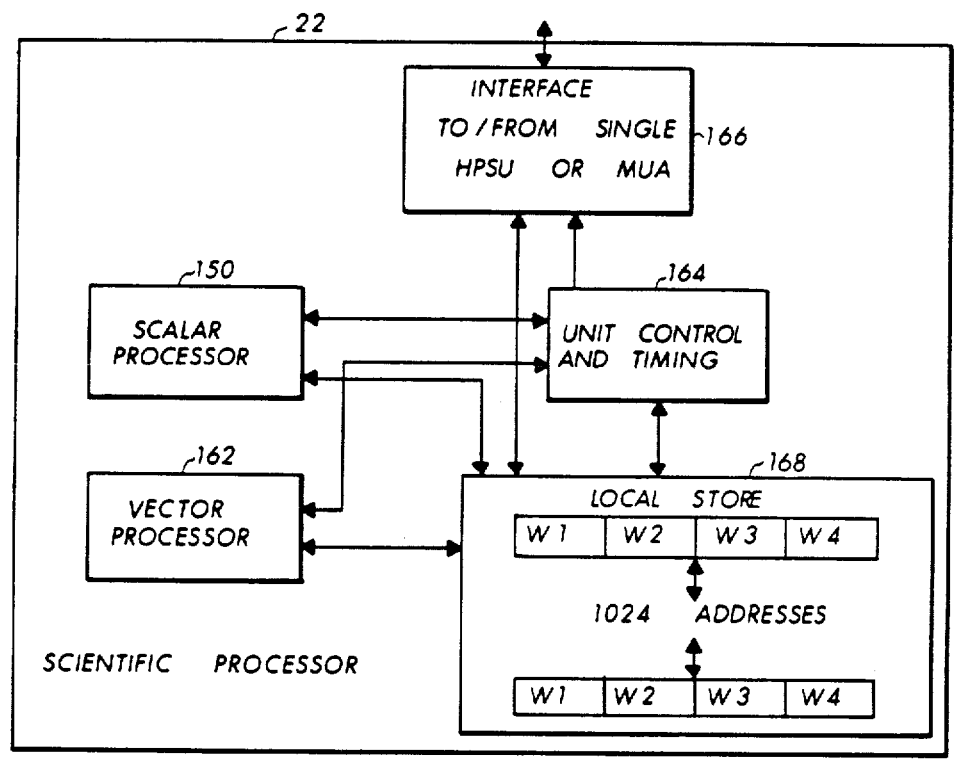
FIG. 4 is a simplified block diagram of the Scientific Processor.

FIG. 4 is a simplified block diagram of the Scientific Processor.

Basically, the SP 22 is a subsystem defined as an attached processor of the host system. The SP has been optimized for the high speed execution of floating-point vector arithmetic operations. It is intended to execute user code only and is not intended to run an executive program. It does not require a control program nor does it have any privileged modes of operation. The SP includes distinct modules, the Scalar Processor 150, the Vector Processor 162, the Unit Control Timing 164, the Interface 166, and the Local Store 168.

The Vector Processor Module 162 performs vector calculations. The Scalar Processor Module 150 performs scalar operations, and also has the over-all control function, including instruction fetch and issue. Generally speaking, the Scalar and Vector processor instructions require both modules to execute.

The Local Store 168 in the preferred embodiment comprises a high speed random-access memory (RAM) 4,096 words. The arrangement is such that four words W1 through W4 are accessed simultaneously, yielding an addressable range of 1,024 addresses. The Local Store 168 is used primarily for the storage of frequently used scalar variables, and it should be noted as distinguished from the relatively large dedicated memory sections in prior art support processors, the minimal storage being rendered sufficient through the coupling to the plurality of HPSUs.

The general system environment and background described with regard to FIG. 1 through FIG. 4 is set forth to indicate the complexity of the data processing system in which the subject invention may be utilized.

The Scientific Processor (SP) 22 is part of a tightly coupled multiprocessor system. The primary purpose of the SP is the high speed execution of vector floating-point arithmetic. As described with reference to FIG. 1 two new units have been designed to allow operation of SP(s) in the 1100/90 multiprocessor system. They are the High Performance Storage Unit HPSU(s) 16, and the Multiple Unit Adapter MUA(s) 24.

Each SP only runs user programs that are set up in an HPSU by one of the IPs. Programs and portions of programs set up for execution on an SP are called activities.

In a minimum multiprocessor system configuration utilizing an SP, the HPSU is central to the system. The SP, the IP, and the IOP all interface to the HPSU. The SP has one special port that allows requests each clock cycle, while other ports only accept requests on a two clock cycle basis. Multiple requests for the same module address range within the HPSU are honored on a certain priority basis and in that case, some of the requesters must wait their turn.

The System Clock Unit. (Clock System 36) provides logic clock signals to the HPSU, the SP, the IP and the IOP. Each System Support Processor (SSP) 34 has its own clock source (not shown). The SSP is directly connected to the HPSU, the IOP, the IP and to the SP. It is also indirectly connected to the System Clock Unit 36 and to the Instruction Processor Cooling Units (not shown).

Figure 5:
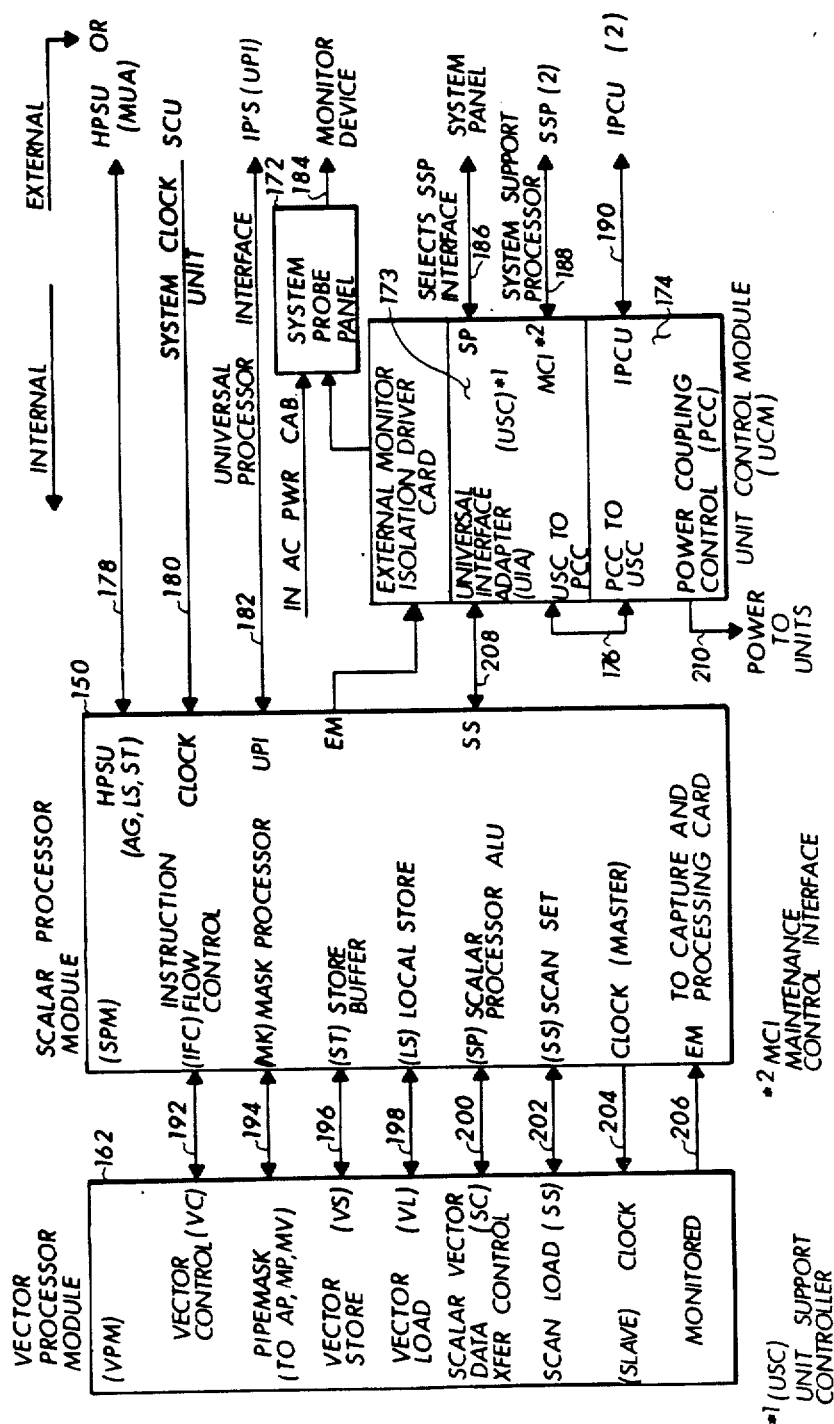
FIG. 5 is a block diagram of the internal and external interfaces of the Scientific Processor.

FIG. 5 is a block diagram of the Scientific Processor (SP) internal and external interfaces. In the Scientific Processor, which is designated as a Type 3068-0 unit available from Sperry Corporation, there are four internal units or modules, namely the Vector Processor Module (VPM) 162, the Scalar Processor Module (SPM) 150, the Unit Control Module (UCM) 170, and the System Probe Panel 172. The Unit Control Module 170 is further partitioned into two logical entities, the Unit Support Controller (USC) 173 and the Power and Cooling Controller (PCC) 174. The USC-to-PCC 176 is an internal interface.

The interfaces are shown as lines, but it should be understood that this is illustrative only, and that physically there may be multiple conductors and circuits utilized. The external interfaces, are the interfaces to other units within the central complex, and are listed down the right hand side of the FIG. 5. The read/write data interface via line 178 to the HPSU or MUA interfaces with the SPM 150. The System Clock Unit (SCU) interfaces via lines 180 with the SPM 150. The Universal Processor Interface (UPI) and the Instruction Processor(s) is via line 182. The interface at the System Probe Panel 172, to monitoring device is via line 184. The input from the System Panel interfaces with the Unit Support Controller 173 of the Unit Control Module 170 via line 186. One of the things that this interface does is to select the next interface. There are two interfaces via line 188 to two different System Support Processor 34 which interface with the Maintenance Control Interface (MCI) of the Unit Support Controller 173. The last external interface 190 is from the Power and Cooling Controller 174 to the Instruction Processor Cooling Units (not shown). It selects one of the two cooling units and monitors environmental conditions.

The internal interfaces are the interfaces going between the VPM 162 and the SPM 150. The instruction interface 192 is from the Instruction Flow Control (IFC) logic section of the SPM to the Vector Control (VC) section of the VPM. The mask interface 194 is from the Mask Processor (MK) of the SPM to the Add Pipe (AP) the Multiply Pipe, (MP), and the Move Pipe (MV) in the VPM. These are described in detail in co-pending applications listed at the start of this application. The Vector Store (VS) interface 196 provides information stored in the Vector Files to the Store Buffer (ST). It also provides information from main storage, or HPSU or Local Store. The Vector Load (VL) interface 198 transfers data from the Local Store (LS) section to the Vector Load (VL), from where it is transferred into the Vector Files. The source of the data in this case is from the HPSU or from the Local Store. The Scalar Vector Data Transfer (SC) interface 200 transfers data from the SPM to the VPM. It also writes Scalar instructions into the Vector Files or broadcasts G operands. Further it transfers data in the opposite direction from the VPM to the SPM. This data could be elements from Vector Files or results or reduction instructions. The Scan Set (SS) interface 202 couples the master Scan Set card in the SPM to the slave Scan Set card in the VPM. The clock interface, 204 is from the master clock card in the SPM to the slave clock card in the VPM. The last interface shown is the External Monitor (EM) interface 806. It involves a collection of key logic signals in the VPM. These signals are routed to the SPM and ultimately they go out of the external monitor interface of the System Probe Panel 172.

There is another internal interface 208 from the SPM to the Unit Support Controller 173. This is the universal interface adapter interface from the Unit Support Controller and connects to the Scan Set card of the SPM. An interface 210 is provided between the Unit Control Module 170 and the power and cooling units (not shown).

FIG. 6 is a block diagram of the Clock Distribution System. The System Clock Unit (SCU) 36 provides multiple drives, with a separate drive for each IP, IOP and HPSU in the system.

The interface 180 from the System Clock Unit SCU comes into the Master unit clock card 220 in the Scalar Processor Module. From there, clock signals are sent to the Slave unit clock card 222 in the Vector Processor Module. The unit clock cards 220 and 222 serve their respective modules. The lines 224 and 226 emanating from the unit clock cards represent the drive to remaining logic cards within the associated module. Typical logic cards 228 and 230 in each module receive the clock drive from the System Clock Unit, and utilize two Clock Pulse Generator (CPG) Gate Arrays (GA) on each card to derive the four phase clock signals identified as phases 1, 2, 3, and 4 (01, 02, 03, 04) for distribution on that logic card. In other words, each logic card has its associated CPG circuits.

FIG. 7 is a timing diagram of the Clock Phases. The clock phases illustrated occur at the output of the two Clock Pulse Generators on each logic card. The low portion of each clock pulse is the active level. The time low is the period of the clock pulse that is considered its active time. Four clock pulse phases are generated. The times shown are common to all four phases. The clock cycle is 30 nanoseconds from start of one clock pulse in a phase to the start of the next occurring pulse in that phase. The clock pulses are nominally 5½ nanoseconds in duration. The time duration from the beginning of a clock signal in one clock phase to the beginning of a clock signal in the next subsequent clock phase is nominally 7½ nanoseconds.

While not illustrated, some of the features of the high performance technology utilized to construct the SP will be described. Emitter coupled subnanosecond circuits including gate arrays and Small Scale Integrated (SSI) circuits, known in the industry as the 100K family are used. The gate array circuits have 168 logic gates, 48 logic pins and power dissipation of up to 5 watts. The SSI packages, or chips as they are called, have 21 logic pins and power dissipation of up to a quarter of a watt. Most of the IP gate arrays plus 13 additional types that were designed specifically for this SP are used. The printed circuit cards have space for a maximum of 227 SSI circuit packages. Gate arrays require two SSI locations. The printed circuit cards are never fully populated with gate array circuit packages or chips, since a certain number of spare circuit locations for possible logic changes were provided. A certain number of spare card pins are also reserved for logic changes and modifications. The printed circuit cards are 11.3 inches wide by 10.8 inches deep, with logic, power, and ground connectors on three edges. Connectors on the rear edges of the cards plug into a back panel of the module through use of a conventional connector. The two side edges of the cards connect to the side panel of the module with Zero Insertion Force (ZIF) connectors. The cards are paired together and have two connectors for logic signals between the cards of the pair. These circuit packages are water cooled by a cold plate between the cards of the pair. The two cards and the cold plate are assembled together into a subassembly part for insertion into the card module. Each module has room for a maximum of 52 cards or 26 card pairs. The SPM has 48 cards and the VPM has 52 cards. Ribbon cable and coaxial cable are used for logic interconnect between the SPM and VPM.

FIG. 8 is a block diagram of the Scalar Processor Module (SPM) of the SP. FIG. 9 is a block diagram of the Vector Processor Module (VPM) of the SP. These two drawings taken together illustrate the machine organization at the block diagram level. First, as to the block diagrams in general, there are a total of sixteen major logic sections with eight sections in each of the SPM and the VPM. Several additional auxiliary sections are present, such as the Scan Set and the external monitor however, these will be referred to only briefly since they are not necessary for a complete understanding of the invention. Each section has a two alphabetic character identifier. This identifier is also used as a prefix for all logic signals originating in that section. In the SPM (FIG. 8), break out to the eight logic sections is on a functional basis. These sections provide architectually, required functions. In the VPM (FIG. 9) design of sections was done to accommodate parallel pipelined operation for higher performance.

The sixteen logic sections mentioned for FIG. 8 and FIG. 9 indicate their relative positions on the later detailed block diagrams. Referring now to the SPM block diagram of FIG. 8, there is illustrated the Instruction Flow Control (IF) section 400; the Local Store (LS) section 300; the Control Block (CB) section 500; the Mask Processor (MK) section 600; the Address Generation (AG) section 700; the Store Buffer (ST) section 800; the Scalar Processor Arithmetic Logic Unit (SPALU) 900; and the Loop Control (LC) section 1000. These sections will be described in detail below.

The VPM sections are shown in FIG. 9, and again the relative positions of the various sections are indicated as they will be related to more detailed block diagrams. These major sections include the Vector Control (VC) section 1100; the Vector Load (VL) section 1200; the Vector File (VF) section 1300; the Scalar Vector Data Transfer Control (SC) section 1400; the Vector Store (VS) section 1500; the Add Pipeline (AP) section 1600, which includes an Arithmetic Logic Unit (ALU); the Multiply Pipeline (MP) section 1700; and the Move Pipeline (MV) section 1800. A special control section Conflict Detection and Resolution 1900 is utilized to resolve conflicts between the various pipelined sections. The present application is directed to the Vector File (VF) section 1300 of this Vector Processor Module.

Figure 10A:
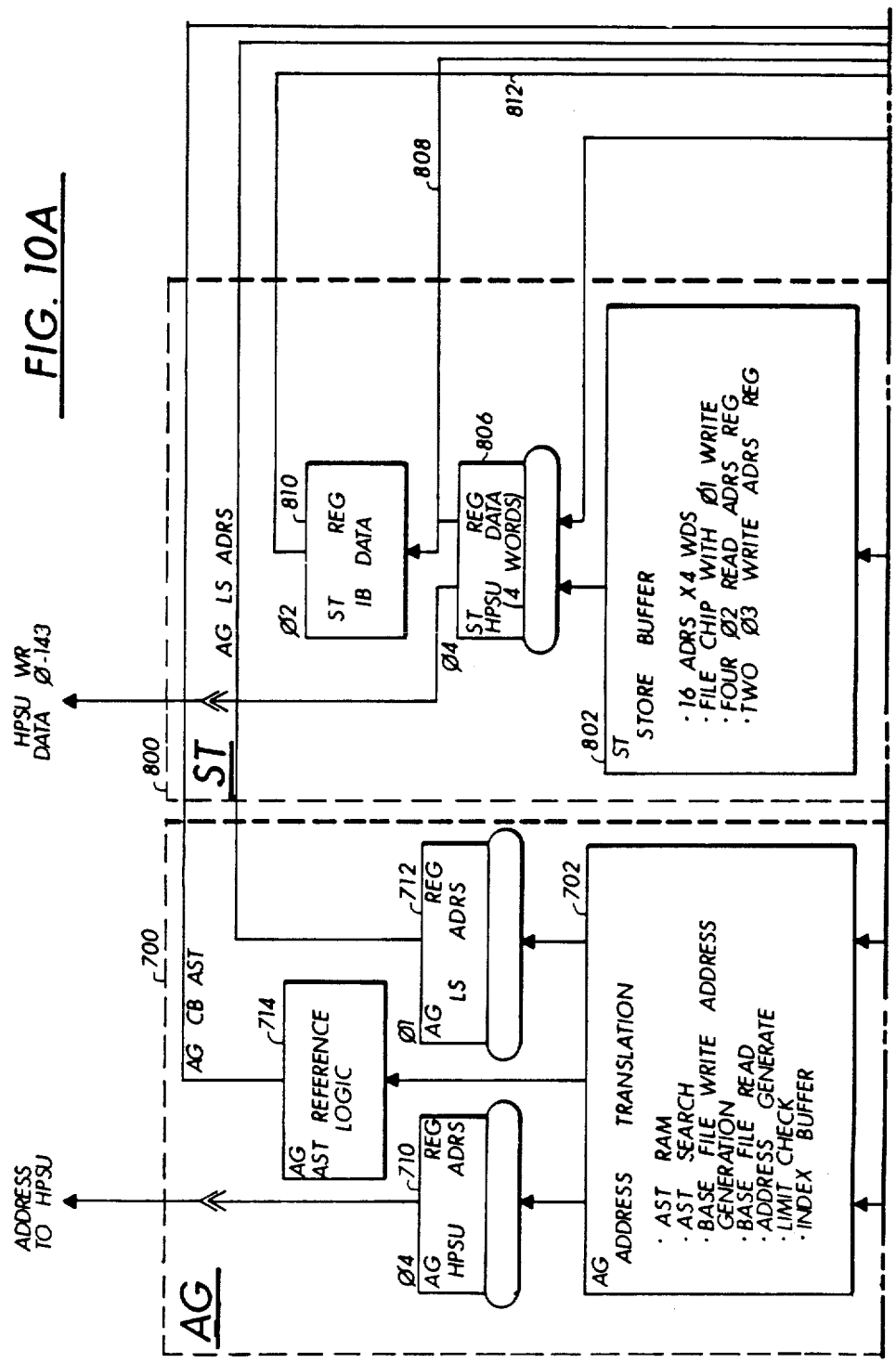
FIG. 10, which includes FIGS. 10A to 10I, positioned as shown, is a more detailed logical block diagram of the Scalar Processor Module of FIG. 8.
Figure 10:
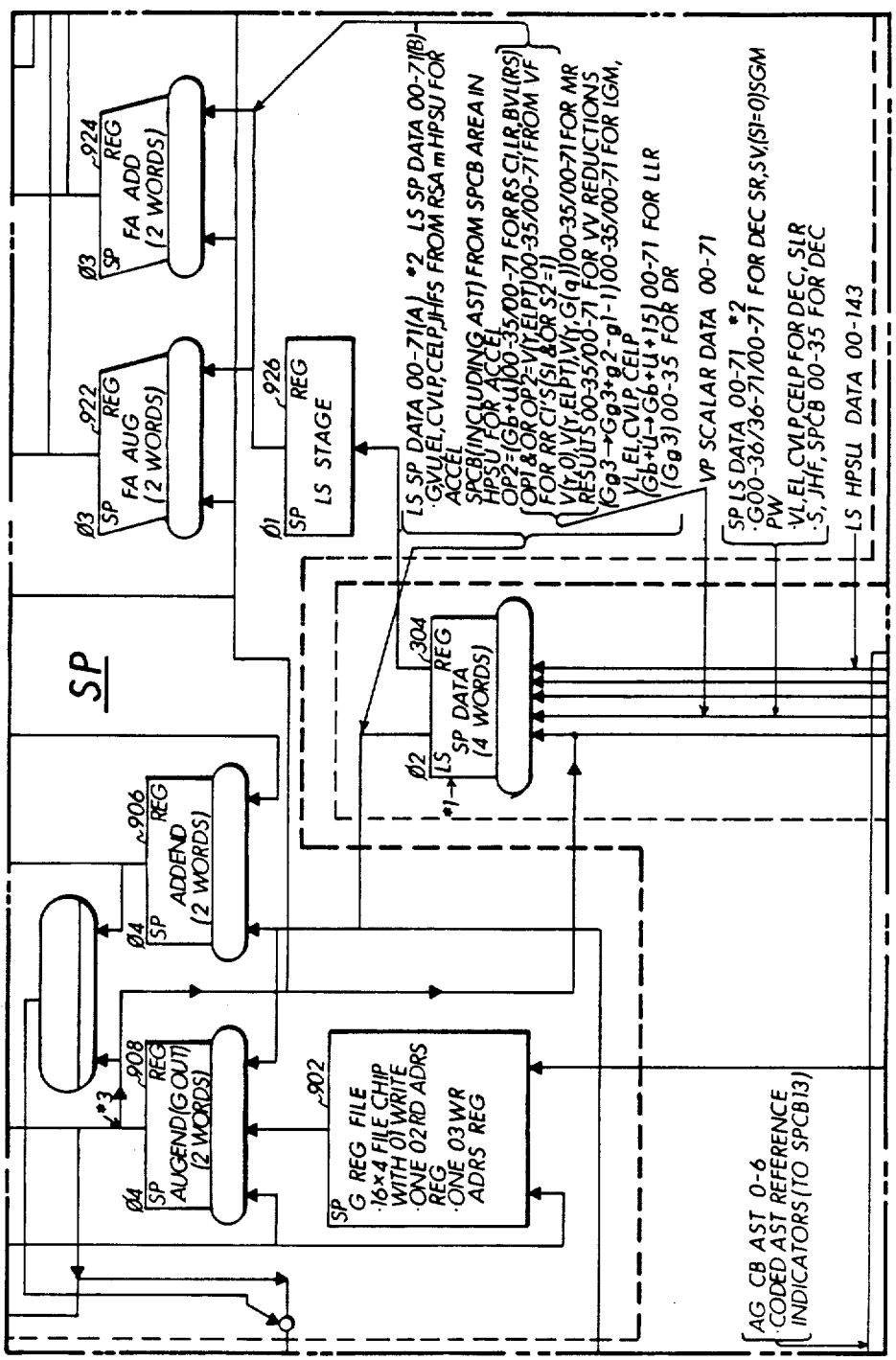
Figure 10G:
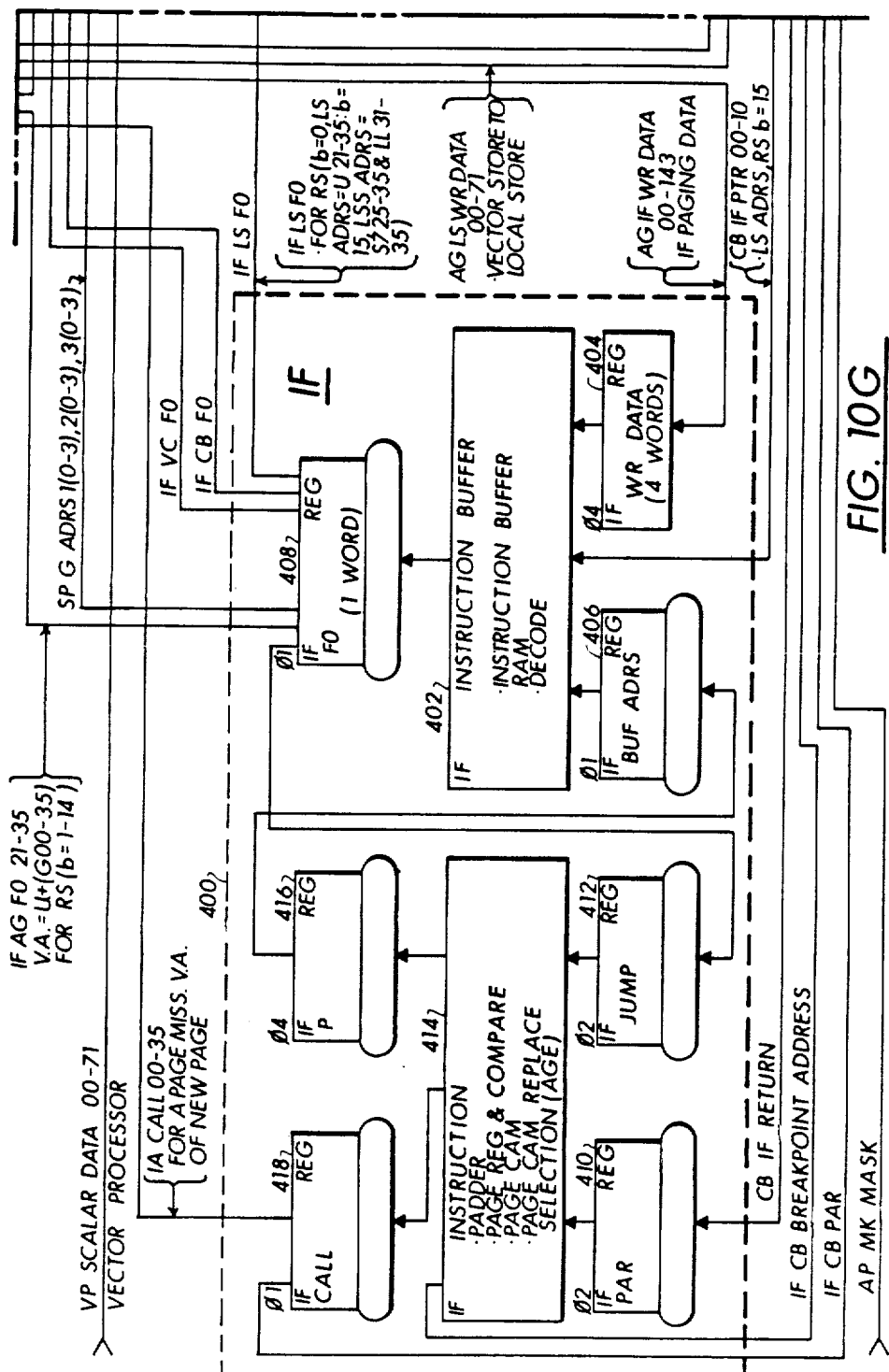
Figure 10H:
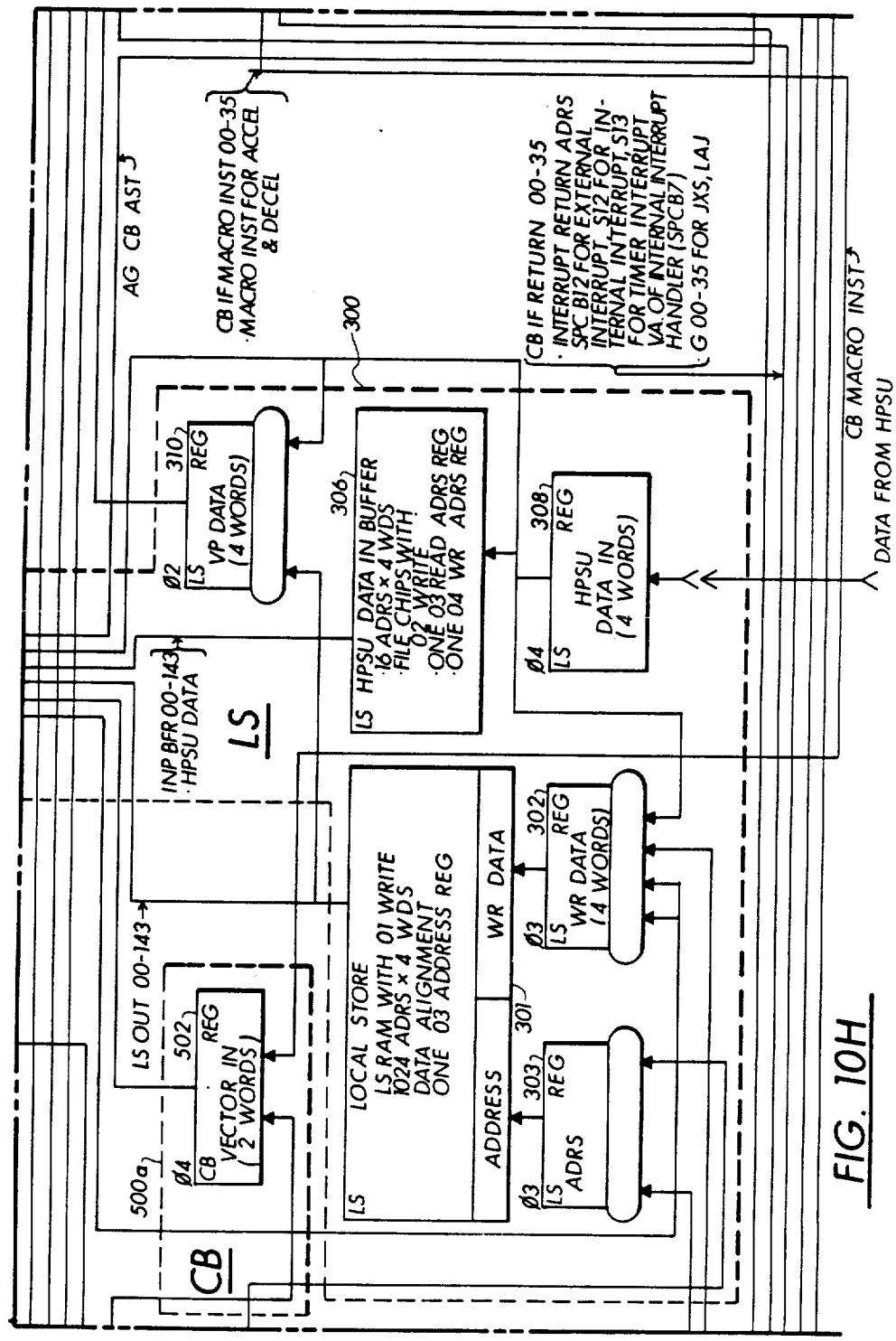
Figure 101:
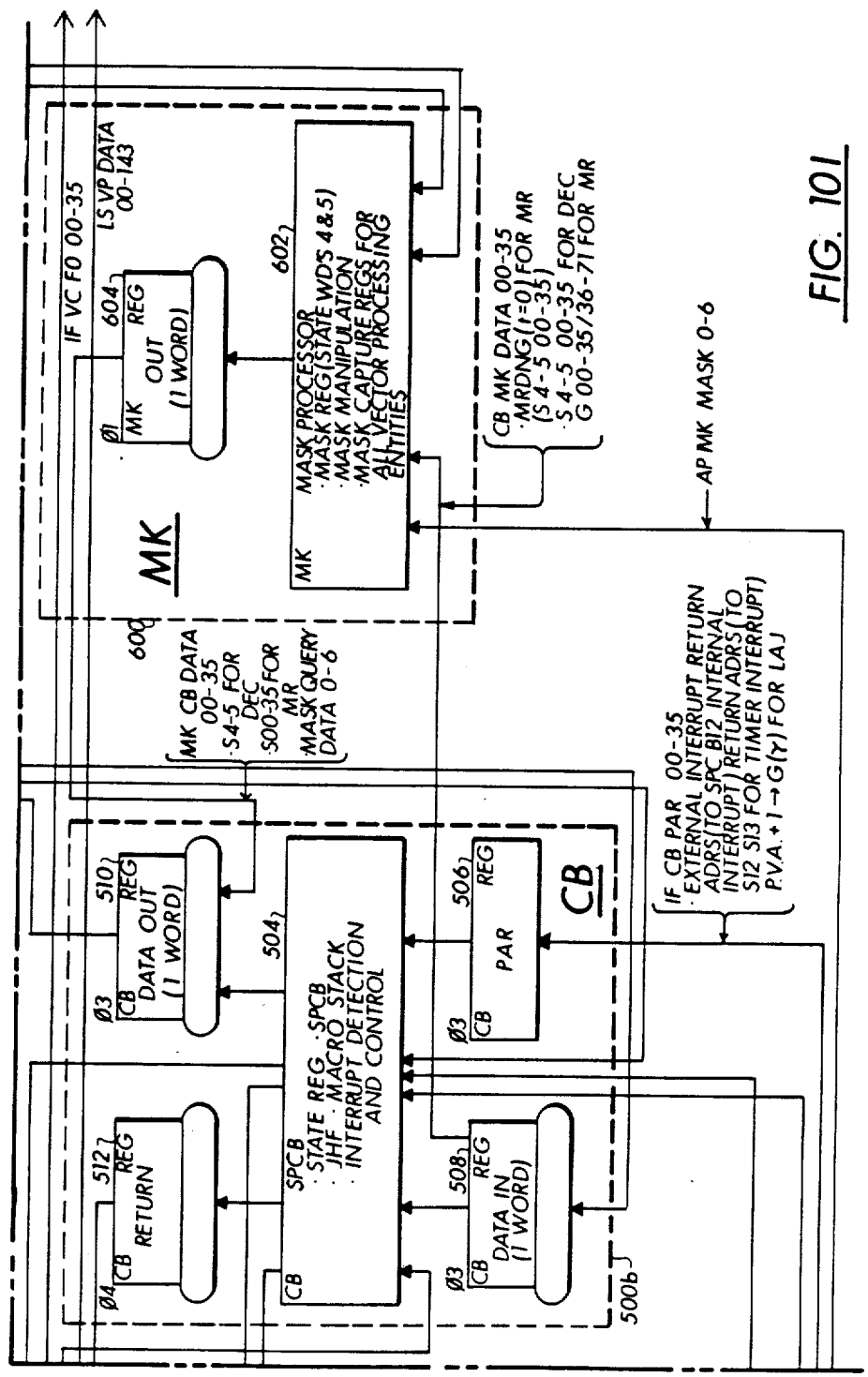
Figures 11, 11H:
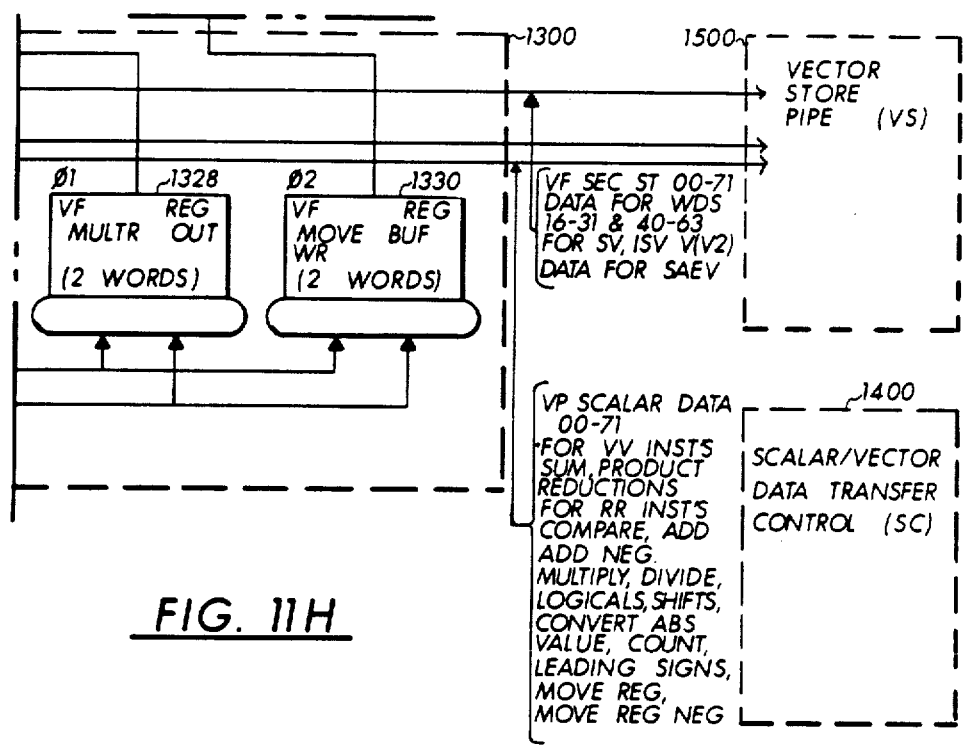
FIG. 11 which includes FIGS. 11A to 11H, positioned as shown, is a more detailed logical block diagram of the Vector Processor of FIG. 9.
Figure 11A:
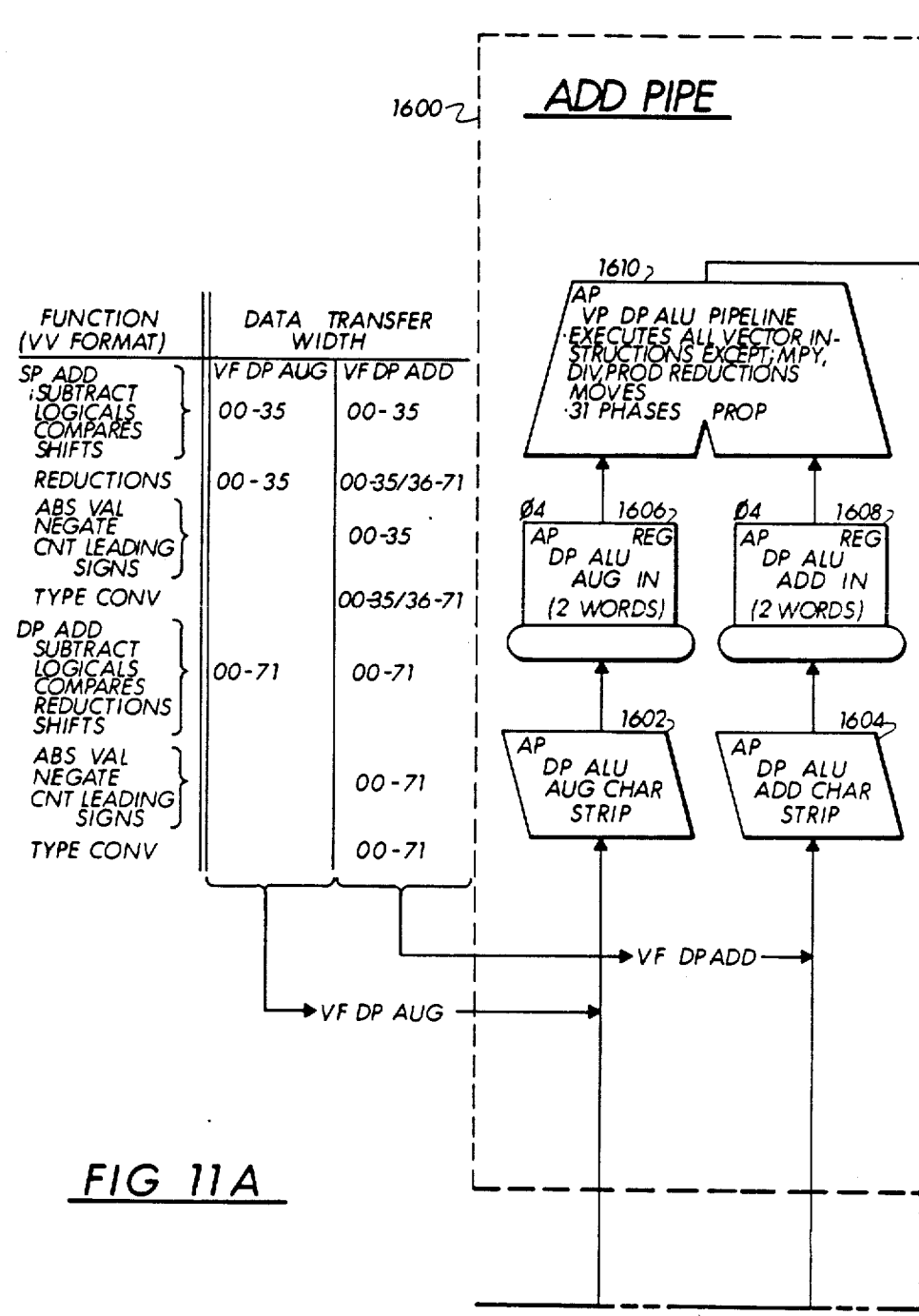
Figure 11B:
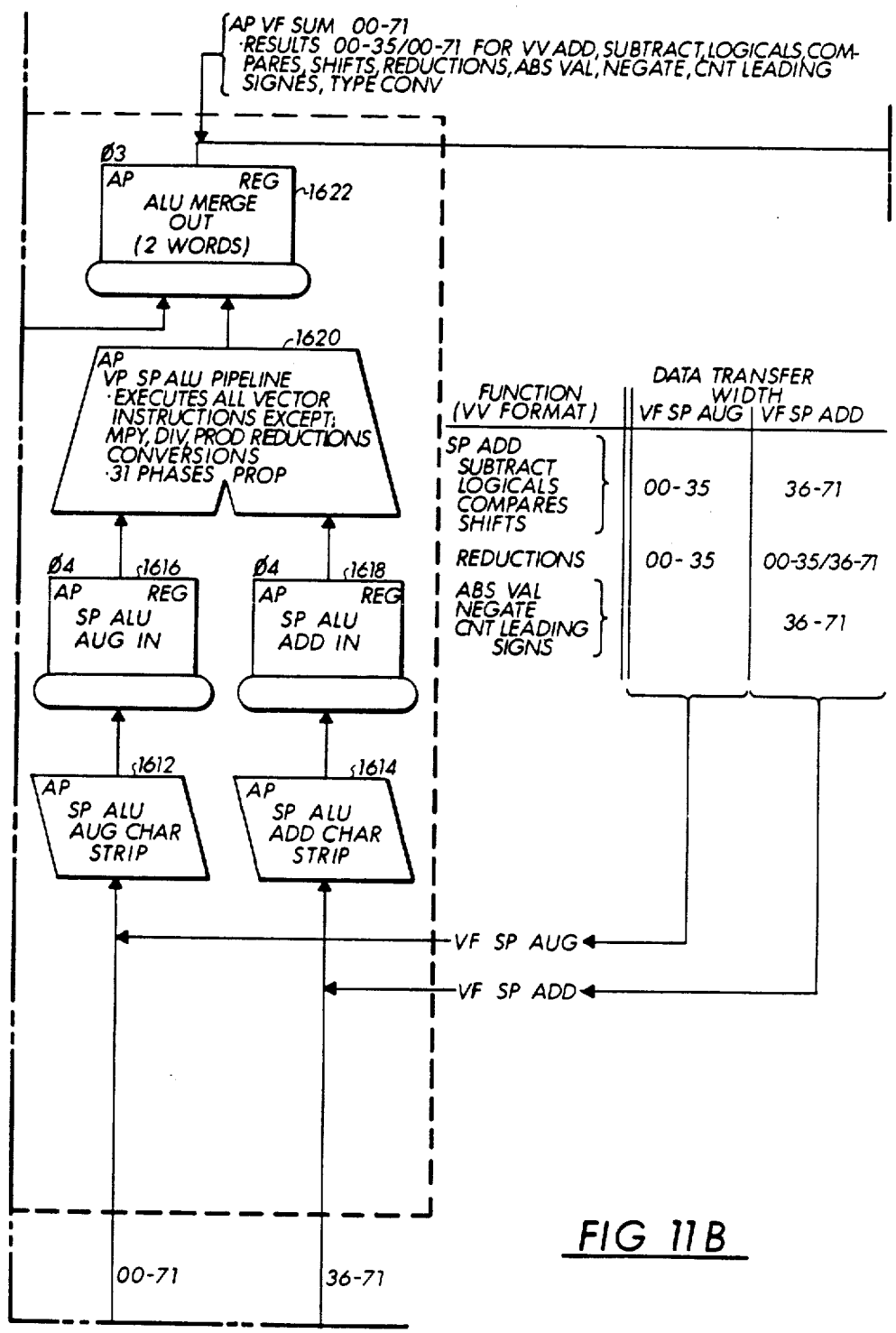
Figure 11D:
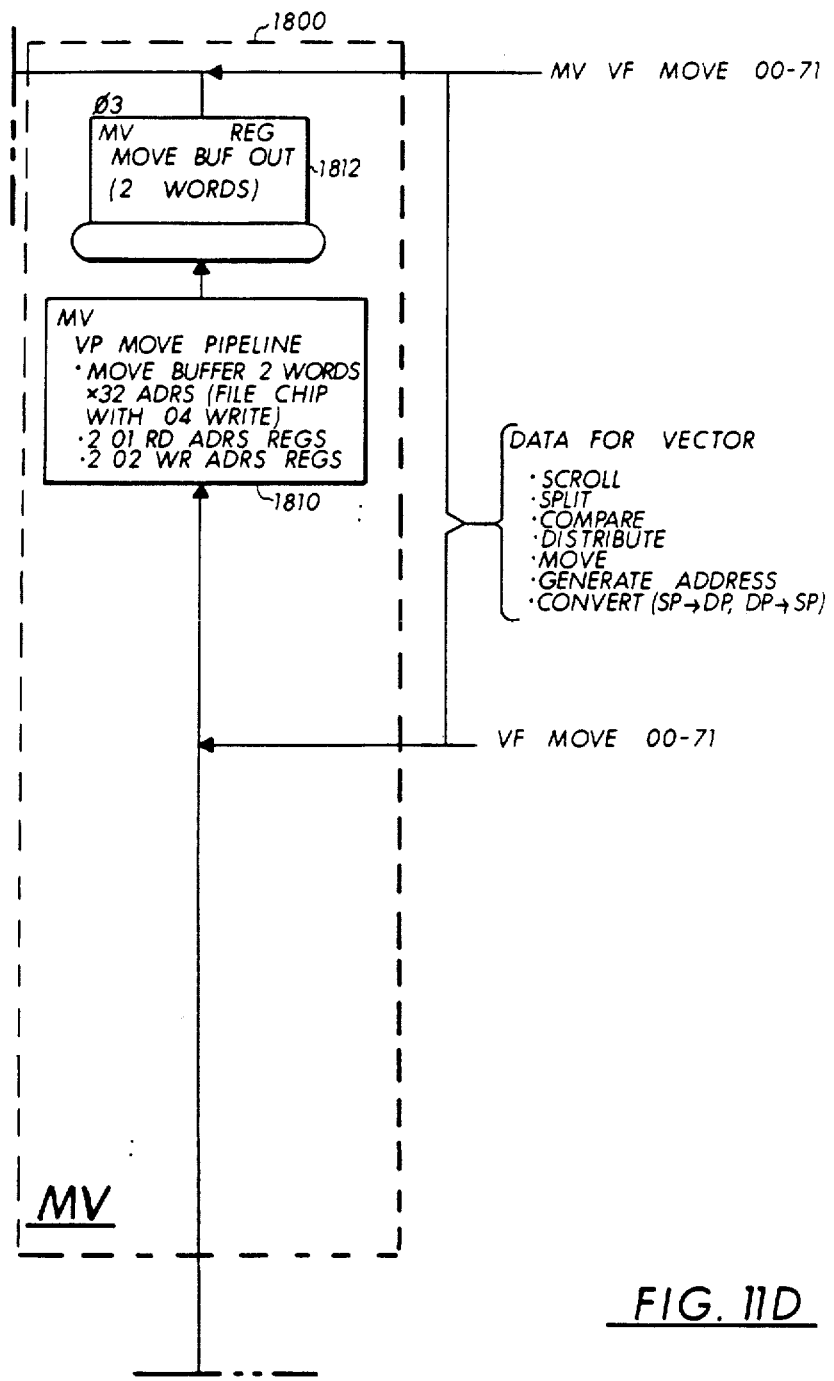
Figure 11E:
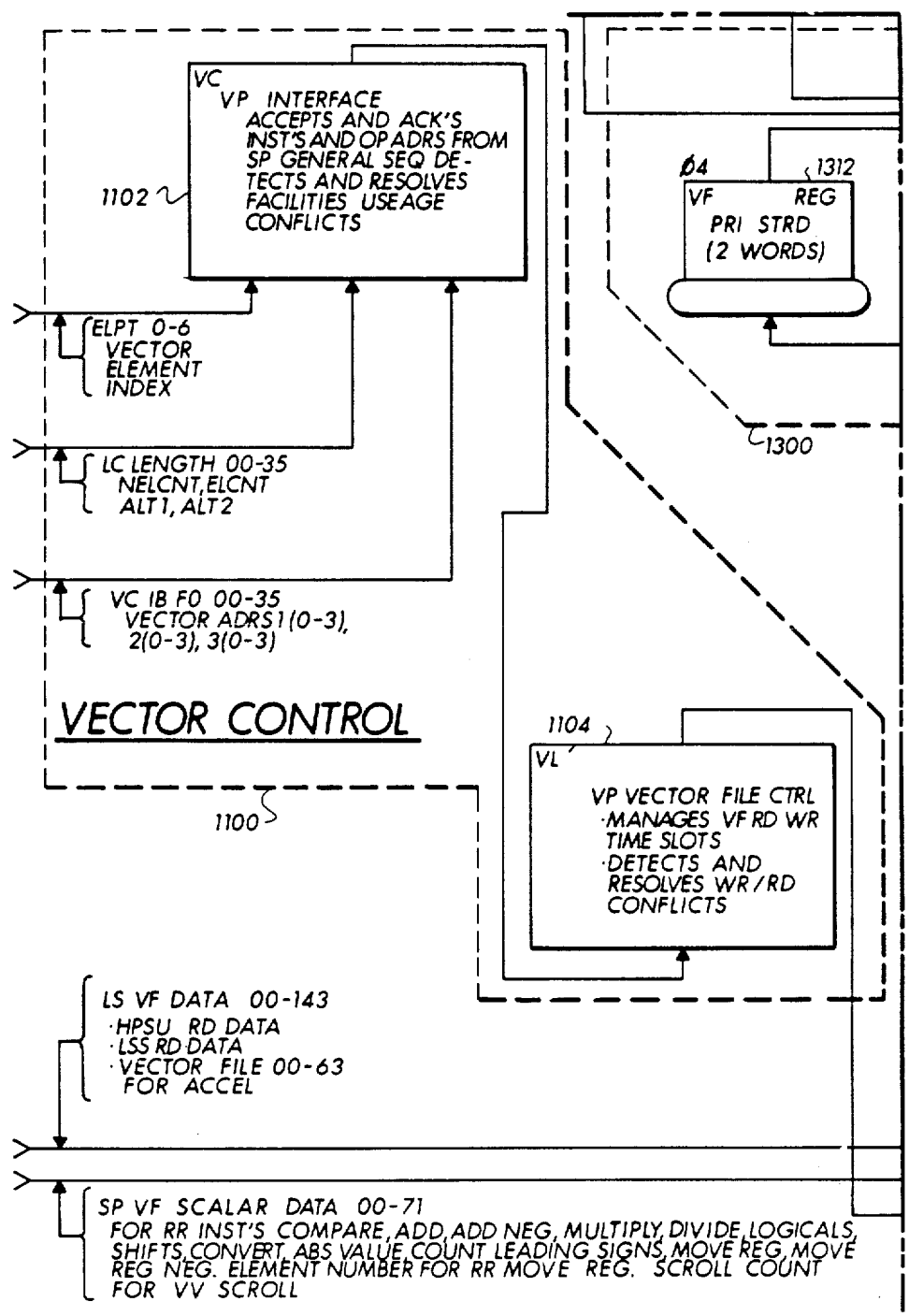
Figure 11F:
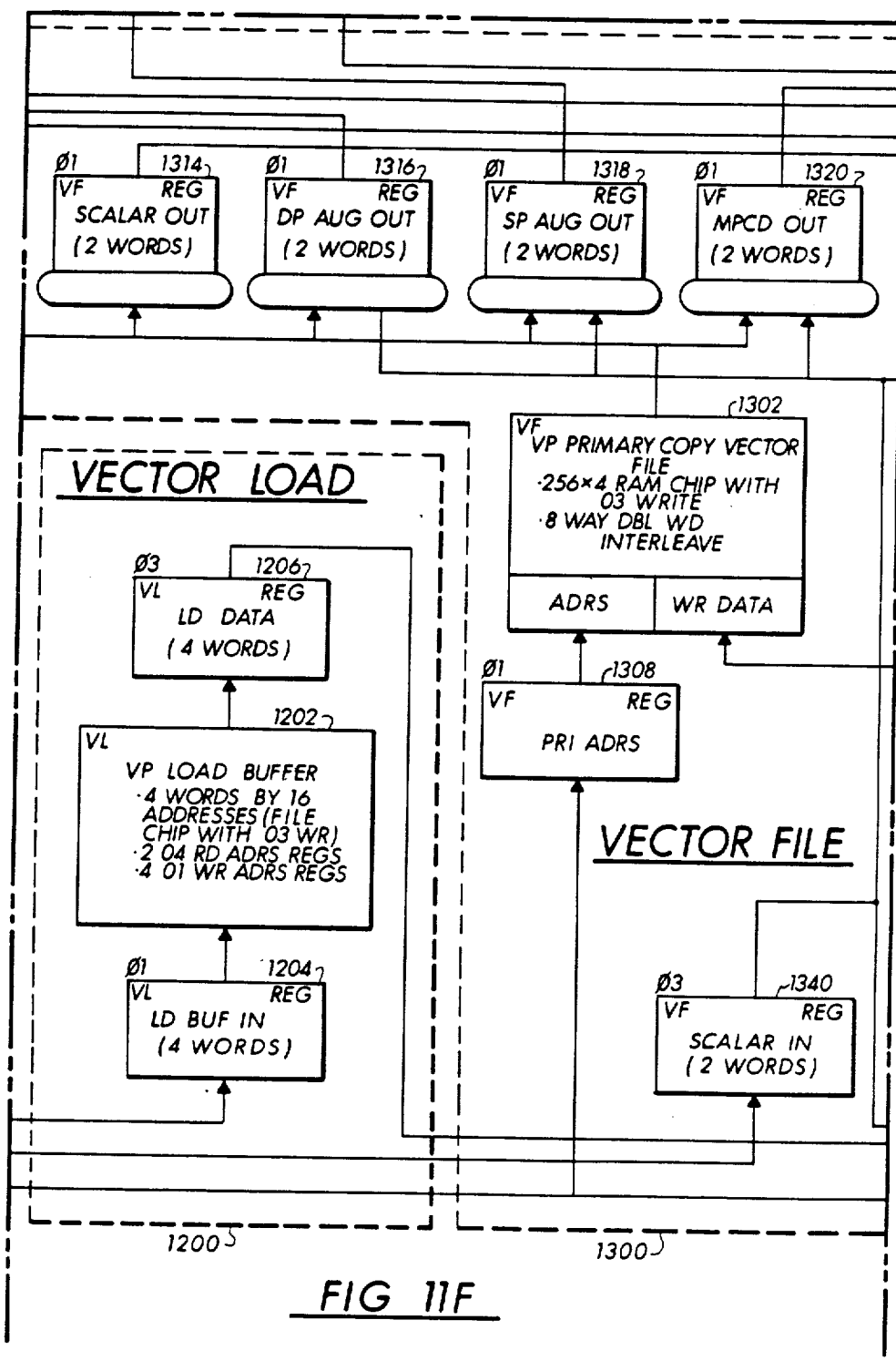
Figure 11G:
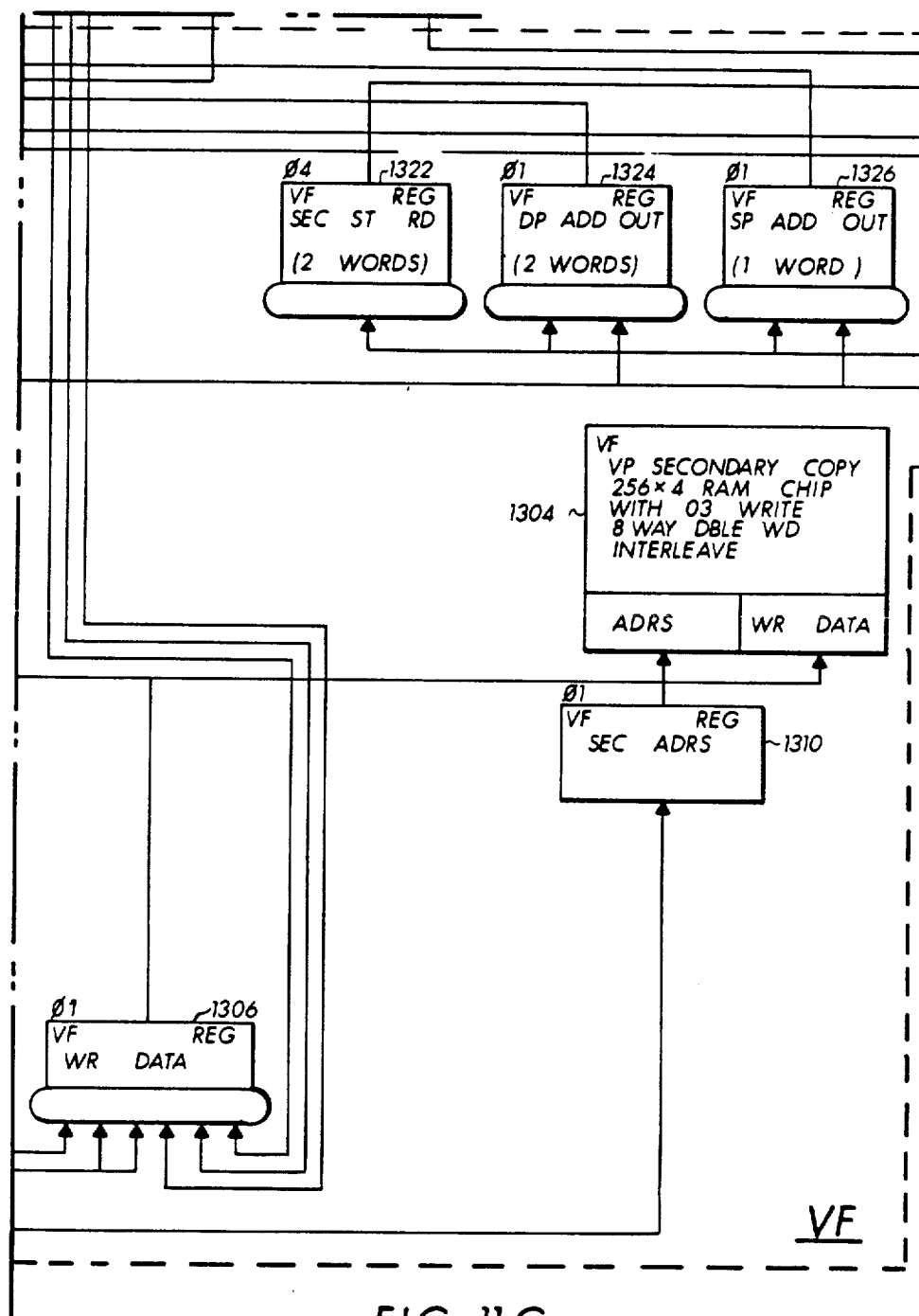

To accomplish this, we will first present more detailed block diagrams of the SPM and the VPM. The SPM is illustrated in detail in FIG. 10 which includes FIGS. 10a, 10b, 10c, 10d, 10e, 10f, 10g, 10h and 10i positioned as shown. The VPM is shown in more detail in FIG. 11 which includes 11a, 11b, 11c, 11d, 11e, 11f, 11g, 11h, and 11i positioned as shown. A more detailed discussion of these figures is presented in a copending parent application entitled "A SCIENTIFIC PROCESSOR" by Louis B. Bushard, Larry L. Byers, James R. Hamstra, Charles H. Homan, Archie E. Lahti, and John T. Rusterholz; Ser. No. 761,201 and that description is incorporated herein by this reference.

The present application is directed to a memory organization which allows multiple memory accesses in a single time frame. The following description refers to a Vector File arrangement and to a Vector File time slot management function and to a Vector File address selection system.

Refer to FIG. 12 for a representation of the vector file addressing and data organization. The Vector Files are constructed of RAM chips each with 256 addresses by four data bits. The 16 files of 64 words each are in the top quarter of the vector file RAMs. This quarter portion of the block represents the first 64 addresses of the Vector File RAMs. The data organization for one of those 16 files is represented by the block 1302 to the right. The eight columns across are referred to as blocks. They depict the eight (8) independent Vector File RAMs. In the vertical direction there are four rows which are referred to as passes. Each of the eight blocks has the same four pairs of data words for each of the 16 vector files. For single precision operations the words are each treated as elements of a vector. For double precision operations the word pairs are treated as elements of a vector. For single precision operations a Vector File can hold a maximum of 64 elements. For double precision operations a Vector File can hold a maximum of 32 elements. Vector File reads or writes always start at address zero of the file and continue sequential addresses. A Vector File can hold up to sixty-four words. For vectors of less than sixty-four words the read or write operation is terminated when the required number of words have read or written.

A normal read (or write) of all 64 words of one vector file requires 32 clock cycles. The read starts with pass one at the first, or leftmost, block. Words 0 and 1 are read during the first clock cycle, words 2 and 3 during the second clock cycle and the pattern continues so that words 14 and 15 are read during the eight clock cycle. The second pass starts with the ninth clock cycle during which words 16 and 17 are read. The pattern continues for the next seven clock cycles so that during clock cycle 16 words 30 and 31 are read. The third pass starts with the seventeenth clock cycle during which words 32 and 33 are read, and continues for seven additional clock cycles. The fourth pass starts with the twenty-fifth clock cycle and finishes at the thirty-second clock cycle during which words 62 and 63 are read.

The remaining three quarters, or 192 addresses, of the Vector File RAM chips are referred to as the shadow areas. There are three of these shadow areas, each being sixty four addresses or one quarter of the total Vector File RAM address space. Each of these shadow areas has an identical organization or mapping as the first one quarter of the Vector File RAMs which are used for the sixteen architecturally defined Vector Files. The three shadow areas are used by the hardware for holding intermediate results of multiple pass vector instructions. The first shadow area is assigned to the Multiply Pipe (MP) and is used for division and product reduction instructions. The remaining two quarters are assigned to the Add Pipe (AP) and are used for reduction and certain data format conversion instructions. The shadow area assigned to the Add Pipe is also read by the Move Pipe (MV) as it participates with the Add Pipe (AP) in the execution of those data format conversion instructions that require use of the Vector File shadow area. The assignment of separate areas to the add and multiply pipes allows concurrent operation without any possibility of shadow vector file usage conflicts.

Figure 13:
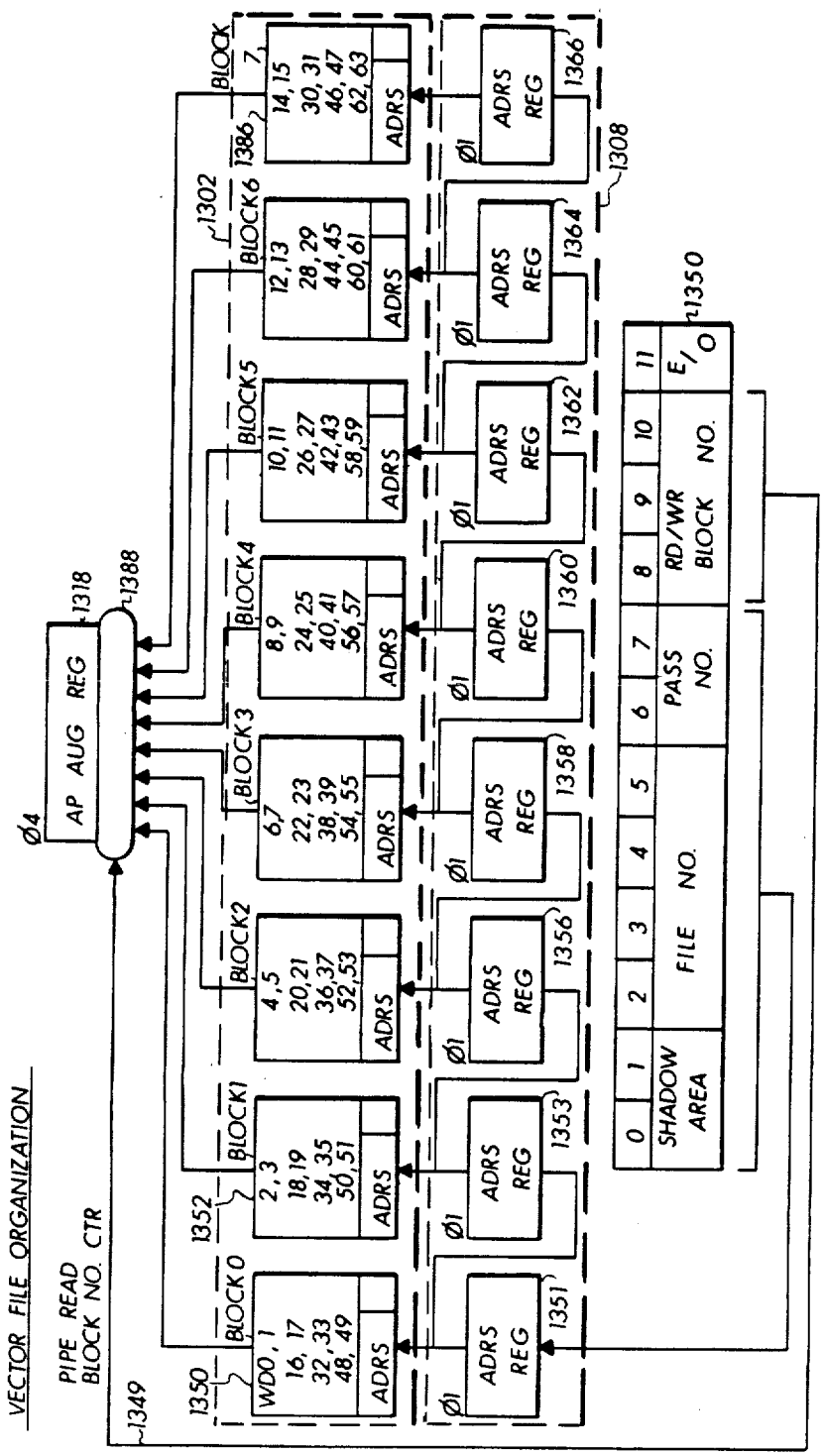
FIG. 13 is a block diagram of the Vector File organization showing the address registers and a sample instruction format.

The Vector File address format is shown at the bottom of FIG. 13. This format encompasses the entire address range of the Vector File RAMs and also shows how an individual word is uniquely addressed. The format is subdivided into various fields which relate to the manner in which the Vector Files are organized. The most significant eight address bits consisting of bits zero through seven are used for directly selecting addresses within the Vector File RAMs. These eight bits include the shadow area, file number and pass number fields. The remaining four address bits consisting of bits eight through eleven include the read/write block number and even/odd word select fields. These four address bits are not used for directly selecting addresses within the Vector File RAMs. The three bit read/write block number field is used to select one of the eight independent Vector File RAMs which are also depicted in FIG. 13. Address bit eleven which is the even/odd word select field is used to select one of the words of a double word for certain single precision Vector File references.

Address bits six through eleven define the sixty-four words within one of the sixteen Vector Files. Address bits two through five, which is the file number field, selects one of the sixteen Vector Files. Address bits zero and one, which is the shadow area field, selects one of the three shadow areas or the main area of the Vector File RAMs.

The eight independent blocks of Vector File RAMs 1302 depicted in FIG. 13, illustrate a simplified block diagram. Each of the eight blocks has an associated address register 1308 which is clocked at clock phase one. This allows all eight blocks to perform independent read or write operations each clock cycle. The allocation of the sixty-four words of any one of the sixteen Vector Files to the eight blocks is also shown in FIG. 13. For example, the first or leftmost which is referred to as block zero 1350 has the same four word pairs of all sixteen vector files. These four word pairs are; words zero and one, words sixteen and seventeen, words thirty-two and thirty-three, words forty-eight and forty-nine. Vector File zero is at the lowest Vector File RAM address. The additional fifteen Vector Files continue on in the ascending address range of the Vector File RAM chips.

To initiate a Vector File read, or write, operation address bits zero through seven are transferred from the vector control address selection mechanism into the leftmost address register 1351 of FIG. 13 at a given clock phase one. The address register is associated with Vector File RAM block zero. The word pair, as selected by the pass number field of the address, is read from the Vector File RAM chip. The data is transferred to the add pipe augend register 1318 of FIG. 13, on the next clock phase four. The read/write block number field of the address was also initialized to a value of zero by vector control. This portion of the address is held in the pipe read block number counter and is used as a multiplexer address at the input of the add pipe augend register 1318 to select input data from one of the eight Vector File RAM blocks. At the next clock phase one the address is transferred from the block one 1350 to the block two address register 1353. There are intermediate address registers, that are not shown in FIG. 13, between each of the eight address registers. These intermediate registers are clocked by block phase three but are not functional in the sense that they are only necessary to make the clocking scheme work. During the second clock cycle the next word pair is read from Vector File RAM block one 1350. The pipe read block number counter has been incremented by one, to a value of one, to select input data into. The add pipe augend register from Vector File RAM block one. At clock phase four the data is transferred into the register. The same process continues for a total of eight clock cycles with the address propagating from one address register to the next each clock cycle. After the eighth clock cycle the address is discarded. The pipe read block number is also incremented by one each clock cycle so that it is at a value of seven for the eighth clock cycle. During each or any of the last seven clock cycles vector control could have initiated additional read or write operations. For the ninth clock cycle the vector control address selection mechanism would again transfer the same address into Vector File RAM block zero address register, as that for the first clock cycle when the read operation was initiated, except that the pass number field would usually have been incremented by one. For the ninth clock cycle the pipe read block number counter will again be at a value of zero. The counter has only three bits so incrementing a value of seven by one results in a value of zero. The second pass continues in the same manner as the first pass for an additional seven clock cycles finishing at clock cycle sixteen. For a full sixty-four word vector read or write operation two additional passes are completed for a total of four. The pass number field of the Vector File RAM address is usually started at zero for the first pass and is incremented by one for each of the three subsequent passes. The pipe read block number counter starts at a value of zero at the beginning of each pass and increments by one for each subsequent clock cycle.

Next consider FIG. 14, which shows all the Vector File read registers. The left hand column represents the five pipes that read operands from the Vector Files. The center column shows the read registers that are on the Vector File primary cards. The rightmost column shows the read registers that are on the secondary Vector File cards. The Add Pipe, for example, has an Augend read register on the Vector File primary cards and an addend read register on the secondary cards. Both augend and addend read operand word pairs are read at the same time and sent to the pipe together. Likewise, with the Multiply Pipe, the primary cards have a multiplicand read register and the secondary cards have a multiplier read register. The Move Pipe has only one read register and it is located on the secondary card. The Vector Store Pipe as previously noted has two output registers one on the primary cards and one on the secondary cards. The Scalar (SC) Pipe has only one read output register which is on the primary cards. The SC Pipe actually can accomplish two reads, however, they are done serially using the single read register. The primary and the secondary cards both have four registers to equalize loading on the Vector File RAM's for electrical considerations. All of these registers could be in operation during each clock cycle if the pipes were all active. Each could be reading any of the 16 Vector Files. No two pipes could ever be reading the same elements or words of any of those files.

Figure 15:
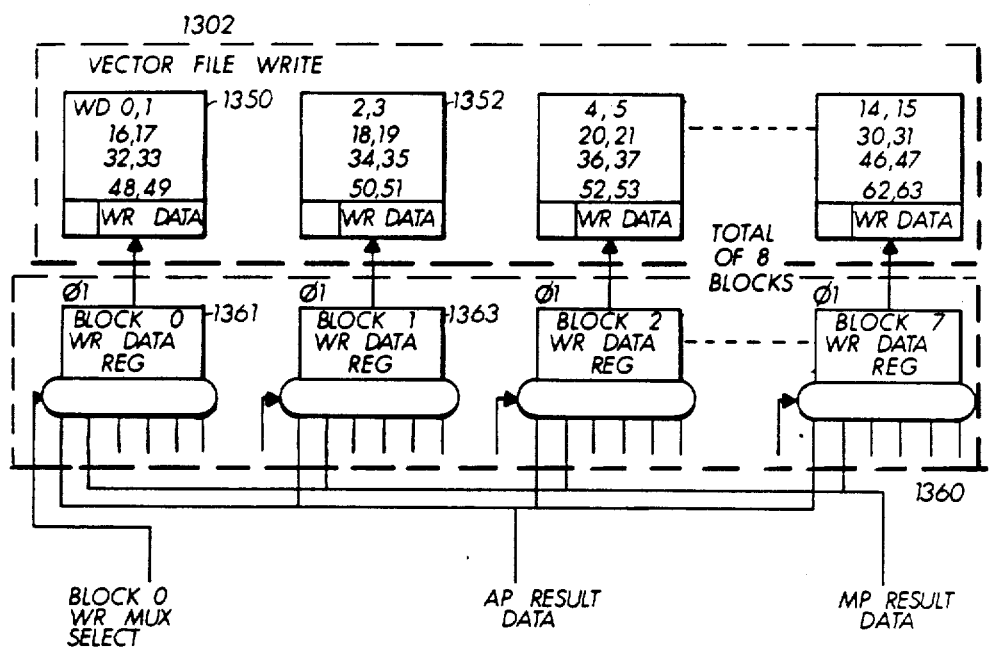
FIG. 15 is a Vector File block diagram illustrating an example of a write operation.

Next the Vector File write data organization is shown on FIG. 15. Across the top, although not all shown, there are the eight Vector File RAM's 1302. Also the data words for one vector file are shown as in FIG. 13.

Each RAM has an address input 1308 which is not shown on this diagram. The write data inputs of the RAMs are connected to the output of a group of Vector File write data registers 1360 which are clocked on a phase 1 as is the address register. The write data registers 1360 are shown with their 6 data inputs. Each one has the same inputs. For example the leftmost one 1361 represents result data received from the Add Pipe. The data fans out to the mux input 0 of all eight write data registers 1360. The result data of the Multiply Pipe goes to the data MUX 1 input of all eight registers. The next input is the result data from the Move Pipe. The next two inputs are assigned to the Vector Load Pipe. It has two inputs so that it can write two words on each of these inputs for a total of four per clock cycle. They are referred to as the input A and input B. The last input is from the Scalar Control (SC) Pipe. The Vector Store Pipe, of course, does not have an input because it only reads the Vector Files. The input into the left side of the multiplexors is the Write MUX address Select. It comes from a counter and other decode and encode selection logic within the vector control section. As a write operation progresses through the eight blocks of Vector File RAMs, the mux address will also be advanced in the same manner. For example, if result data is being written from the Add Pipe, then at the start of a pass the MUX address into the first, or block 0, write data register must be zero. Write data words 0 and 1 from the add pipe would then be clocked into this register on a clock phase 1. For the next clock cycle the MUX address into the block 1 write data register must be 0 so that data words two and three from the add pipe are gated in at clock phase one.

Figure 16:
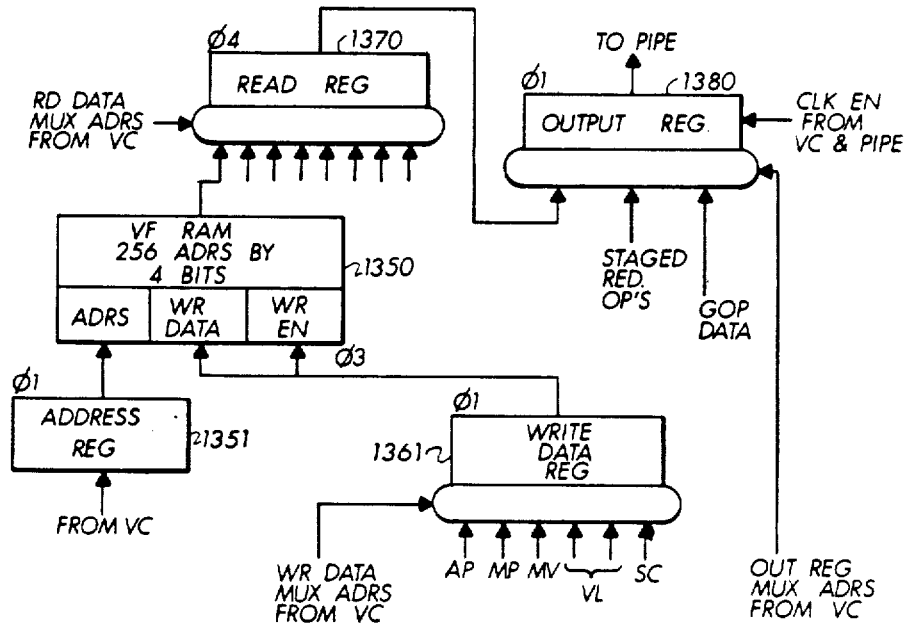
FIG. 16 is a Vector File block diagram illustrating a typical organization of read and output registers.

Next refer to FIG. 16. This is a simplified block diagram of a typical Vector File RAM with associated address, write, read and output registers shown. Starting with the Vector File RAM 1350 the address input arrives from the address register 1351 which is clocked 01. This is typical as each of the eight blocks of the Vector File RAM has its own associated address register and write data register. The write enable input which controls actual writing into the Vector File RAM is also shown. Writing into the RAM actually occurs on a clock phase 3 which provides a two clock phase propagation from both the address and the write data register to the RAM. The Vector File read registers are dedicated to specific pipes as shown in FIG. 14. The register shown could be, for example, an augend read register 1370. The read registers are all clocked by a clock phase 4, providing for a 3 clock phase propagation from the address register to the read registers. The other 7 inputs into the read register come from the other seven blocks of Vector File RAM's. The read register MUX address input comes from a counter in the address selection mechanism within the vector control section. These counters are also associated with a pipe. For example, if the counter is associated with the Add Pipe then is provides the MUX address for the augend and addend read registers. The counter starts at zero at the beginning of each pass and increments by one each clock cycle. After reaching a count of seven, it restarts at zero for the next clock cycle, which is the start of the next pass.

The output of the read register, for most of the pipes, goes to an output register which is clock read at phase 1 as shown. That provides for a one phase clock propagation from the phase 4 read register to the phase 1 output register. There are various sources of data that input into this output register 1380. One source of data is G-register (G op) data for those vector instructions that specify a G register operand. The G op data is transferred into the output register 1380, and once transferred into there, the clock enable line is disabled so that the register will hold the data. The clock enable data is disabled by the SC pipe, as soon as the G op data is transferred into the output register. The G op data is held there until the clock disable is cleared by the pipe, when it is done with the G register data. So there is dual control of the output register clock enable. The SC pipe disables the output register clock, and the pipe reenables it. Another source of data into the output register is the data for reduction instructions. This data requires manipulation under control of the pipe associated with the output register during execution of reduction instructions. There are actually two inputs for reduction data so that there are actually a total four inputs into the AP and MP output registers. When G op data is being transferred into the output register 1380 the SC pipe controls the MUX address input. During reduction instructions the pipe controls the output register MUX address.

Figures 17, 18:
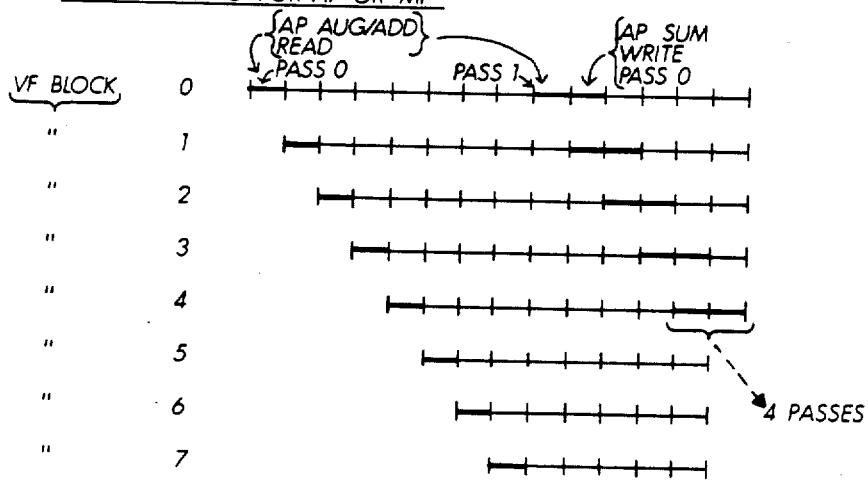
FIG. 17 is a table showing the Vector File Time Slot (TS) patterns.
FIG. 18 is also a timing chart illustrating the Vector File addressing for an Add Pipe (AP) or a Multiply Pipe (MP)

Next refer to FIG. 17 which shows the Vector File time slot pattern definitions. There are a total of 8 defined Vector File time slot patterns. They are numbered patterns 1, 3, 4, 5, 6, 7, 8, and 9 down the left side. Across the top we have the 8 slot numbers 0 through 7 and these correspond essentially to the 8 blocks in the Vector Files. The Vector File time slot assignments are maintained in the vector control section by the time slot registers.

Pattern 1 is used by the Vector Store Pipe. It only reads Vector File data and moves it to the Store Buffer in the SPM. Both the primary and secondary copies of the Vector Files can be read simultaneously so that only one time slot is required. This pattern is also used by the Add Pipe for vector comparison instructions where data is only read and there is no writing of result data into a Vector File. The results of the comparison goes to the Mask Processor in the Scalar Processor Module.

Pattern 3 is the main and most heavily used pattern. It is used by the Add and the Multiply Pipes for most of the instructions such as add, subtract, multiply, logicals, shifts and so forth. For example, during the read time slot for the Add Pipe the augend and addend are read in parallel, one from the primary and the other from the secondary copy of the Vector Files. The latency time of both the Add and the Multiply Pipes for these instructions are nine (9) clock cycles. Nine (9) cycles after operands are read, the result is ready for writing into the Vector Files and this write time slot assignment provides that.

The next pattern is pattern 4. It is used by the Vector Load Pipe for load vector instructions. Each one of these time slots allows us to write two words into the Vector Files for a total of four words per clock cycle. The first write occurs at time slot one rather than zero to allow data to be read from the vector load buffer in preparing for writing into the Vector File RAM. This one clock cycle delay is in effect the latency time of the Vector Load Pipe. The two cycle gap between the two write time slots relates to the manner in which data is read from the vector load buffer.

Pattern 5 is used by the Move Pipe for the compress instruction exclusively. The two cycles between the read and write time slots relate to the latency time of the move pipe.

Pattern number 6 is used by the Move Pipe for all of the other instructions that it executes. It is also used by the SC pipe for all the read/write operations. The two cycle gap between the read and write time slots is to match the Move pipe and scalar operation latency time.

The next pattern is pattern 7. It is used by the Vector Load Pipe for the load alternating element instruction. Again there is a two word transfer during each of these for a total of four words per clock cycle. The difference between this pattern and pattern four, which is also used by the Load Pipe is that data is read from the vector load buffer in a different manner because the Load Alternating Element Vector instruction provides writing into two different files.

Moving next to pattern 8 there is shown a read and a write slot which is again used by the Add and Multiply Pipes. There is one pattern up front which is vacant, this pattern is provided for execution of certain extended or multipass instructions such as for the divide and conversion instructions.

The last pattern is pattern 9 and it is used by the Add and Multiply Pipes for reduction operations. Again there is a cycle of delay before the read time slot to allow the pipe and the Vector File output data register to be conditioned for the reductions, which are multipass instructions. The data stageing results in an increase of pipe latency time by one cycle. This requires a matching gap between the read and write time slots.

FIG. 18 is a simplified timing diagram showing typical Vector File addressing for either the Add or Multiply Pipes. This example uses time slot pattern three. For this example assume that a vector add instruction is being executed. The timing sequence depicts the address operation and what each of the eight (8) Vector File blocks are doing at any given time. The top line, for example depicts the activity of Vector File block 0 for both the primary and secondary copies. Likewise the activity of blocks 1, 2, 3, 4 and so on for the 8 blocks is also shown on the seven additional lines. Each line is marked off into segments to depict clock cycles. Each segment represents one clock cycle. Each clock cycle segment then illustrates any activity that a Vector File block is doing at that time. For our example Vector Add then as the instruction is started words 0 and 1 of both the addend and augend are read from Vector File block 0. The first segment of the top line illustrates this. For the next clock cycle the address is sent down to the address of Vector File block number 1 and during this second clock cycle words 2 and 3 are read from Vector File block 0. During the third cycle then Vector File block 2 will be read and so forth for the duration of one pass consisting of 8 clock cycles. During the eighth cycle words 14 and 15 will be read and also at this time a new address for pass 2 will be formed in the vector control addressing section. The address from vector control is then sent into the Vector File block 0 address register for the ninth clock cycle. This is the beginning of pass 2, which starts by reading words 16 and 17 and sending them off to the Add Pipe. The second pass continues for a total of eight clock cycles. The diagram only shows two of the four read passes that would occur for a full 64 element vector. During the second clock cycle a Vector File write address is also formed, however, it is not really used for our example and is not shown in FIG. 18. Writing into the Vector Files may occur during the first pass but it would be for a previous instruction. The latency time of the Add Pipe is 9 clock cycles, so the first result data will not be ready until 9 cycles after the first read operands are read. On the right is shown the AP sum write pass 0 starting during the tenth clock cycle. This is for the starting of a write operation for our example add instruction. At this time results of element 0 and 1 which were read during the first clock cycle are written. These results are written in word 0 and 1 of the destination Vector File. The next clock cycle results are written in words 2 and 3 and so forth. This continues for a total of four passes and it would go on for one pass beyond the read.

In review, the Vector Files are comprised of eight (8) independent blocks, each capable of reading or writing each clock cycle. There are two complete copies, a primary and a secondary copy so that operand pairs can be read at the same time for the various pipes. For example, the read augend and addend or the multiplicand and multiplier can be read at the same clock cycle. The writing of data into the two copies occur concurrently.

Next is a description of the Vector Control (VC) section. There are four functions that the vector control section performs. One function is to receive and acknowledge instructions, or vector control words (VCW), from the Scalar Processor module (SPM). All instructions are decoded and issued into execution by the Instruction Flow Control (IFC) section within the Scalar Processor Module. The instructions are actually held in the instruction buffer in the Scalar Processor Module. Instructions are initiated into execution in the order specified by the program in execution. The IFC section decodes the 36 bit architecturally defined vector instructions of a program into a 49 bit plus 7 parity bits vector control word (VCW). The VCW is often called an instruction in the context of the Vector Processor Module. Also accompanying an instruction issued to the Vector Processor Module is the element count (ELCNT), the element point (ELPT), element count equal to 0 and the ELCNT or ELPT abort signal. These are sent from the Loop Control (LC) section in the SPM. The architectural mask is also available from the Mask Processor (MK) in the SPM at the same time the instructions are issued, however, it is not used until instruction execution is actually started. The mask is sent directly to the pipe in the Vector Processor Module that is executing that particular vector instruction. The Instruction Flow Control also sends 4 copies of the vector control issue designator. This designator denotes that an instruction is available to the Vector Processor Module for execution. The Vector Processor Module acknowledges each instruction to IFC as it is passed on to one of the 6 pipes for execution. Two pipes participate in execution of certain instructions termed double instructions. In those cases the issuing of the acknowledge signal is delayed to the Scalar Processor Module until both pipes are started. Only one instruction or VCW is received from the IFC for each double instruction. The second instruction or VCW is formed within the Vector Control section, the total instruction is then acknowledged after both of those have been placed into execution.

Another function of the Vector Control is to manage the Vector File time slots. The Vector File time slots refer to the eight (8) independent Vector File blocks. This mechanism in the vector control keeps track of which of the 8 blocks are assigned or unassigned and to which pipe and whether a read or write. The time slots are assigned by the Vector Control section at exactly the same time that the pipe starts execution of that Vector Control word or instruction. Vector Control then maintains that assignment until it is released by the pipe to which it has been assigned. This occurs whenever the pipe finishes execution of the Vector Control word or instruction for which the time slots were reserved.

Another function that the Vector Control performs is the forming and selection of Vector File addresses. It also has the necessary electrical drive capability to fan the address out to the six Vector File card pairs. The Vector File time slot management mechanism is used to form and select the Vector File address. The address is formed from the file number and other address information, such as the pass number, which comes from the pipe. Once formed, the address is sent to the Vector File block 0 address register. There are two selector mechanisms one for the primary Vector File and the other for the secondary Vector File.

The fourth function that the Vector Control section performs is the detection of vector register logical usage conflicts.

Figures 19, 21A:
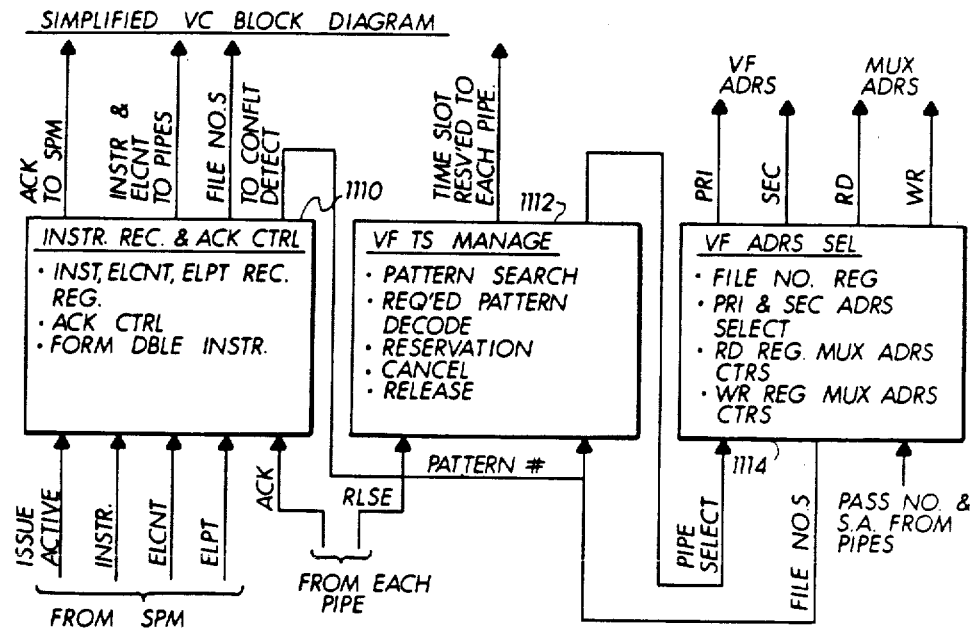
FIG. 19 presents a block diagram for the Vector Control (VC) logic for the Vector File time slot reserve registers and the Vector File address selection registers.

Next consider FIG. 19. It is a simplified block diagram of the Vector Control section. There are three blocks that represent three of the four functions performed by Vector Control. They are: (1) the instruction receive and acknowledge control shown on the left; (2) the Vector File time slot management mechanism shown in the middle; and (3) the Vector File address selection mechanism illustrated on the right. The conflict detection function is not shown. The instruction receive and acknowledge control block lists the facilities contained within that logic. They are: (1) the instruction receive and the element count (ELCNT) the element point (ELPT) and the element count equal to 0 and element count out of range abort signal to the receive registers, (2) Instruction or VCW Acknowledge control, (3) Formation of double instructions. The Inputs into the three blocks are shown across the bottom of FIG. 19.

There are five inputs into the instruction receive and acknowledge control block. The Vector Control word or the instruction is an input which comes from the Instruction Flow Control (IFC) in the Scalar Processor Module. On the left is the IFC active designator. It denotes that there is an active instruction and element count etc. on the lines ready for the Vector Processor Module to accept. The next two inputs coming from the loop control (LC) of the SPM are the element count (ELCNT) and the element point (ELPT). In addition, there are the element count equal to 0 and the element point on a range abort signal which accompany those signals. There is only one stage of these registers, the instruction is clocked in and held until passed on to a pipe for execution. There are multiple outputs from the instruction receive register which holds the vector control word or instruction. The instruction and ELCNT signals fan out as shown to the six (6) pipes. Both the Vector Control word instruction and the Element Count or Element Point signals (in case of the SC pipe) fan out to all of the pipes. Additionally, the source and destination Vector File numbers for Vector Control are sent off to the conflict detect logic. Likewise, a line shows the file numbers going over to the Vector File addressing select block. A copy of the file numbers is held there for use in forming Vector File addresses. Another output is the Vector File time slot pattern that is specified for the particular vector control word or instruction. This is sent to the Vector File time management block. The instruction receive and acknowledge control has input from each of the six pipes to acknowledge the start of execution of a Vector Control word or instruction. This signal, in turn, is used to acknowledge to the Scalar Processor Module that the particular Vector Control word or instruction was successfully placed in operation and to supply an additional one as available. An exception to this is where two pipes participate to execute a double instruction or Vector Control word. The second vector control word is formed in the vector control logic after the initial one, received from the Scalar Processor Module, is issued to a pipe. The pipe that accepts this instruction acknowledges it in the normal manner. The acknowledge signal is used to initiate formation of the second instruction that is then issued in a normal fashion. Once the second of the two is acknowledged by the other pipe the Vector Control section acknowledges the instruction to the SPM.

Next we will consider the Vector File time slot management block of FIG. 19. The Vector File time slot pattern search is continuously searching for all eight defined Vector File time slot patterns. The search goes on during every clock cycle whether instructions are pending or not. The next block is the requested Vector File time slot pattern decode. The vector control word or instruction includes an encoded Vector File time slot pattern number. This is one of the eight defined patterns previously noted and it comes from the vector control word in the instruction receive register. The decoded pattern is compared to the search patterns. When the required pattern is found available by the pattern search, then a reservation is made. The reservation is actually made by writing into certain of the eight Vector File time slot registers as defined by the specified time slot pattern. At this point, if the pipe is able to start, the reservation stands. However, if the pipe was unable to start, because it was already busy executing a previous instruction, or for any other reasons, then the reservation just made is cancelled. During the next clock cycle the requested pattern is again compared to the search patterns to see if it is available. If so a reservation is made. If the pipe is again unable to start that reservation is cancelled and the process continues every clock cycle until the pipe is able to start execution. At that time the reservation will stand and it will be maintained until the pipe has finished the execution of that instruction or vector control word. The pipe then releases the Vector File time slots. For example, for a vector add instruction, the add pipe will release the read time slot as soon as it is done reading all of the Vector File source operands. The write time slots will be released at a later time when the Vector File write operation is completed.

The remaining block of FIG. 19 is the Vector File address selection. The first items are the file number registers. There are read and/or write operand file number register(s) for each pipe. The file numbers are from the VCW and are copies of the file numbers in the original instruction. The operand 1 and operand 2 file numbers which are source operands. The operand 3 and operand 4 are write or destination file numbers. Those registers are loaded upon start of execution of a given instruction and are held until the instruction is completed. They are released or cleared by the pipe finishing the instruction.

The next items are the primary and secondary Vector File address select registers. The multiplexer address of both of those selector registers is under control of the Vector File time slot 0 register. The encoded pipe number field of the time slot registers is used for the MUX address. In addition there is a bit which denotes whether the time slot is to be used for reading or writing. This bit is further used as an additional multiplexer address bit to select the appropriate file number whether it is a read or write. Also the address select register input multiplexer accepts inputs from each of the six pipes for additional address information including the pass number and the shadow area address. The addresses are sent to the primary and secondary Vector File cards.

Next are the Vector File read register MUX addressing counters. There are five counters. The load pipe does not have a read counter because it does not perform reading of the Vector Files. The other five pipes each have a dedicated read counter. The counter is reset to zero at the start of each instruction in order to be sychronized with the Vector Files and the pipe. This counter is incremented by one each clock cycle. After reaching a count of seven it restarts at zero and continues until a new instruction is initiated into execution in that pipe. The counters continue counting even after an instruction is completed by that pipe but it is then a don't care operation.

Last are the Vector File write data register MUX address counters. There are six of these counters, the Vector Store pipe does not have one because it does not perform writing into the Vector Files. The load pipe has two counters and the other pipes have one each for a total of six. These write register MUX counters have outputs which go to the Vector File write data registers to select the proper write data input from the pipe in question. The counters are initialized at 0 just prior to the first Vector File write data being available. They are incremented each clock cycle thereafter continuously. When the instruction completes execution of that instruction the MUX counter is cleared by the pipe in the manner similar to releasing the Vector File time slots.

Figure 20:
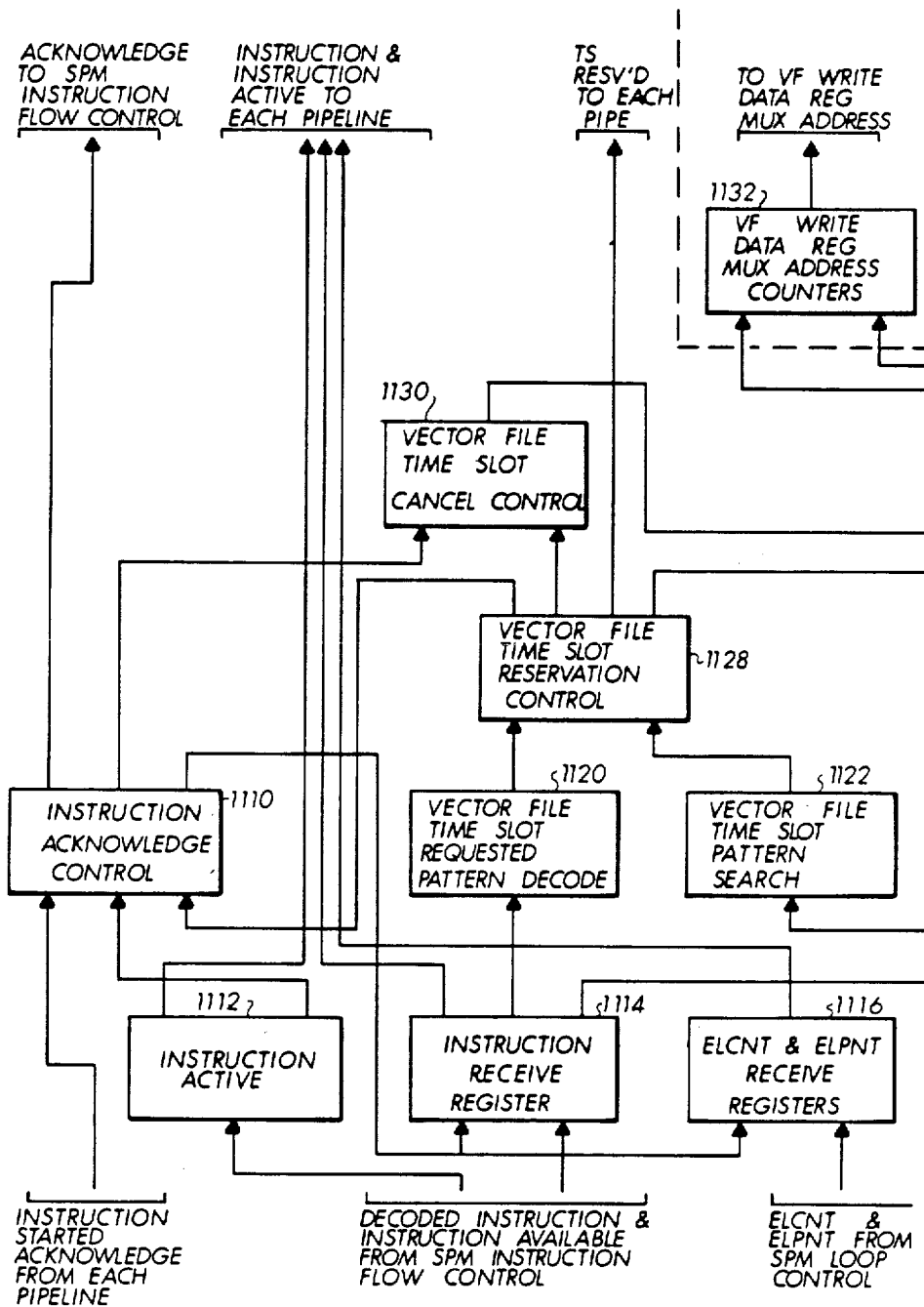
FIG. 20, which includes FIGS. 20A and 20B, positioned as shown, illustrates a simplified Vector Control block diagram.
Figure 20B:
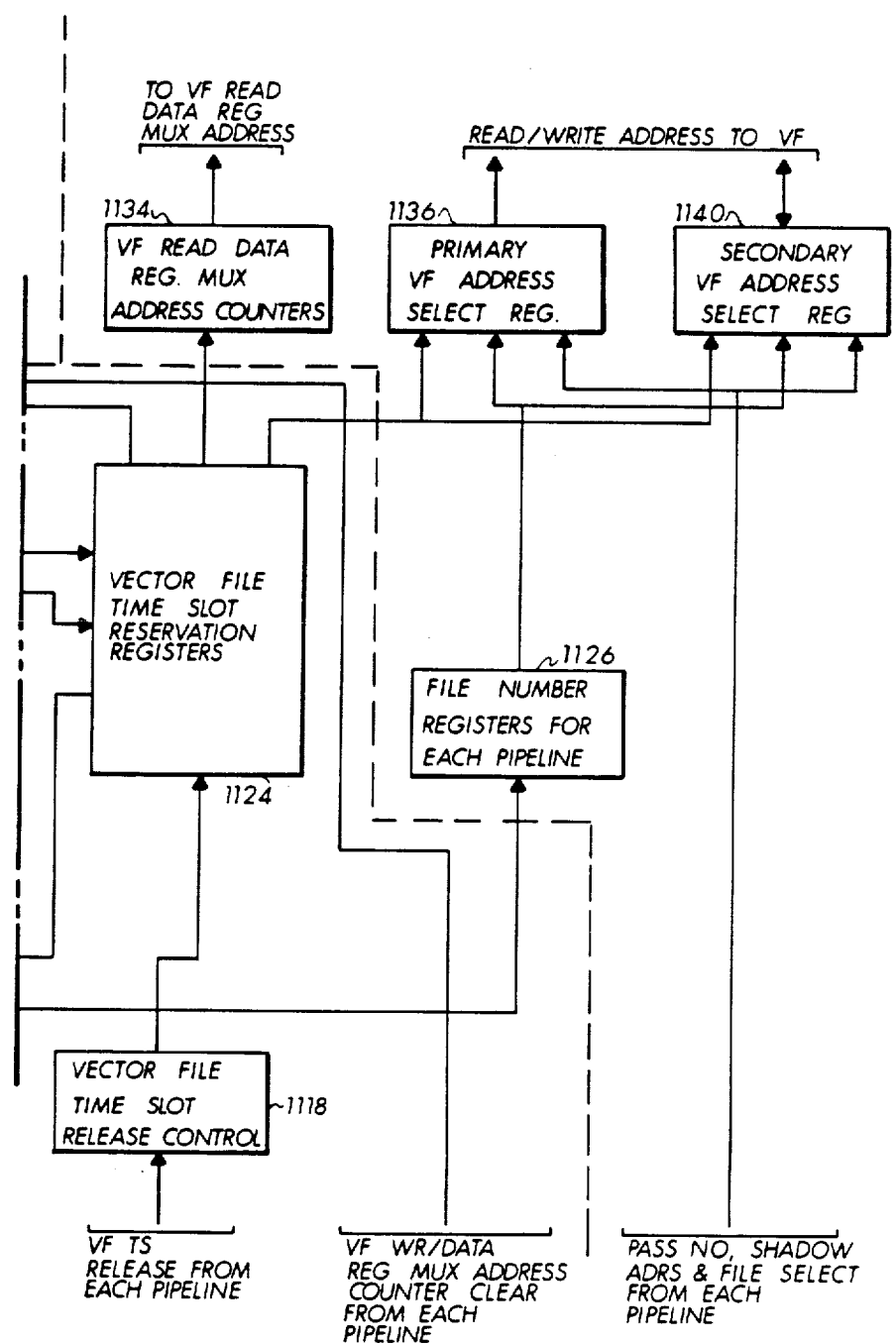

Next, refer to the more detailed block diagram of the vector control section shown in FIG. 20. It is partitioned by a dotted line to show where this logic resides on circuit cards. The logic to the left of the dotted line is on the Instruction receive interface card. The logic to the right of this dotted line is on the Vector File address select card. The remaining logic at the top center is on the Scalar Processor operand control card. Starting at the lower middle left with the instruction receive register block 1114, the input shown is the decoded instruction which is the Vector Control Word. The Vector Control Word comes from the Instruction Flow Control section of the Scalar Processor Module. The instruction receive register block 1114 contains a register with 49 bit Vector Control Word and 7 parity bits. The issue designator or instruction available is shown coming into the instruction active logic block 1112. The adjacent block 1116 represents the element count (ELCNT) and the element point (ELPNT) receive registers. It also includes ELCNT equal to zero designator and the ELCNT or ELPNT out of range designator. This input is from the Loop Control section in the Scalar Processor Module. All of this information is from registers or designators in the Scalar Processor Module clocked at phase 1 and the registers and designators in the VPM are clocked on phase 3. So there is a two clock phase propagation across the cable from the Scalar Processor Module into the Vector Processor Module. The Vector Control Word and element point information are held in these registers until the instruction is successfully passed onto a pipe for the start of execution. That is depicted by the input going to both of these registers which is the clock disable signal to hold the instruction, ELCNT and ELPNT information until it is passed on to the pipe. Over on the middle left is the instruction acknowledge control 1110. It has inputs from the instruction active designator 1112 and also it accepts an acknowledge signal from each of the six pipes to denote that the pipe has accepted and started execution of a given instruction. This output then goes back to the Scalar Processor Module to denote that execution of that instruction has started and to issue the next instruction as available. The next block 1120 is the Vector File time slot requested pattern decode. The Vector Control Word has a four bit encoded Vector File time slot pattern field. This pattern is then decoded into one of the eight defined Vector File time slot patterns. The output of the decode goes to the Vector File time slot reservation control 1128.

Central to FIG. 20 is a block which represents the Vector File time slot reservation registers 1124. There are eight of these time slot registers labelled 0 through 7. They are connected together serially in a circular fashion. The major ones are clocked on a clock phase 1. However, there are also intermediate registers for each of these 8 registers that are clocked on phase 2 and on phase 4. So there are a total of 24 registers. The Vector File time slot pattern search is made 1122, each clock cycle, from the contents of those various registers for all of the eight (8) defined time slot patterns during each clock cycle. Reservation information is moved from register to register each clock cycle, so the available patterns may change from cycle to cycle. Each eight (8) clock cycles, the reservation data is back to where it started. The output of the time slot pattern search 1122 then goes into the reservation control 1128. Here it is compared to the requested pattern for this given instruction. If that pattern is available, then a reservation is made by writing into the appropriate reservation registers. The format of these registers will be described later. The reservation is now made and at that point a time slot reserved signal is broadcast to the pipes to indicate that the reservation was successfully made. The pipe has meanwhile received the Vector Control Word instruction. The pipe can start execution when the time slot is reserved. If the pipe was unable to start at that time because it was busy with the previous instruction, an acknowledge signal is not sent to vector control. In this case the Vector File time slot is cancelled. This cancellation consists of actually clearing the time slot registers of the information that was just written. The sequence continues each clock cycle with the searching for patterns and it continues making a new reservation each clock cycle until such time as the pipe does acknowledge. When an acknowledge signal is received, the reservation is let stand. These Vector File time slot reservation registers 1124 maintain the reservation that was just made for the pipe until such time as the pipe finishes the instruction. The pipe will then release the Vector File time slots. The release comes from the pipe time slot release control 1118 and goes directly to the time slot reservation registers 1124. The pipe remains sychronized with the time slot reservation registers 1124 until release.

Next, consider the Vector File addressing mechanism shown in FIG. 20. The vector control word or instruction has the source and/or destination Vector File numbers. They are held in the file number registers 1126 for use by the Vector File address select registers 1136 and 1140. File numbers are shown as inputs to the address select registers. Additional addressing information from each pipe includes the pass number and the shadow address file select. The remaining input comes from Vector File time slot reservation register 0 1124. The encoded pipe field select and the write bit are used as the MUX address for the address select registers 1136, 1140. The address select registers 1136, 1140 are clocked on phase 3. The output has a fan out drive to the Vector File address registers on the six Vector File card pairs. It goes to the address register for Vector File block 0.

Refer to the block for the Vector File write data register MUX address counters 1132 on FIG. 20. One of the inputs into these counters comes from the Vector File time slot reservation registers 1124. The output of the MUX counters is sent to the Vector File write data register MUX address to select write data that is going into the Vector Files from the proper pipe or source. There are six counters. The Vector Store pipe does not have one but the Vector Load has two and the other pipes have one each. The counters are initialized at zero (0) and are sychronized with the start of writing into the Vector Files. The counters are thereafter incremented by one by each clock cycle. They count up through 7 and then they are reset back to 0 and then count back up to 7 again. They continue doing this until such time as the pipe is through with the instruction. It will then issue a clear to its appropriate counter. The final block on this diagram is the Vector File read MUX address counters 1134. There are five of those counters. The Vector Load pipe does not have one. These counters, as the write counters, are dedicated to individual pipes. The output of these counters goes to the Vector File read output registers at the output of the Vector File RAM's and control the MUX address to select the read data from the proper block of the Vector Files. These counters are also initiated to 0 at the beginning of the instruction to be sychronized to the reading of the first elements of the Vector File. They continue incrementing each clock cycle, they also increment from 0 through 7 and then they are reset to 0 and continue doing this until the end of the instruction, and beyond.

Next refer to the time slot register Format shown in FIG. 21. It is a nine (9) bit format, with the 0 bit on the left. This is the write bit and it defines whether the time slot is for a Vector File read or write. When set it denotes that the time slot is for a write. Its primary use is for Vector File address selection, however, it is also used to determine whether to initialize a read or write data register MUX address counter. Bits 1 through 3 comprise the encoded pipe select field. This field specifies to which pipe the time slot is assigned. This field is used for Vector File address selection to select the read or to initialize the write MUX address counter. Bit 4 is the reserve bit. It defines whether the time slot is actually in use. Its primary use is for the time slot pattern search mechanism. The pattern search logic looks at this bit to determine whether the time slot is actually in use. Bit 5 is for auto release. It is used by the AP and MP pipes to either release or rereserve a write time slot. If another instruction is not waiting to start, the time slot is released or cleared. If an instruction is waiting to start in the same pipe, then the same read and write time slots can be reassigned to the new instruction for optimum performance. The latency time of the AP and MP allow up to 8 cycles overlap between writing result, of one instruction and reading operands for the next instruction.

Bit 6 is used to initiate either the read or write MUX address counter. For a read operation the counter is initialized to zero at the start of the instruction just in time to control the pipe Vector File read MUX address for the reading of the first word from the Vector File RAM's. This bit 6 is discarded upon moving from Vector File time slot register 0 to 7, so that the counter is only cleared or initiated once for each instruction. For a write operation, the counter is also initialized to zero just in time to control the Vector File write data register MUX address to select data from the proper pipe.

Bit 7 is used to delay the initiation of the read/write MUX counter. It serves the same function as bit 6 but allows the initiation of the write MUX counter to be delayed. It is used for the AP and MP pipes to delay the initiation of the write MUX counter for eight (8) cycles. The bit is shifted from the bit 7 position to the bit 6 position upon advancing from time slot register 0 to time slot register 7. It remains in the bit position 6 for one pass through all of the time slot registers. The next time it goes from time slot register 0 through 7 bit 6 is discarded. So the write MUX counter is only initiated once per instruction.

The last bit is bit 8. It is the temporary reserve bit and is only in some of the time slot registers and then it only resides for one clock cycle. It is used by the pattern search for the reservation and cancel reservation situation for time slot patterns that reserve adjacent time slots. This bit is used to override the reserve bit, which is bit 4, for the subsequent pattern search if a cancellation occurs. It is necessary because the search is done from a clock phase 2 register and a cancellation is not done until later. Again, this bit is only in certain time slot registers. It is related to the Vector File time slot patterns and specifically to those patterns which reserve adjacent time slots.

Figures 21B, 22:
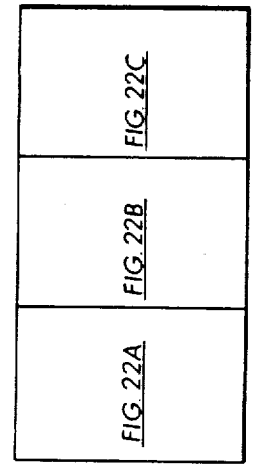
FIG. 22, which includes FIGS. 22A, 22B and 22C, positioned as shown, is a more detailed block diagram showing the Vector File organization and its addressing apparatus.
Figure 22A:
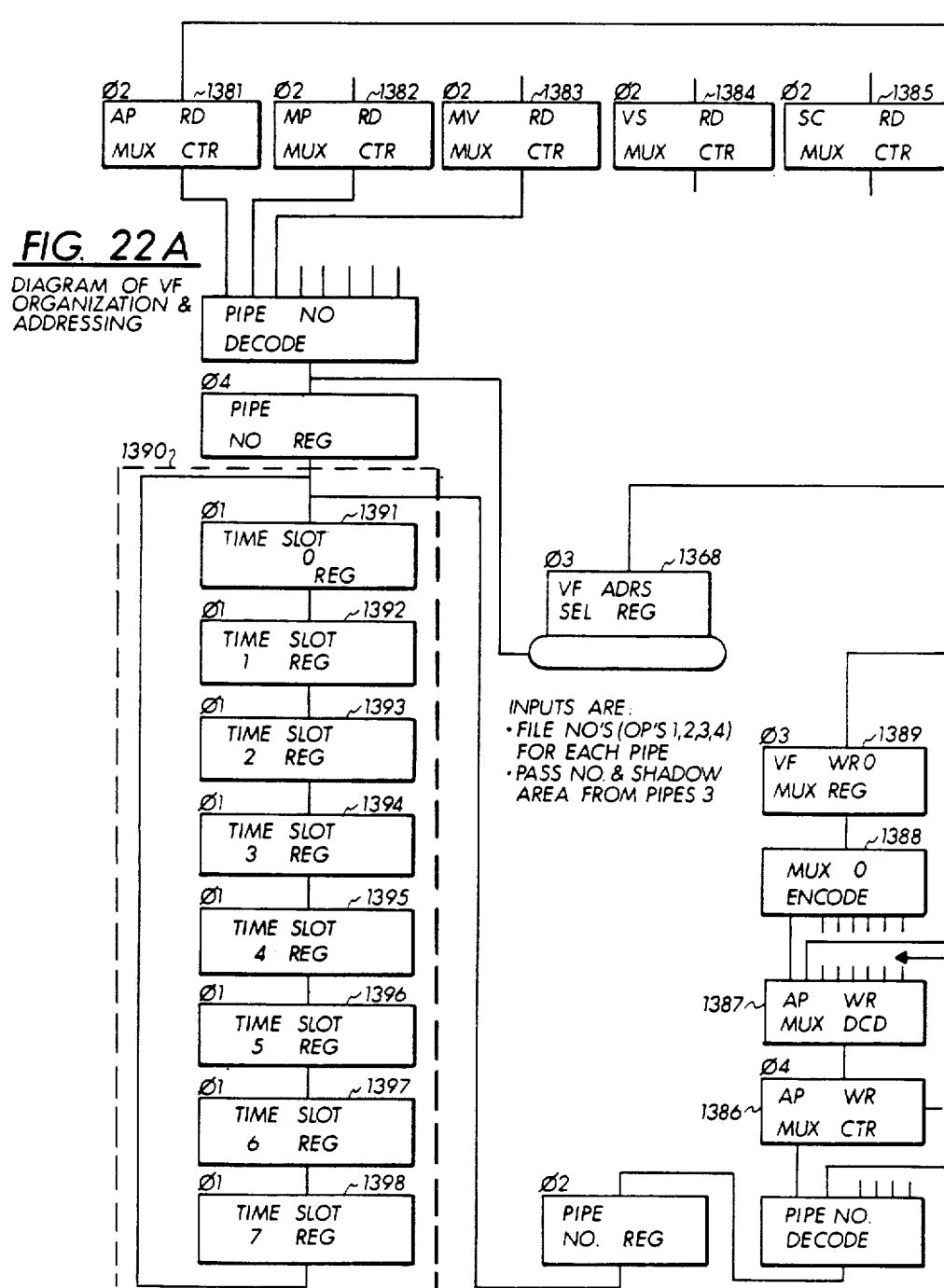
Figure 22B:
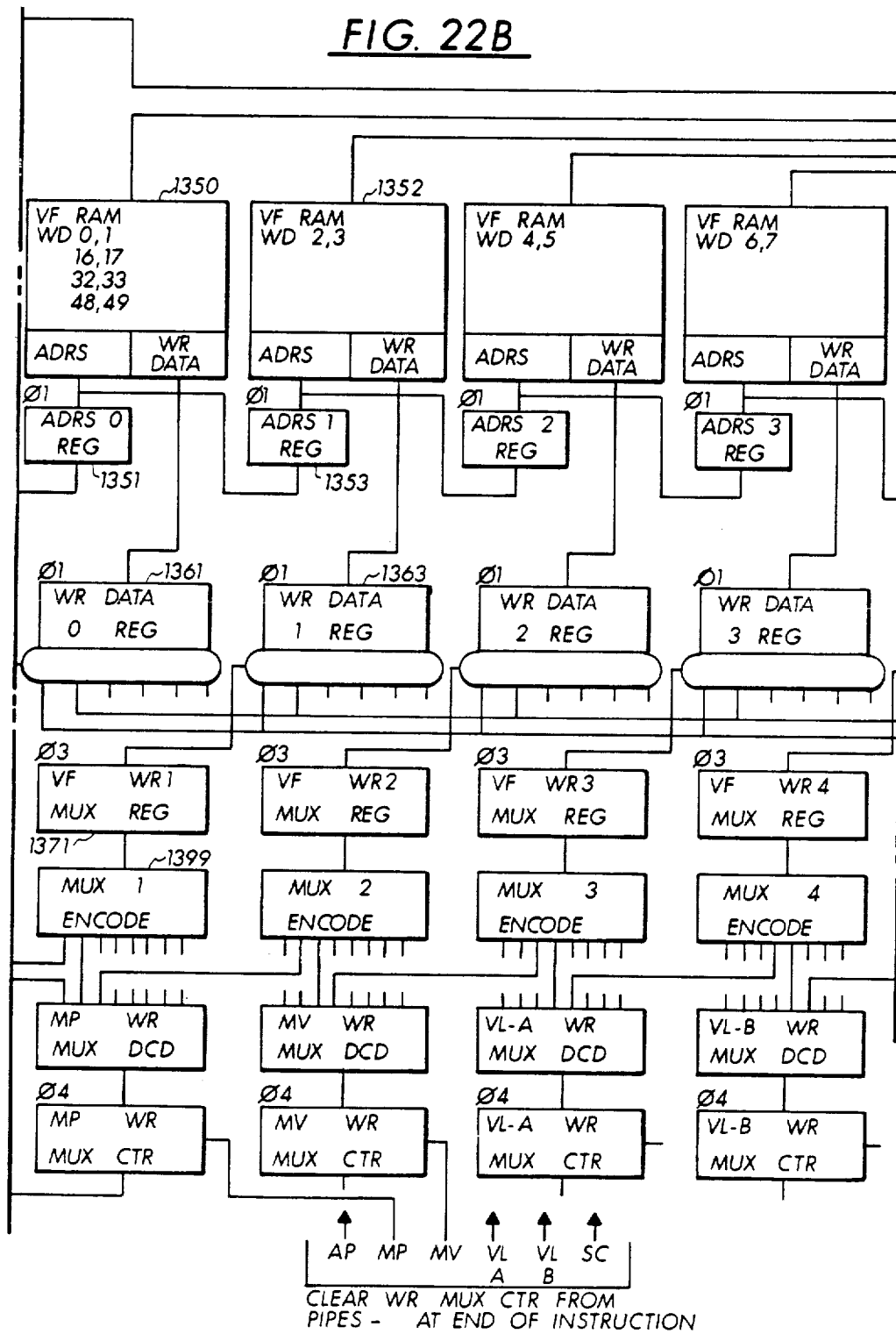
Figure 22C:
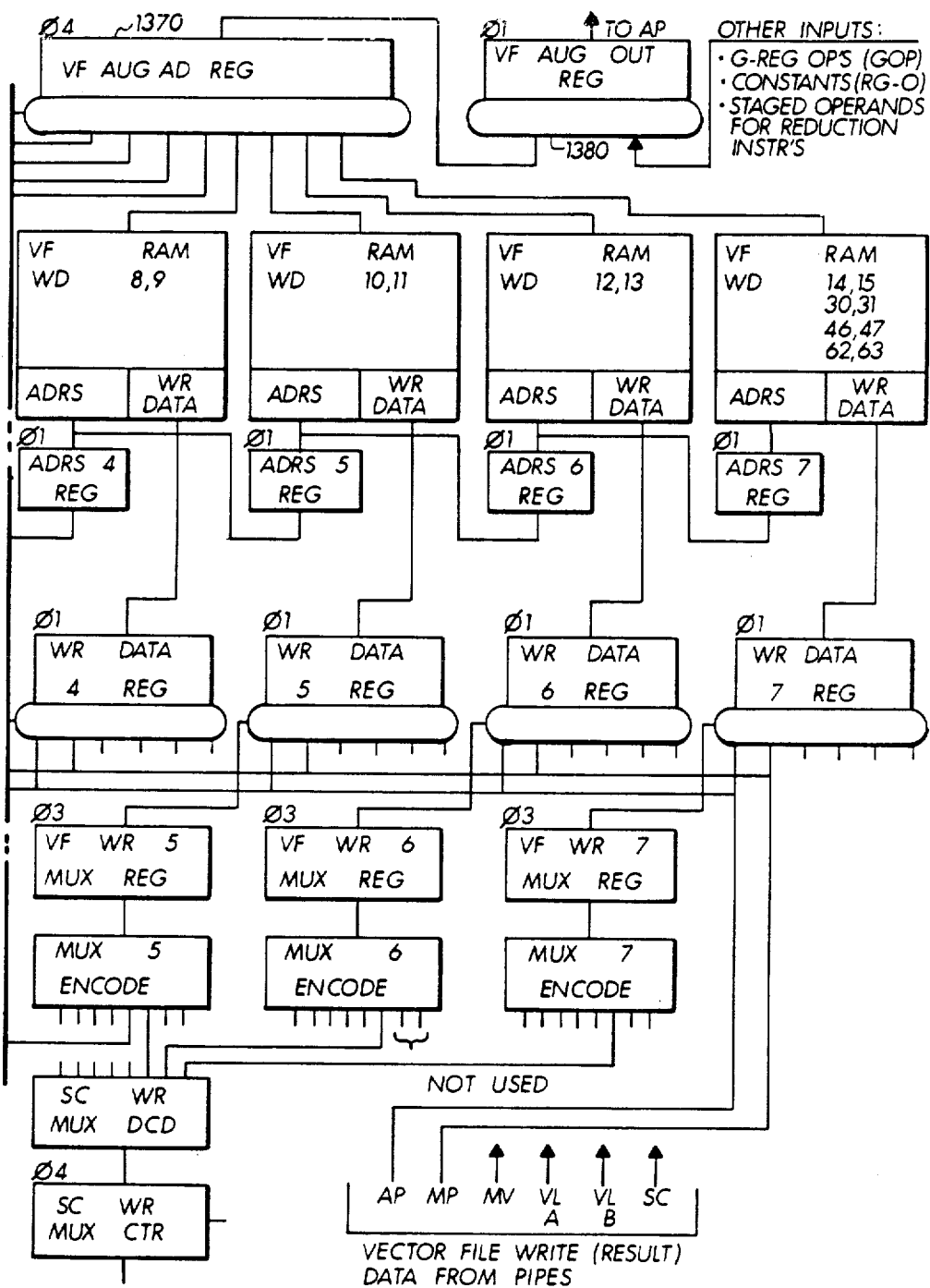

Next refer to the block diagram of the Vector File organization and of the addressing mechanism as shown in FIG. 22. On the lower left hand portion are the time slot registers 0 to 7, 1390 which have just been described. Note that the output of time slot register 0 has its output connected to the input of time slot register 7. The registers are connected together in a serial fashion, 7 goes to 6 to 5 to 4 to 3 to 2 to 1 and finally to 0. There is also some intermediate registers, however, only the phase 1 registers are shown.

The output of the time slot 0 register is connected to the Vector File address select register 13, as previously noted. There is a primary and a secondary address select register although only one is shown on the diagram for simplicity. The time slot registers are on the P1 card and the address select registers on the P2 card. The inputs to the Vector File address select registers are the file numbers for the op 1, op 2, op 3 and op 4 as for required each pipe. The op 1 and op 2 are read or source operands and op 3 and op 4 are write or destination operands. There are file number registers for each of the six (6) pipes. The other input into the Vector Files select register is from the various pipes themselves. They are the pass number and the shadow area address.

Once the address has been formed it is sent to the address register is for Vector File RAM block 0. It starts by reading words 0 and 1 out of the Vector File RAMs. The output of the Vector File RAM then goes to the read output register which is a phase 4 register. In the diagram this is the Vector File augend read register. It has an 8 input MUX with each of the inputs coming from various blocks of the 8 Vector File RAM.

As previously noted in FIG. 14, the ADD pipe has the augend read register on the primary cards with the addend read register on the secondary cards. Additionally on the primary cards are the multiplicand, the read register, the vector store primary read register, and the scalar or read register. On the secondary cards are the addend read register, the multiplier read register, the move read register, and the store secondary read register. The output of the Vector File read register 1370 goes to the Vector File Augend output register 1380, which is a clock phase 1 register. Additional inputs are shown into the Vector File Augend out register 1380. They are the G register operands, (G ops), constants for certain instructions such as the reductions. An example might be a zero for a sum reduction. If there is an odd number of elements, then one element will have to be filled in with a zero. Another source of data is the staged operands for reduction instructions.

Returning to the time slot registers 1390, particularly to time slot register 0, and assuming that read operation is in process. The output of register 0, 1391 goes to the pipe number register which is clocked on phase 4. The output of the pipe number register goes into a pipe number decode. Also bit 0 is examined, which is the write bit. It denotes whether the operation is a read or write. If the bit is 0, the time slot is for a read operation. Also bit 6 must be examined since it specifies whether either the MUX read or write counter should be initiated. For example assume that bit 6 is set and also assume a Vector add, then the leftmost output of the pipe decode would be activated and initiate a clear signal sent to the AP read MUX counter. The counter then is initialized at 0. It increments by one each clock cycle until reaching 7 and then resets to 0 and keeps repeating that pattern indefinitely until the next instruction is started in that pipe. There are also four other counters or a total of five. The Add Pipe, the Multiply Pipe, the Load Pipe, the Vector Store and the Scalar Control Pipe each have one. The counters for the add, multiply and vector store pipes control the vector file read registers for both the primary and secondary Vector Files. The output then of the add pipe read MUX counter 1381 connects to the Vector File Augend read register 1370 to control the MUX address.

Following is the operation description of the time slot registers 1390 as they relate to reading data from the Vector Files. During the clock cycle that words 0 and 1 are read from the vector file RAM, the time slot for the Vector File read for the Add Pipe is wrapped around to time slot register 7. The add pipe read reservation transfers from register to register each clock cycle arriving at time slot register 0 as Vector File RAM block number 7 is being read for the first pass. At that time, the Vector File Address for pass number 1 is formed as the pipe would have incremented the pass number to a value of one. This new address is sent up to the Vector File block address zero register and the process repeats itself for 8 more clock cycles. Meanwhile, the AP MUX counter 1381 is counting from 0 through 7 for each pass. To complete a 64 element vector add requires a total of four passes.

Going back to the beginning of our example vector add instruction wherein the time slots were reserved to follow the write time slot, consider that for our example vector add instruction the time slot pattern is a three. This specifies a read and a write operation in adjacent time slots. The read time slot is reserved in time slot register 0 and the write time slot in time slot register 1. The reservations actually occur in the phase 1 registers, which are shown. The write bit is set and also bit 7 will be set. Bit 7 is the delayed initiate signal for the write MUX counter. When the write time slot is transferred from time slot register 0 to time slot register 7, bit 7 is shifted into the bit 6 position. After eight cycles, the write time slot reservation traverses its way through the time slot registers back to the time slot 1 register. So 8 cycles after being reserved, time slot register 1 has a write time slot reservation that has bit 6 set which bit specifies the initiation of the counter. The write time slot reservation is also transferred to the pipe number register at the next clock phase 2. The encoded pipe field, the write bit, and the bit 6 set will cause a write MUX address counter to be initialized. The output of the pipe number register goes to the pipe number decoder which is a three input decoder with an eight bit output, of which only six bits are used in this application. For our sample, vector add instruction, the Add Pipe line write MUX counter is initialized to 0 and enabled to count at the next clock phase 4. As shown in FIG. 22, the 3 bit output of the write MUX counter goes to a AP write MUX decoder. The 8 AP WR MUX decoder outputs are connected to the bit 0 input of the 8 MUX encoders labelled MUX 0 encode through MUX 7 encode as shown. Each AP write MUX decode output corresponds to a unique input value. The leftmost output is active for an input value of zero and the rightmost for an input value of seven. The priority encoder provides a 3 bit encoded output from the 8 inputs. The output of the encoders goes to one of 8 Vector File write MUX register which are clocked on phase 3. The output of these registers go to the Vector File cards as the MUX address for the write data registers. For the first write of the example vector add instruction, the write MUX address of zero is routed to the write data register 1361 for vector file block 0, 1350. At that time the result data for the first pair of elements for our example vector add instruction would just be coming into this register from the Add Pipe. Other write data inputs into the vector file write data registers are from the Multiply, Load, (two from the Vecto Load) and the Scalar Control pipes. The Vector Store does not have an input because it only reads the Vector Files. The Multiply pipe result data enters the second MUX address of the vector file write data register input so its MUX address is always one. The data input arrangement into the vector file write data register is; the Add Pipe, the Multiply Pipe, the Load Pipe, the Vector Load A input, Vector Load B input and the Scalar Control input.

The output of the write data register 1361 goes to the write data input of the Vector File RAM 1350. Meanwhile, the write time slot then has appeared in time slot register 0, the encoded pipe field is sent to the Vector File address select registers and an appropriate write file number is selected. For this example, the add pipe op 3 file number is selected. The additional address input from the Add Pipe is a pass number with a value of 0 because the first pass results of the vector add operation are being written. The same address is selected by both the primary and secondary address selector registers. Both have the same address because for a write operation both copies of the vector file RAMs are written simultaneously. At the same clock phase 1 we have the result data in the write data register as well as the address in the address register. The write enable comes from the pipe and accompanies the data into the write data register. The actual writing of the results into the Vector File RAM at clock phase 3. This data would be written into word 0 and 1 of the destination file.

Now we will consider, in a little more detail, the write MUX counter 1386 and its outputs. For our example, vector add instruction AP write MUX decode 1387 is used. After initialized to a value of zero the counter is incremented by one to a value of 1 for the next clock cycle. The output of the write MUX decode 1387 logic is also a 1. That is the 1 or second output from the left that would be present or active. That active output then connects into the MUX 1 encoder 1399. The MUX 1 encoder output goes to the Vector File write 1 MUX register 1371, at phase 3 and from there on to the write data 1 register 1363 for Vector File RAM block 1. At this time, the second results for the second pair of operands have arrived from the Add Pipe and the data will be written into words 2 and 3. Meanwhile, the write MUX counter has advanced to a value of 2 in which case the decode output that would be active would be the third output of the AP write MUX decode. That output is connected to the MUX 2 encoder into the bit 0 input position. The encoded of the MUX 2 encode output would be a 0 and it would be transferred into the Vector File write MUX 2 register at the next clock phase 3. The value of 0 in the VF WR 2 MUX register which would select data from the add pipe, which is the third pair of results, enters the vector file write data 2 register. This pattern continues for a total of the eight (8) cycles. At that point, the AP write MUX counter resets back to 0 and the first output of the write MUX decoder would be active. The process would continue repeating every 8 cycle pass. When the writing is completed the MUX counters are cleared at the end of the instruction. The clear signals shown at the bottom center come from the pipes into the input necessary to clear the write MUX counter. There are a total of six (6) inputs one for each of these counters.

Figure 23:
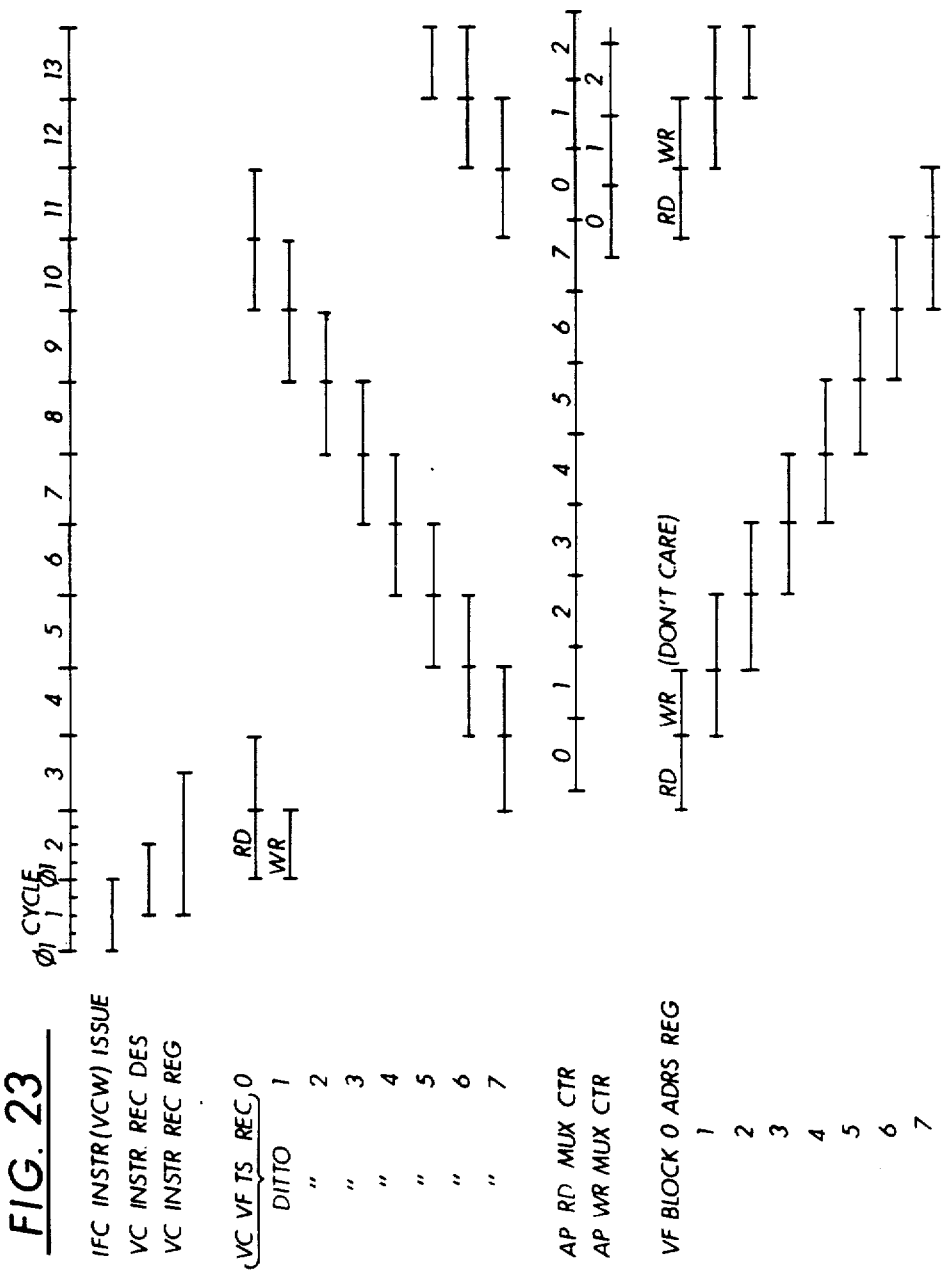
FIG. 23 is a timing diagram showing the Read/Write operations as they occur in the Vector Control Vector File Registers 0 through 7 and the Vector File Block Address Registers 0 through 7.

Refer next to the timing diagram of FIG. 23 which depicts the time slot activity which has just been described. For an example we will again consider a vector add instruction. Across the top of the timing sequence we have a line segmented into clock cycles, with clock cycle 1, 2, 3, on up to 13. Each cycle has a phase 1, phase 2, phase 3 and a phase 4 and the next cycle starts with a phase 1 and so forth. Only 13 cycles are shown here, however, the instruction would actually continue for 32 cycles of read plus an additional 8 cycles of write, so if the entire sequence was shown it would be over 40 clock cycles long. Only a portion of it is shown to illustrate the start up and the pattern of operation. The first signal that we will look at is the issuance of the instruction from Instruction Flow Control in the SPM. The instruction issue register of the Scalar Processor Module is clocked on phase 1 and is active for one clock cycle. The output of the instruction issue register propagates to the Vector Control section in the Vector Processor Module via cables. The next two signals shown are in the Vector Control section. The first is the instruction receive designator of the Vector Control which is clocked at phase 3. It is set or active for a minimum of one clock cycle. We are assuming here that the pipe was able to start immediately so that the instruction is acknowledged immediately. The designator is set, or active, for one clock cycle. The third line is the VC instruction receive register and it also sets on a phase 3. However, it remains set for one cycle longer than the instruction receive designator does. To start this instruction or vector control word into execution, one of the first activities that occurs in the Vector Control is the reservation of the Vector File time slots. The next eight lines are the Vector File time slot registers which are clocked at phase 1. Time slot registers 0, 1, 2, 3, 4, 5, 6, and 7 are shown. The reservation is made at the next clock phase one, 2 phases after the instruction is received by Vector Control. A time sot pattern 3 is shown as being reserved. Shown also is the read time slot in Vector File time slot register 0. The write time slot is shown in Vector File time slot register 1. The encoded pipe select field, bit 1 through 3 are the same for both the read and the write time slots. The reserve bit is sent to both of them. The auto release bit which is bit 5 is a 0. The read time slot in register 0 has bit 6 set, which immediately initiates the read/write MUX counter. The write time slot bit in time slot register 1 (bit 6) would be cleared and bit 7 would be set. Bit 7 is the delayed initiate write MUX counter bit. Bit 8 would also be set in the read time slot register as the temporary reserve bit. It is not used here, of course, because we are not going to cancel and re-reserve. Advancing to the next clock cycle we see that the read time slot has advanced or transferred to the Vector File time slot register 7. The AP read MUX counter is shown immediately below the time slot register 7. The AP read MUX counter is initialized 5 clock phases after the time slots are reserved. The counter is shown initialized to a value of zero and is shown incrementing by one each clock cycle until a value of seven is reached. It is reset to a value of zero for the following cycle and the pattern repeats.

Next we will look at initializing the AP write MUX counter which is shown on the next line. The write MUX counter is initialized when the write time slot reservation is in Vector File time slot register 1. However, the write MUX counter is not initialized when the reservation is made because we have bit 7 set to specify a delayed initiate. Following the write time slot reservation, it is back up to time slot register 1 eight clock cycles after the reservation was made. At that point the AP write MUX counter will be initialized, because bit 6 is set, having been shifted from bit 7 to bit 6 during the transfer from time slot register 0 to time slot register 7.

Referring to the timing chart of FIG. 23 the relationship of the read and write MUX counters to the Vector File blocks is shown. The AP read MUX counter was initiated immediately after the time slot reservation. This is depicted by the line showing AP read MUX counter. It is shown being initialized to a value of zero at a clock phase 2 of cycle 3. The Vector File address registers for the 8 blocks of Vector Files 0, 1, 2, 3, 4, 5, 6, and 7 are shown at the bottom of FIG. 23. The read address is formed when the read time slot reservation is in time slot register 0. The output time slot register 0 goes to the MUX address input Vector File address select register. The VF address select register makes the selection of the file number, pass number and the shadow address to form the complete address. It sends this off to the Vector File address 0 register at phase 1 of clock cycle 3 and the read address propagates for the next 7 clock cycles through the 7 additional read registers. At that point, this address is discarded. For the next pass the read time slot reservation has advanced back up to the time slot 0 register and again we go to the address selection process and issue a new address for the second pass. It continues on for a total of 8 cycles and then the process repeats twice more for an additional two passes. The write time slot reservation follows the read time slot reservation by one clock cycle. A write address selection process is performed at clock cycle 3, however, this is a don't care operation at this time as we are not going to start writing until 8 clock cycles later. This address is then sent to the Vector File address registers but at least for this instruction these are all don't care operations and no actual writing occurs. There are situations where there could be a valid write operation actually occurring at this point but it would be for a previous instruction rather then for the one that we are presently examining. The write MUX counter is initialized eight clock cycles after the read and write time slots were reserved. On the timing diagram it is shown as occuring at phase 4 of cycle number 10. The first value of 0 will be for the first Vector File write and the value 1 will be the second write and so forth. This counter is incremented through 7 and it is then reset to 0. This process continues for a total of four times for the four write passes. The output of the write MUX counter, goes through the decode, the encode and the write MUX register plus additional logic levels for a total of five phases of logic propagation. The output of the write MUX counter is actually applied to the Vector File write data register to coincide with the arrival of the write address and the write data. The five phases of propagation can be seen on the timing diagram.

Figure 24:
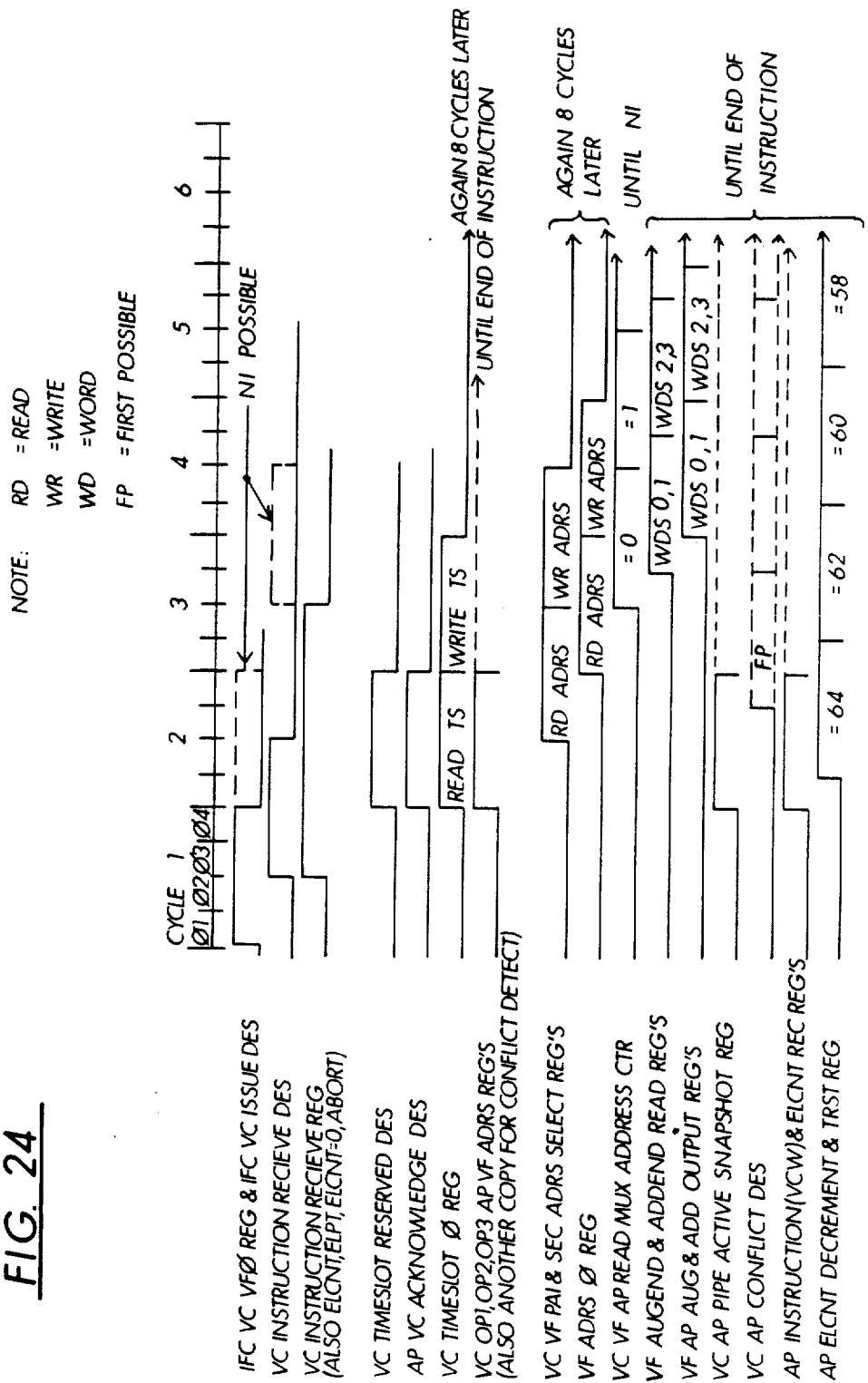
FIG. 24 is a timing sequence for issue and start up of a Vector Register to Vector Register (VV) format Add instruction.

Next to be discussed is how the instruction operation is obtained. It is shown in FIG. 24 as a timing sequence. Across the top is a line segmented into clock cycles and phases as before. Starting at the top is the Vector Control register of the Instruction Flow Control and the IFC, VC issue designator. The issue of the instruction causes the issue designator to be set for one clock cycle. The IFC could possibly issue another instruction right at the next clock cycle. The next two lines denote the instruction or the Vector Control word being received in the Vector Control section of the Vector Processor Module. The top line is the receive designator and next is the receive register. At the same time the element count (ELCNT) and the element point (ELCNT) signal are received. If a pipe is available or ready to start immediately then the instruction receive designator is up for 1 clock cycle. It remains up for as many clock cycles as are necessary to get the instruction successfully in operation. The receive register always remains up for an decoding purposes. On the next phase 1, the Vector File time slots are reserved for the Vector Add operation. The time slot pattern for a vector add is 3 which specifies a time slot 0 and a time slot 1. There is also an additional designator which denotes that we actually did reserve a Vector File time slot. This additional signal is sent to the pipe to denote that a time slot was assigned and it can proceed with execution of the instruction. The pipe responds with the AP VC acknowledge designator at the same phase 1 as the Vector File time slot reserve designator is set. If both those events occur, the instruction has successfully been placed in operation. If the pipe is unable to acknowledge because it was busy with a prior instruction then the Vector File time slots are cancelled. The process of reserving and cancelling VF time slots continues until such time as the pipe is ready. FIG. 24 shows the Vector File time slot 0 register with the read time slot appearing one clock cycle before he write time slot. From this, the Vector File read address select operation is formed. The next line shown is the VC Op 1, 2, and 3 Vector File address registers which are used for the purpose of forming these Vector File addresses. They are set for at least one clock cycle if the element count (ELCNT) was 2 or less. If the element count (ELCNT) is more than 2, then they are set for a longer period; up to 32 cycles for a full 64 element vector. The next line is the Vector File primary and secondary address select registers. They are a clocked at phase 3. Again note that the MUX address of that register is controlled by the Vector File time slot 0 register. The read address is formed and sent off to the Vector File address register two phases later, at the next phase 1. The first operands are then being read from the Vector Files for the Add instruction. The write address is also formed at this time, however, it is of no consequence, because result operands are not written for another 8 clock cycles. The Vector File AP read MUX address counter is shown being initialized to 0 at phase 2 of clock cycle 3. It keeps incrementing from 0 through 7 and repeats this process until the instruction is done. The next line is the augend/addend read registers at the output of the Vector File RAM's. They are clocked on phase 4. The data is shown for the first and second pairs of elements. The next line is the VF augend and addend output registers. These are phase 1 registers. Next are the pipe active snap shot registers which are used in conflict detection. These registers are clocked at phase 1 and stay up for at least 1 clock cycle depending upon the element count. They may stay up for as long as 32 cycles or until the instruction is done. The first possible conflict that could have been detected would have been at cycle 2 phase 4 and it is shown on the next line. A conflict can occur at any clock cycle, or any pair of elements, during instruction execution. The second to the bottom line is the AP Vector Control word and the element count receive registers. The bottom line is the element count decrement and test register. It is decremented by two each clock cycle and it is decremented until it reaches zero. At this point the pipe has the instruction and the element count and it has already started the house keeping operation of decrementing and testing the element count.

In view of the foregoing description and discussion of the invention and a preferred embodiment, it can be seen that the various stated objectives and purposes of the invention have been achieved. It is, of course, understood that various changes in logical circuit arrangement, circuit selection, and functionality will become apparent to those skilled in the art after having considered this teaching, without departing from the spirit and scope of the invention. Accordingly, what is intended to be protected by Letters Patent as set forth in the claims.

I claim:

1. In a scientific vector processor having multiple independent instruction execution pipelines, a vector file memory system comprising:
 a first vector file means for addressably storing a plurality of vector files made up of vector elements in a predetermined storage configuration;
 a second equal vector file means for addressably storing a second plurality of vector files made up of vector elements in said predetermined storage configuration;
 each of said first and second vector file means including an identical plurality of N memory blocks, wherein each of said memory blocks comprises a random access memory means having storage locations for storing vector elements, addressing means for providing address signals for addressing said storage locations, and a separate writing means for writing vector elements in addressed ones of said storage locations;
 each of said random access memory means including a plurality of successive addressable storage locations wherein each such successive location stores contiguous information successively separated by N locations, where N equals the number of said N memory blocks;
 N address registers, each coupled to said addressing means of a respectively associated one of said N memory blocks wherein N−1 of said N address registers are successively interconnected one to another such that the output of each of said address registers is connected to the input of a successive one of said address register; and
 a time slot management mechanism coupled to each of said first and said second vector file means to allocated and maintain memory access by the multiple independent instruction execution pipelines in a predetermined sequence of said N memory blocks.

2. A vector file system for a scientific vector processor having multiple independent instruction execution pipelines, said vector file system comprising:
 a first and a second equal plurality of identical vector files each addressably storing a plurality of vector elements in a predetermined storage configuration;
 each of said vector files including an identical plurality of N memory blocks;
 each of said memory blocks comprising a random access memory, a separate addressing means for providing address signals to read and write in selected memory locations and a separate writing means for writing vector elements in addressed ones of selected memory locations;
 2N address registers for receiving memory block addressing information identifying the number of the vector file and selecting the particular vector elements, and for providing addressing signals to associated ones of said separate addressing means;

each of said plurality of 2N address registers having an input and an output means;

each of said 2N address registers respectively coupled via its output means to a respectively associated ones of said separate addressing means of one of said 2N memory blocks of said first and second equal plurality of identical vector files; and a time slot management mechanism coupled to each of said first and said second plurality of identical vector files for controlling reading and writing in successive ones of said 2N memory blocks;

said time slot management mechanism further including a plurality of N interconnected register which allocated and reserve access to the identical vector files by an execution pipe for each individual instruction execution.

3. The vector file system for a scientific vector processor having multiple independent instruction execution pipelines as set forth in claim 2 wherein said time slot management mechanism further comprises means for forming and selecting vector file addresses for both said first and said second equal pluralities of identical vector files.

4. The vector file system for scientific vector processor having multiple independent instruction execution pipelines as set forth in claim 3 wherein said time slot management mechanism further comprises means for forming and selecting said vector file address which address is comprised of an appropriate file number sufficient to address any one of said N memory blocks of a vector file, in a pass where said pass is a sequential reference to an address in each of said N memory blocks.

5. The vector file system for a scientific vector processor having multiple independent instruction execution pipelines as set forth in claim 4, wherein said item slot management mechanism further includes a plurality of five counters, one of which is initiated to select read data from each of the N memory blocks.

6. The vector file system for a scientific vector processor having multiple independent instruction execution pipelines as set forth in claim 5 wherein said time slot management mechanism still further includes another plurality of six counters, one of which is selectively initiated to route write data to said writing means of selected ones of said 2N memory blocks.

7. The vector file system for a scientific vector processor having multiple independent instruction execution pipelines as set forth in claim 6 wherein said time slot management mechanism includes a plurality of N time slot registers serially connected together in a loop configuration, wherein all of the time slots are reserved by data which is advanced from time slot register to time slot register during one block cycle.

8. The vector file system for a scientific vector processor having multiple independent instruction execution pipelines as set forth in claim 7 wherein said time slot management mechanism further includes means for creating said formed and selected vector file address in the first of N time slot registers, for reserving said time slot for four of said passes (32 clock cycles) and for releasing said time slot by clearing said first of N time slot register upon completion of the instruction.

9. For use in a pipeline scientific processor capable of selectively performing single-precision or double-precision manipulation of vector operands in performing vector addition, vector multiplication, vector reduction, and vector stores in respective ones of the pipelines, a vector file temporary memory system for use therewith comprising:

primary vector file means for addressably storing a plurality of vector file each made up of individually addressable vector elements and stored in a predetermined storage configuration, said primary vector file means including a first plurality of individually addressable random access memory means arranged in N blocks of memory wherein each of said N blocks store vector elements in said predetermined storage configuration wherein element pairs are stored in a predetermined interspersed sequence of said element pairs;

shadow stage means for addressably storing intermediate vector elements for vector instructions that generate multiple intermediate vector elements, said shadow storage means including a second plurality of individually addressed random access memory means arranged in N blocks similar to said primary vector file means;

pipeline control means for receiving pipeline identification signals and for providing pipeline identification signals;

addressing means coupled to said primary vector file means and to said shadow storage means for providing vector element address signals to respective blocks of said first and second pluralities of individually addressable random access memory means said addressing means including N address register means each coupled to an associate one of said N blocks and successively coupled to one to another such that the output of each of N−1 of said N address register means is coupled as an input to an associated different one of N address register means, said addressing means including address input means for receiving address signals for selecting the primary vector file means, the shadow storage means, the selected vector file, and a vector file pass, where said vector file pass identifies the sequence of referencing said interspersed sequence of said element pairs in said N blocks;

time slot management means coupled to said pipeline control means and coupled to said addressing means for allocating and reserving selected ones of said plurality of vector files for reading and writing vector elements sequentially in said N blocks where said vector file pass comprises the time and function to perform an individual read or write in each of N blocks;

writing means, including N write register means coupled to said N blocks for receiving vector elements from the selected one of the pipelines and recording said vector elements in said N blocks at addresses determined by said addressing means; and reading means coupled to said pipeline control means for reading vector elements from said N blocks under control of said addressing means and providing the vector elements so read to the selected pipeline.

10. A vector file temporary memory system as in claim 9 and further including secondary file means and a further shadow storage means the same respectively as said primary vector file means and said shadow storage means, each being addressable by said addressing means and arranged for providing vector elements to the selected pipeline simultaneously with said primary vector file means for those vector instructions requiring simultaneous vector elements.

11. The vector file temporary memory system as in claim 10 wherein said shadow storage means includes first, second and third shadow storage file means each individually addressable by said addressing means for providing intermediate storage in said first shadow storage file means for said intermediate vector elements utilized in the vector multiply, division and reduction instruction and for providing intermediate storage in said second and third shadow storage file means for said intermediate vector elements utilizes in vector add and format conversion instructions.

* * * * *